US009948135B2

(12) United States Patent
Leabman et al.

(10) Patent No.: US 9,948,135 B2
(45) Date of Patent: Apr. 17, 2018

(54) SYSTEMS AND METHODS FOR IDENTIFYING SENSITIVE OBJECTS IN A WIRELESS CHARGING TRANSMISSION FIELD

(71) Applicant: ENERGOUS CORPORATION, San Jose, CA (US)

(72) Inventors: Michael A. Leabman, San Ramon, CA (US); Hans Mellberg, San Jose, CA (US)

(73) Assignee: Energous Corporation, San Jose, CA (US)

( * ) Notice: Subject to any disclaimer, the term of this patent is extended or adjusted under 35 U.S.C. 154(b) by 210 days.

(21) Appl. No.: 14/861,285

(22) Filed: Sep. 22, 2015

(65) Prior Publication Data
US 2017/0085120 A1    Mar. 23, 2017

(51) Int. Cl.
| | | |
|---|---|---|
| H02J 7/04 | (2006.01) |
| H04B 5/00 | (2006.01) |
| H02J 7/02 | (2016.01) |
| H02J 5/00 | (2016.01) |
| H02J 50/20 | (2016.01) |

(Continued)

(52) U.S. Cl.
CPC .............. *H02J 7/042* (2013.01); *H02J 5/005* (2013.01); *H02J 7/025* (2013.01); *H02J 50/00* (2016.02); *H02J 50/20* (2016.02); *H02J 50/60* (2016.02); *H04B 5/0037* (2013.01)

(58) Field of Classification Search
CPC ............ H02J 50/20; H02J 50/23; H02J 7/025
See application file for complete search history.

(56) References Cited

U.S. PATENT DOCUMENTS

| 787,412 A | 4/1905 | Tesla |
| 3,434,678 A | 5/1965 | Brown et al. |
| 3,696,384 A | 10/1972 | Lester |

(Continued)

FOREIGN PATENT DOCUMENTS

| CN | 203826555 U | 9/2014 |
| CN | 104090265 A | 10/2014 |

(Continued)

OTHER PUBLICATIONS

International Search Report dated Sep. 12, 2014 corresponding to International Patent Application No. PCT/US2014/037072, 3 pages.

(Continued)

*Primary Examiner* — Jeffrey Shin
(74) *Attorney, Agent, or Firm* — Morgan, Lewis & Bockius LLP

(57) ABSTRACT

Embodiments disclosed herein may generate and transmit power waves that, as result of their physical waveform characteristics (e.g., frequency, amplitude, phase, gain, direction), converge at a predetermined location in a transmission field to generate a pocket of energy. Receivers associated with an electronic device being powered by the wireless charging system, may extract energy from these pockets of energy and then convert that energy into usable electric power for the electronic device associated with a receiver. The pockets of energy may manifest as a three-dimensional field (e.g., transmission field) where energy may be harvested by a receiver positioned within or nearby the pocket of energy.

24 Claims, 32 Drawing Sheets

(51) Int. Cl.
*H02J 50/00* (2016.01)
*H02J 50/60* (2016.01)

(56) References Cited

U.S. PATENT DOCUMENTS

| | | |
|---|---|---|
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Amdt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,191,013 B1 | 3/2007 | Miranda et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,362,745 B2 | 1/2013 | Tinaphong |
| 8,380,255 B2 | 2/2013 | Shearer et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,854,176 B2 | 10/2014 | Zeine |
| 8,860,364 B2 | 10/2014 | Low et al. |
| 8,897,770 B1 | 11/2014 | Frolov et al. |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,242,411 B2 | 1/2016 | Kritchman et al. |

(56) References Cited

U.S. PATENT DOCUMENTS

| | | |
|---|---|---|
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,444 B2 | 3/2017 | Walley |
| 9,620,996 B2 | 4/2017 | Zeine |
| 2002/0001307 A1 | 1/2002 | Nguyen et al. |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0093766 A1 | 5/2005 | Turner |
| 2005/0116683 A1 | 6/2005 | Cheng |
| 2005/0117660 A1 | 6/2005 | Vialle et al. |
| 2005/0171411 A1 | 8/2005 | Kenknight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0298846 A1 | 12/2007 | Greene et al. |
| 2008/0014897 A1 | 1/2008 | Cook et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0248758 A1 | 10/2008 | Schedelbeck et al. |
| 2008/0248846 A1 | 10/2008 | Stronach et al. |
| 2008/0278378 A1 | 11/2008 | Chang |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207092 A1 | 8/2009 | Nysen et al. |

(56) References Cited

U.S. PATENT DOCUMENTS

| | | |
|---|---|---|
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0151808 A1 | 6/2010 | Toncich et al. |
| 2010/0156721 A1 | 6/2010 | Alamouti et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0214177 A1 | 8/2010 | Parsche |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1* | 12/2010 | Zeine .................. H02J 7/025 320/137 |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2012/0013196 A1 | 1/2012 | Kim et al. |

(56) References Cited

U.S. PATENT DOCUMENTS

| | | |
|---|---|---|
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0074891 A1 | 3/2012 | Anderson et al. |
| 2012/0231856 A1 | 3/2012 | Lee et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0212072 A1 | 8/2012 | Miyabayashi et al. |
| 2012/0214536 A1 | 8/2012 | Kim et al. |
| 2012/0200399 A1 | 9/2012 | Chae |
| 2012/0228956 A1 | 9/2012 | Kamata |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0326660 A1* | 12/2012 | Lu .................. H02J 17/00 320/108 |
| 2013/0002550 A1 | 1/2013 | Zalewski |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0049471 A1 | 2/2013 | Oleynik |
| 2013/0049475 A1 | 2/2013 | Kim et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0063082 A1 | 3/2013 | Lee |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0178253 A1 | 7/2013 | Karaoguz |
| 2013/0181881 A1 | 7/2013 | Christie et al. |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0210357 A1 | 8/2013 | Qin et al. |
| 2013/0221757 A1 | 8/2013 | Cho et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0293423 A1 | 11/2013 | Moshfeghi |

(56) References Cited

U.S. PATENT DOCUMENTS

| | | |
|---|---|---|
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0175893 A1 | 6/2014 | Sengupta et al. |
| 2014/0176054 A1 | 6/2014 | Porat et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0029397 A1 | 1/2015 | Leabman et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0108848 A1 | 4/2015 | Joehren |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |

(56) References Cited

U.S. PATENT DOCUMENTS

| | | |
|---|---|---|
| 2015/0222126 A1 | 8/2015 | Leabman et al. |
| 2015/0236520 A1 | 8/2015 | Bauman |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0299210 A1* | 10/2016 | Zeine .................. G01S 5/0294 |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2017/0005516 A9 | 1/2017 | Leabman et al. |
| 2017/0005530 A1* | 1/2017 | Zeine .................... H02J 50/20 |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0134686 A9 | 5/2017 | Leabman |
| 2017/0163076 A1 | 6/2017 | Park et al. |
| 2017/0179763 A9 | 6/2017 | Leabman |

FOREIGN PATENT DOCUMENTS

| | | |
|---|---|---|
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 AO | 9/2011 |
| JP | 2006157586 A | 6/2006 |
| JP | 2007043432 A | 2/2007 |
| JP | 2008167017 A | 7/2008 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |

(56) References Cited

FOREIGN PATENT DOCUMENTS

WO    WO 2016048512 A1    3/2016
WO    WO 2016187357 A1    11/2016

OTHER PUBLICATIONS

International Search Report dated Sep. 15, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
Energous Corp., Written Opinion, PCT/US2014/037170 , dated Sep. 14, 2014, 7 pgs.
Energous Corp., IPRP, PCT/US2014/037170, dated Nov. 10, 2015, 8 pgs.
Energous Corp., Written Opinion, PCT/US2014/041534, dated Oct. 13, 2014, 6 pgs.
Energous Corp., IPRP, PCT/US2014/041534, dated Dec. 29, 2015, 7 pgs.
Energous Corp., IPRP, PCT/US2014/046956, dated Jan. 19, 2016, 7 pgs.
Energous Corp., Written Opinion, PCT/US2014/037072, dated Sep. 12, 2014, 5 pgs.
Energous Corp., IPRP, PCT/US2014/037072, dated Nov. 10, 2015, 6 pgs.
Energous Corp., ISRWO, PCT/US2014/068568, dated Mar. 20, 2015, 10 pgs.
Energous Corp., IPRP, PCT/US2014/068568, dated Jun. 14, 2016, 8 pgs.
Energous Corp., ISRWO, PCT/US2014/055195, dated Dec. 22, 2014, 11 pgs.
Energous Corp., IPRP, PCT/US2014/055195, dated Mar. 22, 2016, 9 pgs.
Energous Corp., ISRWO, PCT/US2015/067291, dated Mar. 4, 2016, 10 pgs.
Energous Corp., IPRP, PCT/US2015/067291, dated Jul. 4, 2017, 4 pgs.
Encrgous Corp., ISRWO, PCT/US2015/067242, dated Mar. 16, 2016, 9 pgs.
Energous Corp., IPRP, PCT/US2015/067242, dated Jun. 27, 2017, 7pgs.
Energous Corp., ISRWO, PCT/US2015/067243, dated Mar. 10, 2016, 11 pgs.
Energous Corp., IPRP, PCT/US2015/067243, dated Jun. 27, 2017, 7 pgs.
Energous Corp., ISRWO, PCT/US2014/037109, dated Apr. 8, 2016, 12 pgs.
Energous Corp., IPRP, PCT/US2014/037109, Apr. 12, 2016, 9 pgs.
Energous Corp., ISRWO, PCT/US2015/067275, dated Mar. 3, 2016, 8 pgs.
Energous Corp., IPRP, PCT/US2015/067275, dated Jul. 4, 2017, 7 pgs.
Energous Corp., ISRWO, PCT/US2015/067245, dated Mar. 17, 2016, 8 pgs.
Energous Corp., IPRP, PCT/US2015/067245, dated Jun. 27, 2017, 7 pgs.
Energous Corp., ISRWO, PCT/US2014/041546, dated Oct. 16, 2014, 12 pgs.
Energous Corp., IPRP, PCT/US2014/041546, dated Dec. 29, 2015, 9 pgs.
Energous Corp., ISRWO, PCT/US2015/67250, dated Mar. 30, 2016, 11 pgs.
Energous Corp., IPRP, PCT/US2015/67250, dated Mar. 30, 2016, 10 pgs.
Energous Corp., ISRWO, PCT/US2015/067325, dated Mar. 10, 2016, 9 pgs.
Encrgous Corp., IPRP, PCT/US2015/067325, dated Jul. 4, 2017, 8 pgs.
Energous Corp., ISRWO, PCT/US2014/040697, dated Oct. 10, 2014, 12 pgs.
Energous Corp., IPRP, PCT/US2014/040697, dated Dec. 8, 2015, 9 pgs.
Energous Corp., ISRWO, PCT/US2014/040705, dated Sep. 23, 2014, 8 pgs.
Energous Corp., IPRP, PCT/US2014/040705, dated Dec. 8, 2015, 6 pgs.
Energous Corp., ISRWO, PCT/US2015/067249, dated Mar. 29, 2016, 8 pgs.
Energous Corp., IPRP, PCT/US2015/067249, dated Jun. 27, 2017, 7 pgs.
Energous Corp., ISRWO, PCT/US2015/067246, dated May 11, 2016, 18 pgs.
Energous Corp., IPRP, PCT/US2015/067246, dated Jun. 27, 2017, 9 pgs.
Energous Corp., ISRWO, PCT/US2014/059317, dated Feb. 24, 2015, 13 pgs.
Encrgous Corp., IPRP, PCT/US2014/059317, dated Apr. 12, 2016, 10 pgs.
Energous Corp., ISRWO, PCT/US2014/049669, dated Nov. 13, 2014, 10 pgs.
Energous Corp., IPRP, PCT/US2014/049669, dated Feb. 9, 2016, 8 pgs.
Energous Corp., ISRWO, PCT/US2014/041323, dated Oct. 10, 2014, 10 pgs.
Energous Corp., IPRP, PCT/US2014/041323, dated Dec. 22, 2015, 8 pgs.
Energous Corp., ISRWO, PCT/US2014/048002, dated Nov. 13, 2014. 11 pgs.
Energous Corp., IPRP, PCT/US2014/048002, dated Feb. 12, 2015 8 pgs.
Energous Corp., ISRWO, PCT/US2014/062682, dated Feb. 12, 2015, 10 pgs.
Energous Corp., IPRP, PCT/US2014/062682, dated May 3, 2016, 8 pgs.
Energous Corp., ISRWO, PCT/US2014/049666, Nov. 10, 2014, 7 pgs.
Energous Corp., IPRP, PCT/US2014/049666, dated Feb. 9, 2016, 5 pgs.
Energous Corp., ISRWO, PCT/US2014/046961, dated Nov. 24, 2014. 16 pgs.
Energous Corp., IPRP, PCT/US2014/046961, dated Jan. 19, 2016, 8 pgs.
Energous Corp., ISRWO, PCT/US2015/067279, dated Mar. 11, 2015, 13 pgs.
Energous Corp., IPRP, PCT/US2015/067279, dated Jul. 4, 2017, 7 pgs.
Energous Corp., ISRWO, PCT/US2014/041342, dated Jan. 27, 2015, 10 pgs.
Energous Corp., IPRP, PCT/US2014/041342, dated Dec. 15, 2015, 8 pgs.
Energous Corp., ISRWO, PCT/US2014/046941, dated Nov. 6, 2014, 11 pgs.
Energous Corp., IPRP, PCT/US2014/046941, dated Jan. 19, 2016, 9 pgs.
Energous Corp., ISRWO, PCT/US2014/062661, dated Jan. 27, 2015, 12 pgs.
Energous Corp., IPRP, PCT/US2014/062661, dated May 3, 2016, 10 pgs.
Energous Corp., ISRWO, PCT/US2014/059871, dated Jan. 23, 2015, 12 pgs.
Energous Corp., IPRP, PCT/US2014/059871, dated Apr. 12, 2016, 9 pgs.
Energous Corp., ISRWO, PCT/US2014/045102, dated Oct. 28, 2014, 14 pgs.

(56) References Cited

OTHER PUBLICATIONS

Energous Corp., IPRP, PCT/US2014/045102, dated Jan. 12, 2016, 11 pgs.
Energous Corp., ISRWO, PCT/US2014/059340, dated Jan. 15, 2015, 13 pgs.
Energous Corp., IPRP, PCT/US2014/059340, dated Apr. 12, 2016, 11 pgs.
Energous Corp., ISRWO, PCT/US2015/067282, dated Jul. 5, 2016, 7 pgs.
Energous Corp., IPRP, PCT/US2015/067282, dated Jul. 4, 2017, 6 pgs.
Energous Corp., ISRWO, PCT/US2014/041558, dated Oct. 10, 2014, 8 pgs.
Energous Corp., IPRP, PCT/US2014/041558, dated Dec. 29, 2015, 6 pgs.
Energous Corp., ISRWO, PCT/US2014/045119, dated Oct. 13, 2014, 11 pgs.
Energous Corp., IPRP, PCT/US2014/045119, dated Jan. 12, 2016, 9 pgs.
Energous Corp., ISRWO PCT/US2014/045237, dated Oct. 13, 2014, 16 pgs.
Energous Corp., IPRP, PCT/US2014/045237, dated Jan. 12, 2016. 12 pgs.
Energous Corp., ISRWO, PCT/US2014/054897, dated Feb. 17, 2015, 10 pgs.
Energous Corp., IPRP, PCT/US2014/054897, dated Mar. 15, 2016, 8 pgs.
Energous Corp., ISRWO, PCT/US2015/067334, dated Mar. 3, 2016, 6 pgs.
Energous Corp., IPRP, PCT/US2015/067334, dated Jul. 4, 2017, 5 pgs.
Energous Corp., ISRWO, PCT/US2014/047963, dated Nov. 7, 2014, 13 pgs.
Energous Corp., IPRP, PCT/US2014/047963, dated Jan. 26, 2016, 10 pgs.
Energous Corp., ISRWO, PCT/US2014/054891, dated Dec. 18, 2014, 12 pgs.
Energous Corp., IPRP, PCT/US2014/054891, dated Mar. 15, 2016, 10 pgs.
Energous Corp.. ISRWO, PCT/US2014/054953, dated Dec. 4, 2014, 7 pgs.
Energous Corp., IPRP, PCT/US2014/054953, dated Mar. 22, 2016, 5 pgs.
Energous Corp., ISRWO, PCT/US2015/067294, dated Mar. 29, 2016, 7 pgs.
Energous Corp., IPRP, PCT/US2015/067294, dated Jul. 4, 2017, 6 pgs.
Energous Corp., ISRWO, PCT/US2014/062672 dated Jan. 26, 2015, 11 pgs.
Energous Corp., IPRP, PCT/US2014/062672 dated May 10, 2016, 8 pgs.
Energous Corp., ISRWO, PCT/US2014/044810 dated Oct. 21, 2014, 12 pgs.
Energous Corp., IPRP, PCT/US2014/044810, dated Jan. 5, 2016, 10 pgs.
Energous Corp., ISRWO, PCT/US2015/067271, dated Mar. 11, 2016, 6 pgs.
Energous Corp., IPRP, PCT/US2015/067271, dated Jul. 4, 2017, 5 pgs.
Energous Corp., ISRWO, PCT/US2014/040648, dated Oct. 10, 2014, 11 pgs.
Energous Corp., IPRP, PCT/US2014/040648, dated Dec. 8, 2015, 8 pgs.
Energous Corp., ISRWO, PCT/US2014/049673, dated Nov. 18, 2014, 10 pgs.
Energous Corp., IPRP, PCT/US2014/049673, dated Feb. 9, 2016, 6 pgs.
Energous Corp., ISRWO, PCT/US2014/068282, dated Mar. 19, 2015, 13 pgs.
Energous Corp., IPRP, PCT/US2014/068282, dated Jun. 7, 2016, 10 pgs.
Energous Corp., ISRWO, PCT/US2014/068586, dated Mar. 20, 2015, 11 pgs.
Energous Corp., IPRP, PCT/US2014/068586, dated Jun. 14, 2016, 8 pgs.
Energous Corp., ISRWO, PCT/US2016/068504, dated Mar. 30, 2017, 8 pgs.
Energous Corp., ISRWO, PCT/US2016/068495, dated Mar. 30, 2017, 9 pgs.
Energous Corp., ISRWO, PCT/US2015/067287, dated Feb. 2, 2016, 8 pgs.
Energous Corp., IPRP, PCT/US2015/067287, dated Jul. 4, 2017, 6 pgs.
Energous Corp., ISRWO, PCT/US2016/068551, dated Mar. 17, 2017, 8 pgs.
Energous Corp., ISRWO, PCT/US2016/068498, dated May 17, 2017, 8 pgs.
Energous Corp., ISRWO, PCT/US2016/068993, dated Mar. 13, 2017, 12 pgs.
Energous Corp., ISRWO, PCT/US2016/068565, dated Mar. 8, 2017, 11 pgs.
Energous Corp., ISRWO, PCT/US2016/068987, dated May 8, 2017, 10 pgs.
Energous Corp., ISRWO, PCT/US2016/069316 , dated Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.5, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334.

(56) References Cited

OTHER PUBLICATIONS

Zhai, "A Practical wireless charging system based on ultra-wideband retro-reflective beamfonning" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1—15 and Electronics Engineers: "Broadband microstrip array antennas" Digest of the Antennas and Propagation Society International Symposium. Seattle, WA Jun. 19-24, 1994. Abstract 3 pgs.
Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.

\* cited by examiner

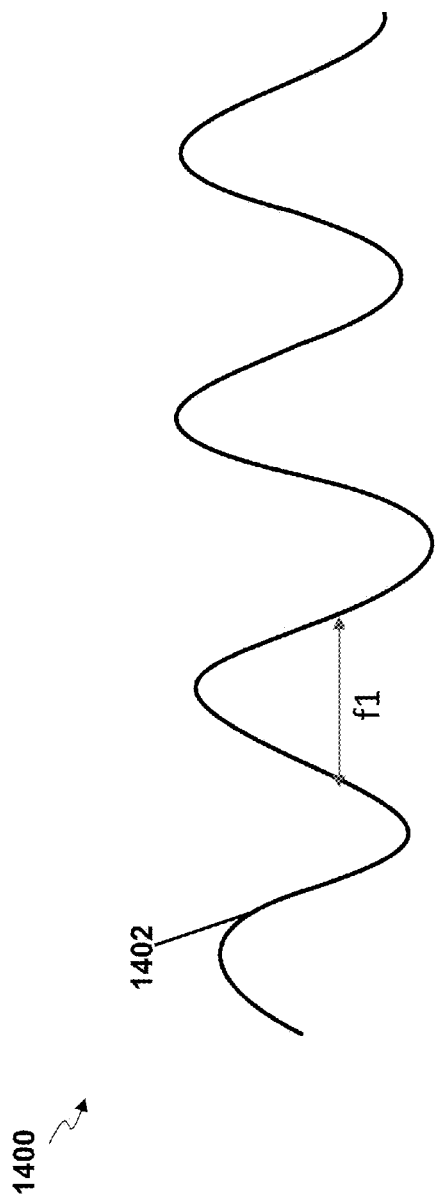
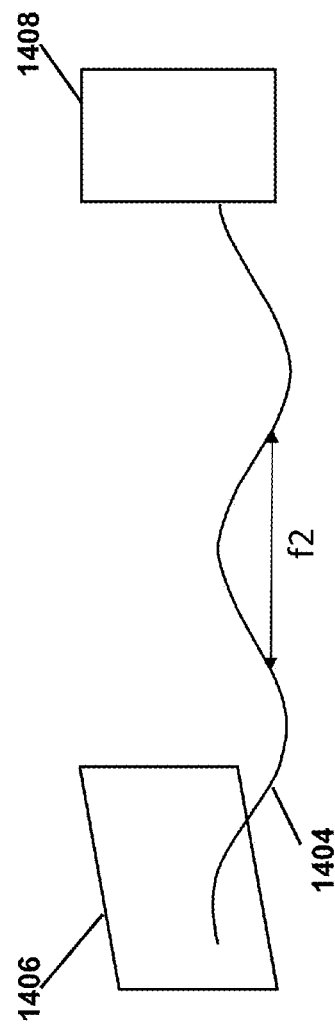
FIG. 14A
FIG. 14B

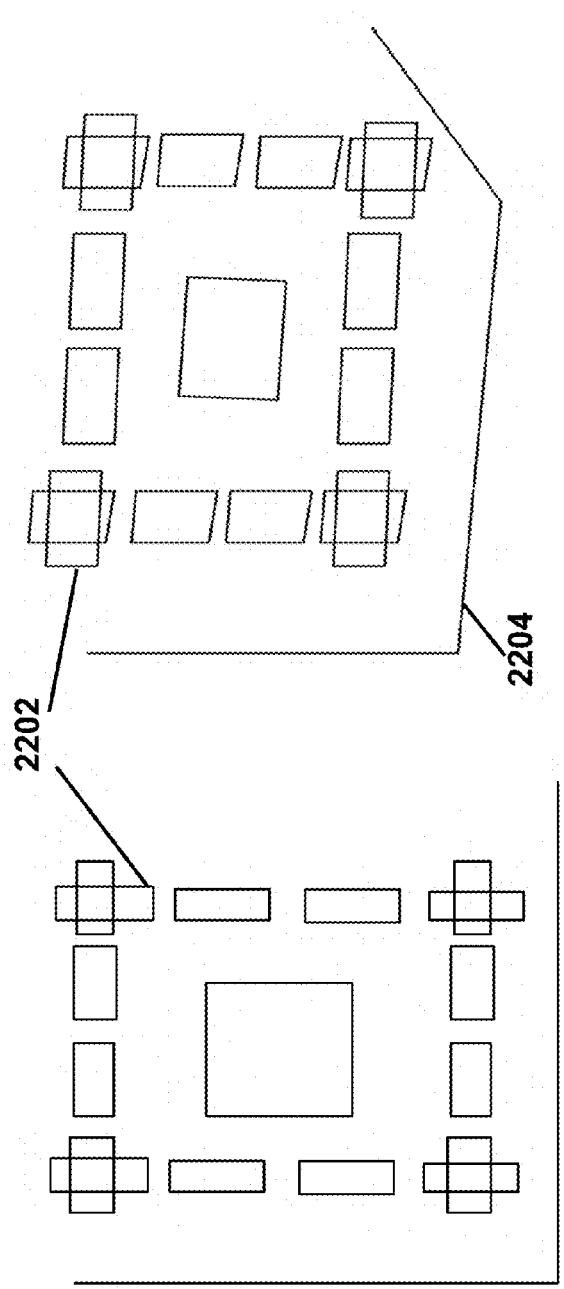
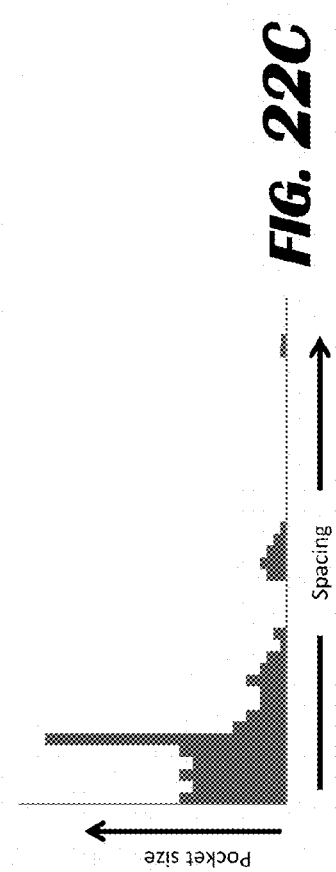
FIG. 22A
FIG. 22B
FIG. 22C

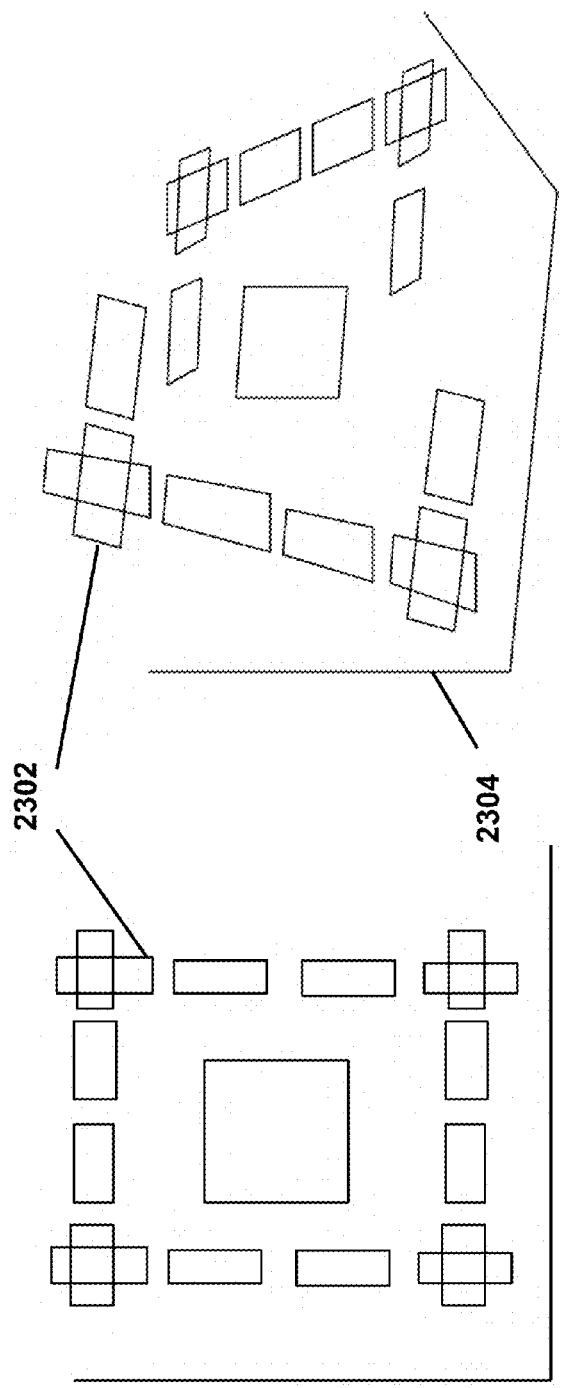
FIG. 23A
FIG. 23B
FIG. 23C

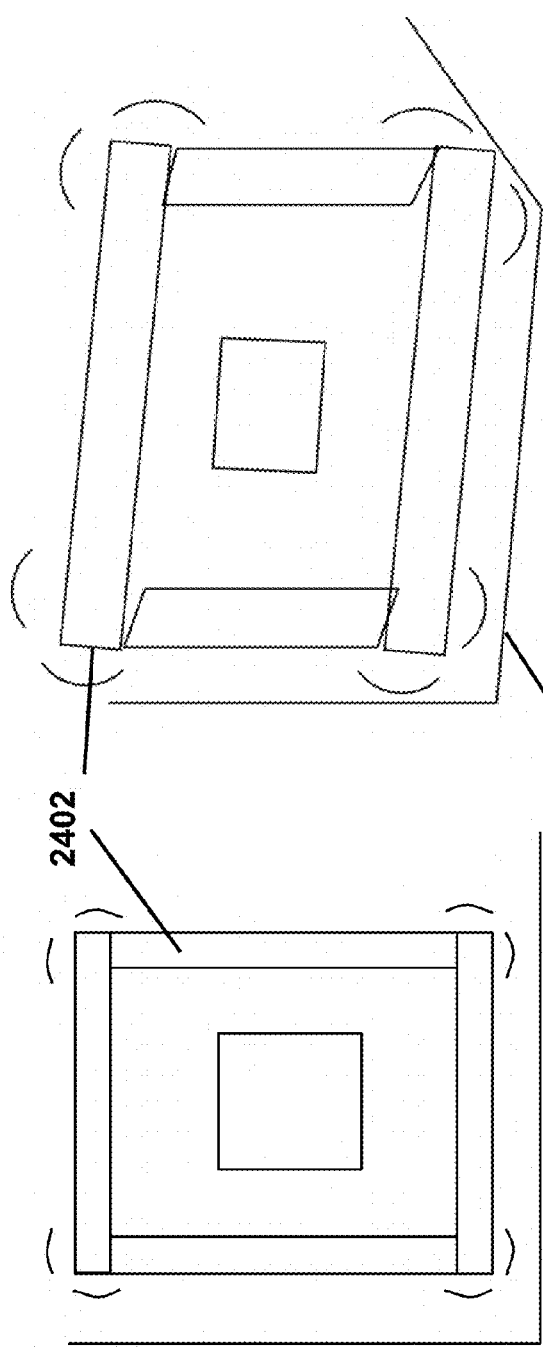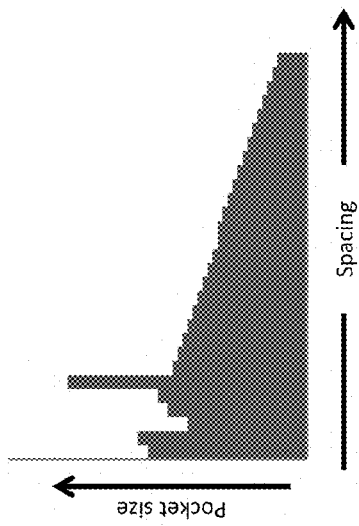
FIG. 24A  FIG. 24B  FIG. 24C

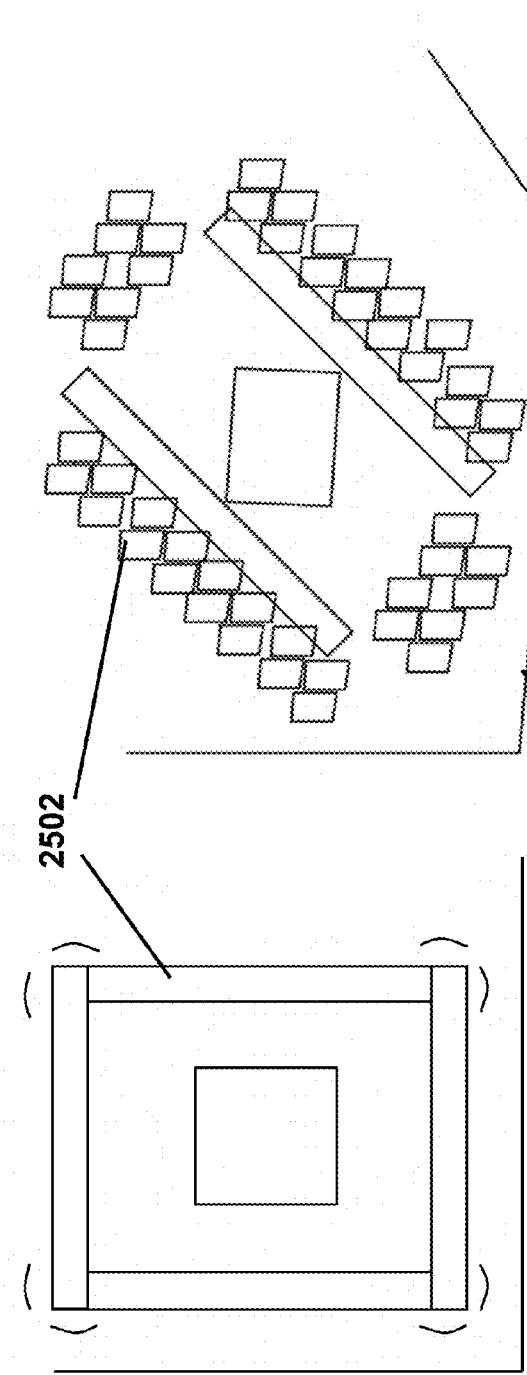
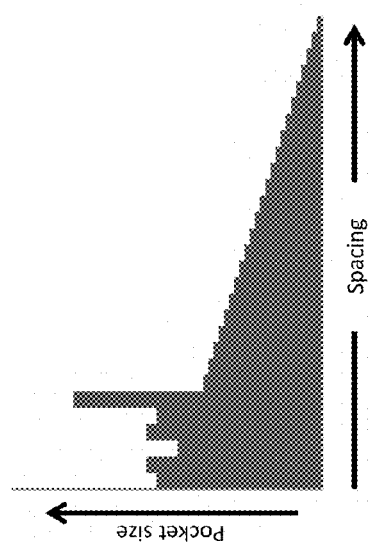
FIG. 25A
FIG. 25B
FIG. 25C

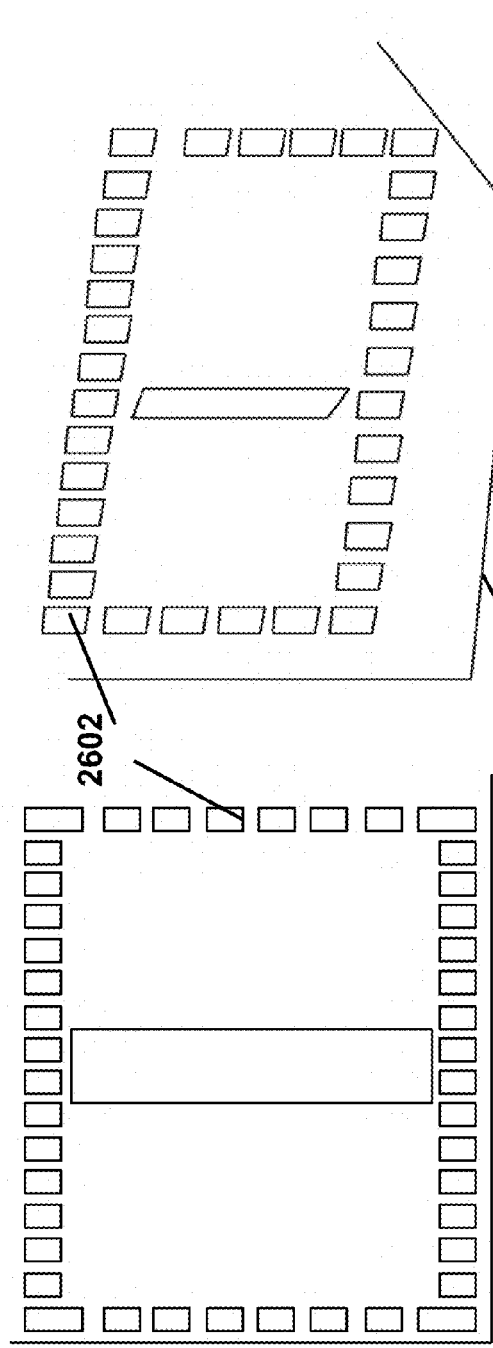
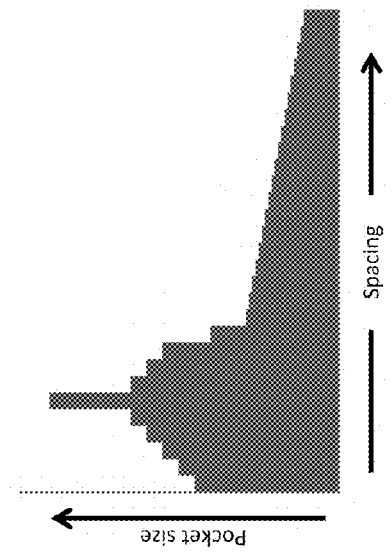
FIG. 26A
FIG. 26B
FIG. 26C

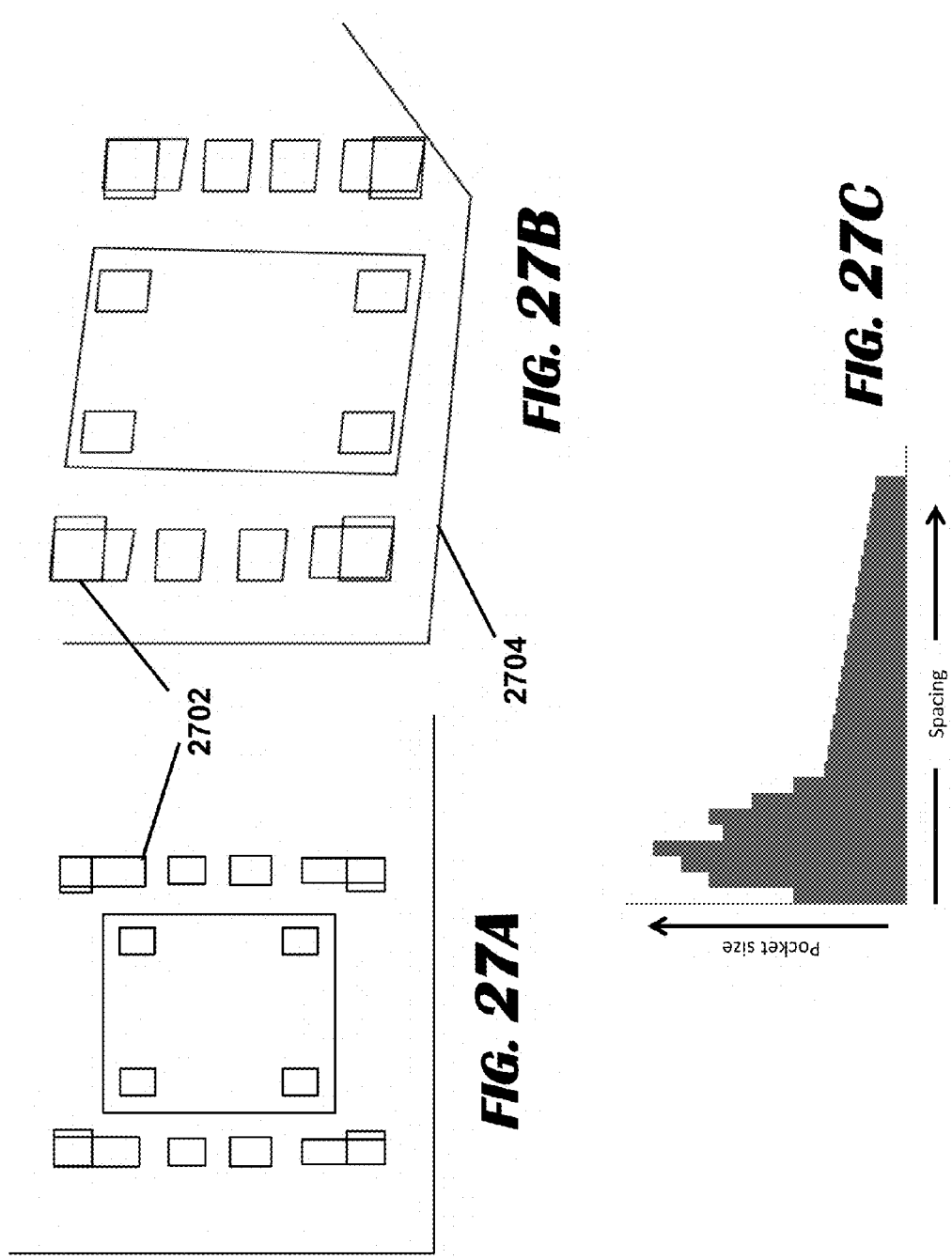

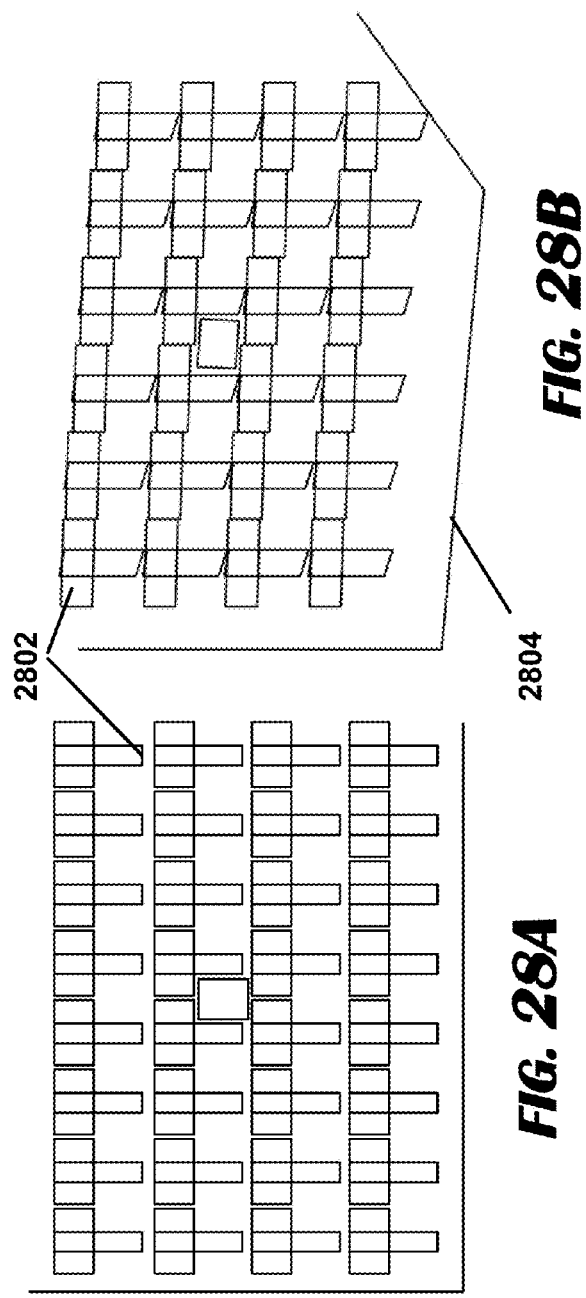

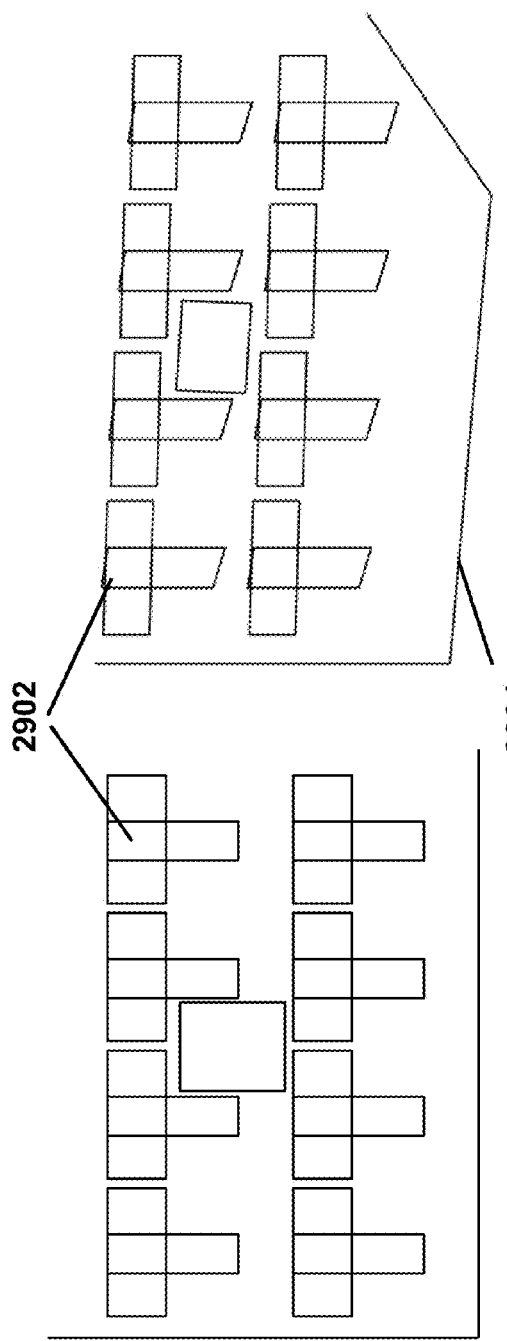
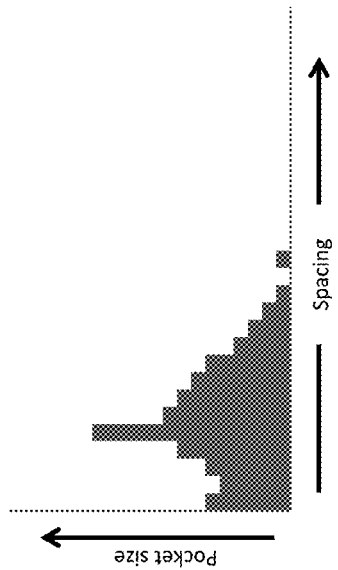
FIG. 29A
FIG. 29B
FIG. 29C

SYSTEMS AND METHODS FOR IDENTIFYING SENSITIVE OBJECTS IN A WIRELESS CHARGING TRANSMISSION FIELD

TECHNICAL FIELD OF DISCLOSURE

This application generally relates to wireless charging systems and the hardware and software components used in such systems.

BACKGROUND

Numerous attempts have been made to wirelessly transmit energy to electronic devices, where a receiver device can consume the transmission and convert it to electrical energy. However, most conventional techniques are unable to transmit energy at any meaningful distance. For example, magnetic resonance provides electric power to devices without requiring an electronic device to be wired to a power resonator. However, the electronic device is required to be proximately located to a coil of the power resonator (i.e., within a magnetic field). Other conventional solutions may not contemplate user mobility for users who are charging their mobile devices or such solutions do not allow devices to be outside of a narrow window of operability.

Wirelessly powering a remote electronic device requires a means for identifying the location of electronic devices within a transmission field of a power-transmitting device. Conventional systems typically attempt to proximately locate an electronic device, so there are no capabilities for identifying and mapping the spectrum of available devices to charge, for example, in a large coffee shop, household, office building, or other three-dimensional space in which electrical devices could potentially move around. Moreover, what is needed is a system for managing power wave production, both for directionality purposes and power output modulation. Because many conventional systems do not contemplate a wide range of movement of the electronic devices they service, what is also needed is a means for dynamically and accurately tracking electronic devices that may be serviced by the power-transmitting devices.

Wireless power transmission may need to satisfy certain regulatory requirements. These devices transmitting wireless energy may be required to adhere to electromagnetic field (EMF) exposure protection standards for humans or other living beings. Maximum exposure limits are defined by US and European standards in terms of power density limits and electric field limits (as well as magnetic field limits). Some of these limits are established by the Federal Communications Commission (FCC) for Maximum Permissible Exposure (MPE), and some limits are established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter (W/m2), milliwatts per square centimeter (mW/cm2), or microwatts per square centimeter (μW/cm2).

Accordingly, it is desirable to appropriately administer the systems and methods for wireless power transmission to satisfy these regulatory requirements. What is needed is a means for wireless power transmission that incorporates various safety techniques to ensure that humans or other living beings within a transmission field are not exposed to EMF energy near or above regulatory limits or other nominal limits. What is needed is a means for monitoring and tracking objects within a transmission field in real-time and providing a means for controlling the production of power waves to adaptively adjust to the environment within the transmission field.

SUMMARY

Disclosed herein are systems and methods intended to address the shortcomings in the art and may provide additional or alternative advantages as well. Embodiments disclosed herein may generate and transmit power waves that, as result of their physical waveform characteristics (e.g., frequency, amplitude, phase, gain, direction), converge at a predetermined location in a transmission field to generate a pocket of energy. Receivers associated with an electronic device being powered by the wireless charging system, may extract energy from these pockets of energy and then convert that energy into usable electric power for the electronic device associated with a receiver. The pockets of energy may manifest as a three-dimensional field (e.g., transmission field), where energy may be harvested by receivers positioned within or nearby a pocket of energy. In some embodiments, transmitters may perform adaptive pocket forming by adjusting transmission of the power waves in order to regulate power levels based on inputted sensor data from sensors or to avoid certain objects. A technique for identifying receivers in the transmission field may be employed to determine where pockets of energy should be formed and where power waves should be transmitted. This technique may result in heat-map data, which is a form of mapping data that may be stored into a mapping memory for later reference or computations. The sensors may generate sensor data that may identify areas that the power waves should avoid. This sensor data may be an additional or alternative form of mapping data, which may also be stored into a mapping memory for later reference or computation.

In one embodiment, a processor-implemented method comprises determining, by a transmitter, a location within a transmission field to transmit one or more power waves based upon sensor data from a sensor indicating a region to avoid and heat-map data from a communications signal indicating a region containing a receiver; and transmitting, by the transmitter, the one or more power waves into the transmission field based upon the location, wherein the one or more power waves converge at the location.

In another embodiment, a processor-implemented method comprises, in response to a transmitter receiving sensor data from one or more sensors: identifying, by the transmitter, a location of a sensitive object in a transmission field based upon the sensor data; in response to receiving from a receiver a feedback signal indicating a location of the receiver in the transmission field; determining, by the transmitter, a pocket location within the transmission field, wherein the pocket location exceeds a threshold distance from the location of the sensitive object and is at least proximate to the location of the receiver; and transmitting, by the transmitter, the one or more power waves to the pocket location within the transmission field.

In another embodiment, a system comprises a transmitter comprising a sensor configured to detect a sensitive object in a transmission field and generate sensor data indicating a location of the sensitive object, and a communications component configured to communicate one or more communication signals with one or more receivers, wherein the transmitter is configured to: identify a location of a sensitive object in the transmission field upon receiving sensor data from the sensor, determine a pocket location within the transmission field in response to the transmitter receiving from a receiver a feedback communication signal indicating a location of the receiver in the transmission field, the pocket location exceeding a threshold distance from the location of the sensitive object and is at least proximate to the location of the receiver, and transmit the one or more power waves to the pocket location within the transmission field.

In another embodiment, a computer-implemented method comprises receiving, by a communications component of a user device and from a transmitter, a communications signal indicating one or more characteristics of one or more power waves transmitted by the transmitter, at least one characteristic is a power level for the one or more power waves; identifying, by the user device located at a receiver location, an amount of energy received from the one or more power waves; determining, by the user device, a pocket location for a pocket of energy, wherein the pocket location is where the one or more power waves having the one or more characteristics converge in the transmission field; and when the pocket location has a higher power level than the receiver location, generating and displaying, by the user device, a user interface having an indicator indicating a direction to the pocket location relative to the receiver location.

In another embodiment, a user device comprises a wireless communications component configured to receive from a transmitter a communications signal containing one or more parameters indicating one or more characteristics for one or more power waves; one or more antennas configured to gather power from a pocket of energy formed by the one or more power waves converging at a pocket location; and a receiver processor configured to: identify an amount of energy received from the one or more power waves; identify an amount of energy transmitted in the one or more power waves, based upon one or more parameters received in the communications signal; determine the pocket location; and generate and display a user interface having an indicator that indicates a direction to the pocket location relative to a receiver location.

In another embodiment, a computer-implemented method comprises transmitting, by a transmitter, a low power wave to each of a plurality of segments in a transmission field; in response to the transmitter receiving a communications signal from a receiver containing data indicating a segment containing the receiver: transmitting, by the transmitter, one or more power waves configured to converge at the segment containing the receiver.

A computer-implemented method comprises transmitting, by a transmitter device, into a transmission field associated with the transmitter device one or more power waves and a communications signal, the communications signal containing a first set of transmission parameters defining one or more characteristics of the one or more power waves; in response to the transmitter receiving via the communications signal from a receiver device, device data indicating a location of the receiver in the transmission field: transmitting, by the transmitter device, a second set of transmission parameters into a sub-segment of the transmission field in accordance with the device data, the second set of transmission parameters defining the one or more characteristics of the one or more power waves; determining, by the transmitter device, one or more refined characteristics for the one or more power waves, based upon a set of one or more refined parameters defining the one or more refined characteristics, the refined parameters based upon refined location data received from the receiver device indicating a refined location within the sub-segment; generating, by the transmitter device, the one or more refined power waves having the one or more refined characteristics, according to the set of refined parameters; and transmitting, by the transmitter, the one or more refined power waves into the sub-segment of the transmission field, thereby forming a pocket of energy at the refined location.

In another embodiment, a wireless power system comprises a mapping memory comprising non-transitory machine-readable storage media configured to store one or more receiver records containing data for one or more receivers; one or more transmitters associated with a transmission field, a transmitter comprising: an antenna array configured to transmit an exploratory power wave into one or more segments of a transmission field; a communications component configured to: transmit to each respective segment of the transmission field a set of parameters indicating one or more characteristics of the exploratory power wave transmitted into the respective segment, and transmit to a sub-segment of a first segment a second set of parameters indicating one or more refined characteristics of a second exploratory power wave transmitted into the sub-segment, upon receiving location data indicating the receiver is in the first segment from a receiver device at a location in a first segment; and a transmitter processor configured to determine the one or more characteristics for the exploratory wave based upon one or more parameters for each respective segment of the transmission field, and determine the one or more refined characteristics for the second exploratory power wave upon receiving the first segment location data from the receiver.

In another embodiment, a device-implemented method comprises receiving, by a transmitter and from a receiver, a communication signal via a communication channel, the communication signal containing one or more parameters identifying a first location of the receiver within a transmission field associated with the transmitter; upon receiving the one or more parameters: storing, by the transmitter, the one or more parameters for the receiver into a mapping memory comprising non-transitory machine-readable storage media configured to store the one or more parameters; and transmitting, by the transmitter, the one or more power waves to the first location in accordance with the one or more parameters; and upon receiving one or more updated parameters from the receiver: transmitting, by the transmitter, the one or more power waves to a second location in accordance with the one or more updated parameters.

In another embodiment, a wireless charging system comprises a mapping memory database hosted in non-transitory machine-readable storage media configured to store one or more records of one or more locations in a transmission field associated with one or more transmitters; and a transmitter comprising: a communications component configured to receive from a receiver a communications signal containing one or more parameters identifying a first location of the receiver; and an antenna array comprising one or more antennas configured to transmit one or more power waves to the first location in the transmission field, and transmit the one or more power waves to the second location in the transmission field in accordance with one or more updated parameters, upon the communications component receiving the one or more updated parameters.

In another embodiment, a device-implemented method comprises transmitting, by a transmitter, an exploratory wave to a first segment of a transmission field comprising a plurality of segments; determining, by the transmitter, a sub-segment of the first segment containing a receiver upon receiving a communications signal from the receiver indicating that the receiver received the exploratory wave in the sub-segment of the first segment.

In another embodiment, a method comprises transmitting, by a transmitter, to a plurality of segments of a transmission field sequentially, an exploratory power wave and a communications signal for each respective segment in the transmission field, wherein the communications signal transmitted to each respective segment contains data indicating the respective segment to which the exploratory power wave is transmitted; upon receiving a response message from a receiver at a first location within a first segment of the transmission field: transmitting, by the transmitter, sequentially to one or more sub-segments of the first segment, an exploratory power wave and a communications signal, for each respective sub-segment in the first segment, wherein the communications signal transmitted to each respective sub-segment contains data indicating the respective sub-segment to which the exploratory power wave is transmitted; determining, by the transmitter, a set of one or more characteristics of one or more power waves to transmit to the receiver at the first location; and generating, by the transmitter, the one or more power waves having the one or more characteristics.

In another embodiment, a wireless charging system comprises a mapping database comprising non-transitory machine-readable storage media configured to store one or more records of one or more receivers in a transmission field; and a transmitter comprising: an array of one or more antennas configured to transmit one or more power waves having one or more characteristics according to a transmitter processor; a communications component configured to communicate one or more communications signals with one or more receivers according to the transmitter processor; and the transmitter processor comprising instructions for the transmitter to: transmit a plurality of segments of a transmission field sequentially, an exploratory power wave and a communications signal, for each respective segment in the transmission field, wherein the communications signal transmitted to each respective segment contains data indicating the respective segment to which the exploratory power wave is transmitted; upon receiving a response message from a receiver at a first location within a first segment of the transmission field, transmit sequentially to one or more sub-segments of the first segment, an exploratory power wave and a communications signal, for each respective sub-segment in the first segment, wherein the communications signal transmitted to each respective sub-segment contains data indicating the respective sub-segment to which the exploratory power wave is transmitted; determine a set of one or more characteristics of one or more power waves to transmit to the receiver at the first location; and generate the one or more power waves having the one or more characteristics.

In another embodiment, a computer-implemented method comprises receiving, by a receiver device, from a transmitter device, an exploratory power wave and a communications signal requesting a feedback communications signal based upon the exploratory power wave; transmitting, by the receiver, the feedback communications signal containing data indicating a location of the receiver relative to the transmitter within a transmission field; receiving, by the receiver, a second exploratory power wave and a second communications signal requesting a second feedback communications signal based upon the second exploratory power wave; and transmitting, by the receiver, the second feedback communications signal containing data indicating a comparatively more granular location of the receiver relative to the transmitter within the transmission field.

In another embodiment, a receiver device comprises an antenna array comprising one or more antennas, an antenna configured to receive one or more power waves and capture energy from the one or more power waves; a communications component configured to receive one or more communications signals from a transmitter; and a receiver processor instructing the receiver to: receive from a transmitter device an exploratory power wave and a communications signal requesting a feedback communications signal based upon the exploratory power wave; transmit the feedback communications signal containing data indicating a location of the receiver relative to the transmitter within a transmission field; receive a second exploratory power wave and a second communications signal requesting a second feedback communications signal based upon the second exploratory power wave; and transmit the second feedback communications signal containing data indicating a comparatively more granular location of the receiver relative to the transmitter within the transmission field.

In another embodiment, a method for wireless power transmission comprises acquiring, by at least one sensor in communication with a transmitter, data indicating a presence of an electrical apparatus; determining, by the transmitter, whether the electrical apparatus is a receiver designated to receive power from the transmitter according to data stored in a record stored in a database; and transmitting, by the transmitter, one or more power waves to the electrical apparatus upon determining the electrical apparatus is designated to receive power from the transmitter, wherein the one or more power waves are transmitted to converge in a three dimensional space to form one or more pockets of energy at a location associated with the electrical apparatus.

In another embodiment, a transmitter for wireless power transmission comprises at least two antennas; a controller configured to control power waves broadcast by the transmitter through the at least two antennas that converge in a three dimensional space to form one or more pockets of energy; a database operatively coupled to the controller, including identifying information for a device designated to receive power from the transmitter; and at least one sensor configured to sense the presence of an electrical apparatus and communicate to the controller data indicating the presence of the electrical apparatus; wherein the controller compares the data indicating the presence of the electrical apparatus with the identifying information to determine whether that device is designated to receive power from the transmitter, and if the device is designated to receive power from the transmitter, then the transmitter broadcasts through the at least two antennas the power waves that converge in the three dimensional space to form the one or more pockets of energy for receiving by the electrical apparatus to charge or power the electrical apparatus.

A method for wireless power transmission, comprising acquiring, by at least one sensor in communication with a transmitter, data indicating the presence of an electrical apparatus; matching, by the transmitter, the data indicating the presence of the electrical apparatus to identifying information for a device designated to receive power from the transmitter; and transmitting, by the transmitter, power waves that converge in a three dimensional space to form one or more pockets of energy to charge or power the electrical apparatus.

In another embodiment, a device-implemented method comprises receiving, by a transmitter, from a tagging device, a device tag containing data indicating a first location of a first receiver device; determining, by the transmitter, one or more characteristics of one or more power waves to transmit to the first receiver device based upon the first location as indicated by the device tag; and transmitting, by the transmitter, the one or more power waves having the one or more characteristics to the first location indicated by the device tag.

In another embodiment, a system comprises a mapping memory configured to store one or more records of one or more receivers, each respective record containing data indicating a location of a receiver; a tagging device configured to generate a device tag containing tagging data for a receiver, the tagging data configured to generate data indicating a location of the receiver and instructions for one or more transmitters to transmit one or more power waves to the location of the receiver; and a transmitter comprising an array of antennas configured to transmit one or more power waves to the location of the receiver as indicated by the device tag for the receiver in the memory database.

In another embodiment, a system comprises a transmitter configured to receive sensor data from a sensor device coupled to the transmitter, determine whether the sensor data identifies an object to avoid, and transmit one more power waves that avoid the object.

In another embodiment, a method for wireless power transmission comprises transmitting, by a transmitter, power waves that converge in a three dimensional space to form one or more first pockets of energy at a predetermined location for receiving by an antenna element of a receiver, wherein the receiver is configured to harvest power from the one or more first pockets of energy at the predetermined location; acquiring, by at least one sensor in communication with the transmitter, data indicating presence of a living being or a sensitive object; obtaining, by the transmitter, information relating to a location of the living being or the sensitive object based upon the data indicating the presence of the living being or the sensitive object; and determining, by the transmitter, whether to adjust a power level of the power waves that converge in the three dimensional space to form the one or more first pockets of energy at the predetermined location in response to the information relating to the location of the living being or the sensitive object.

In another embodiment, a transmitter for wireless power transmission comprises at least two antennas; a controller that controls power waves broadcast by the transmitter through the at least two antennas that converge in a three dimensional space to form one or more pockets of energy at a predetermined location for receiving by an antenna element of a receiver; a transmitter housing containing the at least two antennas; and at least one sensor located on the transmitter housing to sense presence of a living being or a sensitive object, and to communicate to the controller data relating to the presence of the living being or the sensitive object; wherein the controller determines whether to adjust a power level of the power waves that converge in the three dimensional space to form the one or more pockets of energy at the predetermined location in response to the data relating to the presence of the living being or the sensitive object.

In another embodiment, a method for wireless power transmission, comprises transmitting, by a transmitter, power waves that converge in a three dimensional space to form a one or more pockets of energy at a predetermined location for receiving by antenna elements of a receiver, wherein the receiver harvests power from the one or more pockets of energy at the predetermined location; acquiring, by a plurality of sensors in communication with the transmitter, data indicating presence of a living being or a sensitive object; obtaining, by the transmitter, information relating to a location of the living being or the sensitive object based upon the data indicating the presence of the living being or the sensitive object; and at least reducing, by the transmitter, the power level of the power waves that converge in the three dimensional space to form the one or more pockets of energy at the predetermined location, when the data relating to the presence of the living being or the sensitive object indicates that the living being or the sensitive object is proximate to the three dimensional space at the predetermined location.

In another embodiment, a method for wireless power transmission, comprises determining, by a transmitter, whether to transmit one or more power waves to a receiver location by comparing the receiver location and a path of the one or more power waves with a stored location of an entity to be excluded from receipt of the power waves; and upon determining that the entity to be excluded is not at the receiver location and not in the path, transmitting, by the transmitter, the one or more power waves to converge at the receiver location.

In another embodiment, a transmitter for wireless power transmission comprises at least two antennas; a database operatively coupled to a controller, including a stored location indicating a location in transmission field for an entity to be excluded from receiving one or more power waves; and the controller configured to control the one or more power waves broadcast by the transmitter through the at least two antennas that converge in a three dimensional space to form one or more pockets of energy at a receiver location, whereby the controller is configured to determine whether the stored location for the entity to be excluded is at the receiver location or in a path of the one or more power waves when transmitted to the receiver location, and transmit the one or more power waves upon determining that the entity to be excluded is not at the receiver location or in the path to the receiver location.

In another embodiment, a method for wireless power transmission comprises receiving, by a transmitter, from a tagging device, a device tag containing data indicating a first location of an entity to be excluded from receipt of power waves; determining, by the transmitter, a second location of a receiver and a path of one or more power waves to the receiver; determining, by the transmitter, whether the first location as indicated by the device tag is the same as the second location or in the path of the one more power waves; and transmitting, by the transmitter, the one or more power waves when the first location is not the same as the second location or in the path of the one or more power waves.

In another embodiment, a method in wireless power transmission system, the method comprising: determining, by a transmitter, one or more parameters indicated by sensor data and mapping data; determining, by the transmitter, an output frequency of the one or more power waves based on the one or more parameters; selecting, by the transmitter, one or more antennas in one or more antenna arrays of the transmitter based upon the one or more parameters and a spacing between the one or more antennas in each of the one or more antenna arrays; and transmitting, by the transmitter, one or more power waves using the output frequency and the selected antennas.

In another embodiment, a system for wireless power transmission, the system comprising: one or more transmitters, each of the one or more transmitters comprising: one or more antenna arrays, each of the one or more antenna arrays comprising one or more antennas configured to transmit power waves; a microprocessor is configured to, based on one or more parameters, adjust a transmission of power waves by selecting one or more additional transmitters, varying an output frequency of power waves, varying a selection of antennas in one or more antenna arrays, or selecting antennas to adjust spacing between the one or more antennas in each of the one or more antenna array, to form a pocket of energy to power an electronic device.

In another embodiment, a method for wireless power transmission, the method comprising: determining, by a transmitter, one or more transmission parameters based upon mapping data and sensor data; determining, by the transmitter, one or more characteristics of power waves corresponding to the one or more transmission parameters, wherein the one or more characteristics includes an amplitude and a frequency; generating, by a waveform generator of the transmitter, one or more power waves having the one or more characteristics according to the one or more transmission parameters, wherein the one or more power waves are non-continuous waves; and adjusting, by the waveform generator of the transmitter, the frequency and the amplitude of the one or more power waves based on one or more updates to the one or more transmission parameters corresponding to the one or more characteristics of the one or more power waves.

In another embodiment, a system for wireless power transmission, the system comprising: one or more transmitters configured to determine one or more transmission parameters based on mapping data and sensor data, each of the one or more transmitters comprising: one or more antenna arrays configured to transmit power waves, each of the one or more antenna arrays comprising one or more antennas; and a waveform generator configured to generate one or more power waves, wherein the one or more power waves are non-continuous waves, and wherein the waveform generator is further configured to adjust a frequency and an amplitude that increases and decreases based on the one or more transmission parameters.

In another embodiment, a method for wireless power transmission, the method comprising: receiving, by the transmitter, location data about a location associated with one or more objects within a transmission field of the transmitter; transmitting, by the transmitter, one or more power waves to converge to form a pocket of energy at a location of a target electronic device; and transmitting, by the transmitter, one or more power waves to converge to form a null space at the location of the one or more objects.

In another embodiment, a system for wireless power transmission, the system comprising: one or more transmitters, each of the one or more transmitters comprising one or more antenna arrays, each of the one or more antenna arrays comprising one or more antennas to transmit one or more power waves to generate a null space at a location based on received location data that the location of one or more objects is within a transmission field of the one or more transmitters.

In another embodiment, a system for wireless power transmission, the system comprising: one or more transmitters, each of the one or more transmitters comprising one or more antenna arrays configured to transmit one or more power waves, wherein a first antenna of a first antenna array is located at a distance from a second antenna of a second antenna array such that the one or more power waves transmitted by the plurality of antennas are directed to form a pocket of energy to power an targeted electronic device, wherein the transmitter is configured to determine the distance between the first and second antennas based upon one or more parameters received in a communication signal from the targeted electronic device.

In another embodiment, a system for wireless power transmission, the system comprising: a transmitter comprising: one or more antenna arrays, each of the one or more antenna arrays comprises a plurality of antennas, each of the antennas configured to transmit one or more power waves; and a microprocessor configured to activate a first set of antennas of the plurality of antennas based on a target for directing a pocket of energy using the one or more power waves, wherein the first set of antennas are selected from the plurality of antennas based on a distance between antennas of the first set of antennas.

In another embodiment, a system for wireless power transmission, the system comprising: a transmitter comprising at least two antenna arrays, wherein each of the at least two antenna arrays comprises at least one row or at least one column of antennas configured to transmit one or more power waves; and a microprocessor configured to control transmissions of power waves from one or more antennas of the two antenna arrays, wherein a first array of the at least two arrays is positioned at a first plane spaced to be offset at a pre-defined distance behind a second array of in a second plane in a 3-dimensional space.

In another embodiment, a system for wireless power transmission, the system comprising: a transmitter comprising one or more antennas configured to transmit one or more power waves for forming a pocket of energy to power a targeted electronic device, wherein the one or more antennas are positioned on a non-planar shaped antenna array surface of a three dimensional array selected from the group consisting of a concave shape and a convex shape.

In another embodiment, a system for wireless power transmission, the system comprising: a transmitter comprising one or more antennas configured to transmit one or more power waves, wherein the one or more antennas are positioned on a non-planar shaped antenna array surface of a three dimensional array selected from the group consisting of a concave shape and a convex shape, and wherein the one or more antennas are positioned at a depth between 3 to 6 inches with respect to each other such that the one or more power waves transmitted by each of the one or more antennas are directed to form a pocket of energy to power a targeted electronic device.

BRIEF DESCRIPTION OF THE DRAWINGS

The accompanying drawings constitute a part of this specification and illustrate embodiments of the invention. The present disclosure can be better understood by referring to the following figures. The components in the figures are not necessarily to scale, emphasis instead being placed upon illustrating the principles of the disclosure.

FIG. 14A illustrates a waveform to form a pocket of energy in a wireless power transmission system, according to an exemplary embodiment.

FIG. 14B illustrates a waveform to form a pocket of energy in a wireless power transmission system, according to an exemplary embodiment.

FIGS. 22A and 22B illustrate an antenna array configuration in a wireless power transmission system, according to an exemplary embodiment.

FIG. 22C illustrates a graph depicting a size of a pocket of energy because of the antenna array configuration represented in FIGS. 22A and 22B in a wireless power transmission system, according to an exemplary embodiment.

FIGS. 23A and 23B illustrate an antenna array configuration in a wireless power transmission system, according to an exemplary embodiment.

FIG. 23C illustrates a graph depicting a size of a pocket of energy because of the antenna array configuration represented in FIGS. 23A and 22B in a wireless power transmission system, according to an exemplary embodiment.

FIGS. 24A and 24B illustrate an antenna array configuration in a wireless power transmission system, according to an exemplary embodiment.

FIG. 24C illustrates a graph depicting a size of a pocket of energy because of the antenna array configuration represented in FIGS. 24A and 24B in a wireless power transmission system, according to an exemplary embodiment.

FIGS. 25A and 25B illustrate an antenna array configuration in a wireless power transmission system, according to an exemplary embodiment.

FIG. 25C illustrates a graph depicting a size of a pocket of energy because of the antenna array configuration represented in FIGS. 25A and 25B in a wireless power transmission system, according to an exemplary embodiment.

FIGS. 26A and 26B illustrate an antenna array configuration in a wireless power transmission system, according to an exemplary embodiment.

FIG. 26C illustrates a graph depicting a size of a pocket of energy because of the antenna array configuration represented in FIGS. 26A and 26B in a wireless power transmission system, according to an exemplary embodiment.

FIGS. 27A and 27B illustrate an antenna array configuration in a wireless power transmission system, according to an exemplary embodiment.

FIG. 27C illustrates a graph depicting a size of a pocket of energy because of the antenna array configuration represented in FIGS. 27A and 27B in a wireless power transmission system, according to an exemplary embodiment.

FIGS. 28A and 28B illustrate an antenna array configuration in a wireless power transmission system, according to an exemplary embodiment.

FIG. 28C illustrates a graph depicting a size of a pocket of energy because of the antenna array configuration represented in FIGS. 28A and 28B in a wireless power transmission system, according to an exemplary embodiment.

FIGS. 29A and 29B illustrate an antenna array configuration in a wireless power transmission system, according to an exemplary embodiment.

FIG. 29C illustrates a graph depicting a size of a pocket of energy because of the antenna array configuration represented in FIGS. 29A and 29B in a wireless power transmission system, according to an exemplary embodiment.

DETAILED DESCRIPTION

Figure 1:
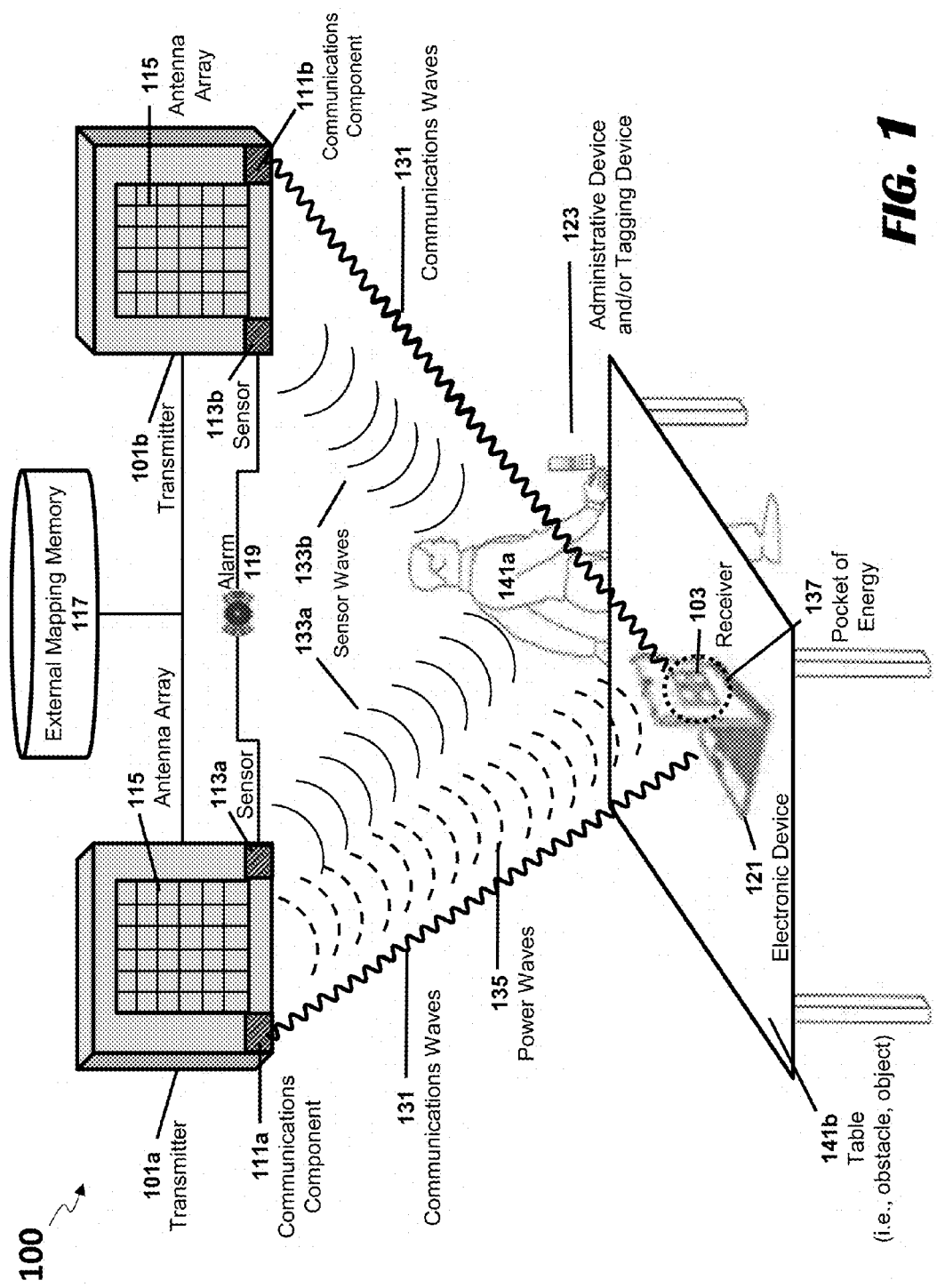
FIG. 1 shows components of an exemplary wireless charging system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

In the following description, the "transmitter" may refer to a device, including a chip that may generate and transmit one or more power waves (e.g., radio-frequency (RF) waves), whereby at least one RF wave is phase shifted and gain adjusted with respect to other RF waves, and substantially all of the waves pass through one or more antennas, such that focused RF waves are directed to a target. A "receiver" may refer to a device including at least one antenna, at least one rectifying circuit, and at least one power converter, which may utilize a pocket of energy for powering or charging the electronic device. "Pocket-forming" may refer to generating one or more RF waves that converge in a transmission field, forming controlled pocket of energy and null space. A "pocket of energy" may refer to an area or region of space where energy or power may accumulate based on a convergence of waves causing constructive interference at that area or region. The "null-space" may refer to areas or regions of space where pockets of energy do not form, which may be caused by destructive interference of waves at that area or region.

A pocket of energy may be formed at locations of constructive interference patterns of power waves transmitted by the transmitter. The pockets of energy may manifest as a three-dimensional field where energy may be harvested by receivers located within or proximate to the pocket of energy. The pocket of energy produced by transmitters during pocket-forming processes may be harvested by a receiver, converted to an electrical charge, and then provided to an electronic device (e.g., laptop computer, smartphone, rechargeable battery) associated with the receiver. In some embodiments, multiple transmitters and/or multiple receivers may power various electronic devices. The receiver may be separable from the electronic device or integrated with the electronic device.

In some embodiments, transmitters may perform adaptive pocket-forming processes by adjusting transmission of the power waves in order to regulate power levels based on inputted sensor data from sensors. In one embodiment, adaptive pocket forming reduces the power level (measured, for example, as power density) of power waves at a given location. For example, adaptive pocket-forming may reduce the power level of power waves converging at a 3D location or region in space, thereby reducing or altogether eliminating the amount of energy used to form one or more pockets of energy at that location, in response to sensor readings indicating a living being or sensitive object in proximity to that location. In other embodiment, adaptive pocket forming uses "destructive interference" to diminish, reduce, or prevent the energy of power waves concentrated at that location. For example, transmitter may use "destructive inference" to diminish the energy of power waves concentrated at the location of an object, as sensed by one or more sensors, wherein the object is identified or "tagged" in a database of transmitter to be excluded from receipt of power. In a further embodiment, adaptive pocket forming terminates power waves converging at a 3D location or region in space to form one or more pockets of energy at that location, in response to sensor readings indicating a living being or sensitive object in proximity to that location.

Adaptive pocket forming may use a combination of these techniques in response to data from sensors. For example, using sensors that can detect presence and/or motion of objects, living beings, and/or a sensitive object, based on a series of sensor readings at different times, and, in response, a transmitter may reduce the power level of power waves when presence and/or motion data from sensors indicate the presence and/or movement of an object to be avoided, such as a living being and/or sensitive object, as those power waves are transmitted toward a 3D region in space to produce one or more pockets of energy having a high power density. In some cases, the transmitter may terminate or adjust the power waves when location data from sensors indicates arrival or anticipated arrival of the living being or sensitive object within the 3D region of space with pockets of energy.

Communications signals may be produced by the receiver or the transmitter using an external power supply and a local oscillator chip, which in some cases may include using a piezoelectric material. Communications signals may be RF waves or any other communication medium or protocol capable of communicating data between processors, such as Bluetooth®, wireless fidelity (Wi-Fi), radio-frequency identification (RFID), infrared, near-field communication (NFC), ZigBee, and others. Such communications signals may be used to convey information between the transmitter and the receiver used to adjust the power waves, as well as contain information related to status, efficiency, user data, power consumption, billing, geo-location, and other types of information.

Transmitters and receivers may use communications signals to communicate information relating to the receivers and/or the transmission field more generally, in the form of wireless signals carrying digital data, which may include mapping data, heat-map data, and data that is specific to the particular wireless protocol, among other types of data. A transmitter may use the information in the data communicated via the communications signal as input parameters, which the transmitter uses to determine how the transmitter should produce and transmit power waves for receivers in the transmission field. That is, the transmitter may use the data about a transmission field, gathered from one or more receivers, to determine, e.g., where receivers are in a transmission field, where or where not to transmit power waves, where to generate pockets of energy, the physical waveform characteristics for the power waves, and which antennas or antenna arrays should be used to transmit the power waves. A person having ordinary skill in the art would appreciate that any number of possible wave-based technologies may be used to for generating power waves to provide energy to a receiver, including RF waves, ultrasound, microwave, laser light, infrared, and others. It would also be appreciated that the power waves would have physical waveform characteristics, such as amplitude, frequency, direction, power level, and others. In order to produce a pocket of energy at a particular location in the transmission field, the transmitter may generate power waves having a particular set of characteristics that cause the power waves to converge and form a pocket of energy at the desired location. In determining the appropriate characteristics, the transmitter may refer to the input parameters received as data from the receivers (via the communications signal), or from other sources, such as a mapping database or sensors. As previously mentioned, the transmitter may also use the input parameters to make additional or alternative determinations related to power wave transmission and receiver identification, such as determining which antennas or antenna arrays should be used for generating and transmitting the power waves.

Although the exemplary embodiments described herein mention the use of RF-based wave transmission technologies, it should be appreciated that the wireless charging techniques that might be employed are not be limited to such RF-based technologies and techniques. Rather, it should be appreciated there are additional or alternative wireless charging techniques, which may include any number of technologies and techniques for wirelessly transmitting energy to a receiver that is capable of converting the transmitted energy to electrical power. Non-limiting exemplary transmission techniques for energy that can be converted by a receiving device into electrical power may include: ultrasound, microwave, laser light, infrared, or other forms of electromagnetic energy. In the case of ultrasound, for example, one or more transducer elements may be disposed so as to form a transducer array that transmits ultrasound waves toward a receiving device that receives the ultrasound waves and converts them to electrical power. In addition, although the exemplary transmitter is shown as a single unit comprising potentially multiple transmitters (transmitter antenna array), both for RF transmission of power and for other power transmission methods mentioned in this paragraph, the transmit arrays can comprise multiple transmitters that are physically spread around a room rather than being in a compact regular structure.

I. Components of an Exemplary Wireless Charging System

FIG. 1 shows components of an exemplary wireless power transmission system 100. The exemplary system 100 may comprise transmitters 101, an external mapping memory 117, a receiver 103, and an electronic device 121 to be charged. Transmitters 101 may send various types of waves 131, 133, 135, such as communication signals 131, sensor waves 133, and power waves 135, into a transmission field, which may be the two or three-dimensional space into which transmitters 101 may transmit power waves 135.

In operation, transmitters 101 may transmit power transmission signals comprising power waves 135, which may be captured by receivers 103 configured to convert the energy of the power waves 135 into electrical energy, for an electronic device 121 associated with the receiver 103. That is, the receivers 103 may comprise antennas, antenna elements, and other circuitry that may convert the captured power waves 135 into a useable source of electrical energy on behalf of electronic devices 121 associated with the receivers 103. In some embodiments, transmitters 101 may intelligently transmit the power waves 135 into a transmission field, by manipulating characteristics of the power waves 135 (e.g., phase, gain, direction, frequency) and/or by selecting a subset of transmitter antennas 115 from which to transmit the power waves 135. In some implementations, the transmitters 101 may manipulate the characteristics of power waves 135 so that the trajectories of the power waves 135 cause the power waves 135 to converge at a predetermined location within a transmission field (e.g., a 3D location or region in space), resulting in constructive or destructive interference.

Constructive interference may be a type of waveform interference that may be generated at the convergence of the power waves 135 at a particular location within a transmission field associated with one or more transmitters 101. Constructive interference may occur when power waves 135 converge and their respective waveform characteristics coalesce, thereby augmenting the amount of energy concentrated at the particular location where the power waves 135 converge. The constructive interference may be the result of power waves 135 having particular waveform characteristics that constructive interference results in a field of energy or "pocket of energy" 137 at the particular location in the transmission field where the power waves 135 converge.

Destructive interference may be another type of waveform interference that may be generated at the convergence of the power waves 135 at a particular location within a transmission field associated with one or more transmitters 101. Destructive interference may occur when power waves 135 converge at particular location and their respective waveform characteristics are opposite each other (i.e., waveforms cancel each other out), thereby diminishing the amount of energy concentrated at the particular location. Where constructive interference may result in generating pockets of energy when enough energy is present, destructive interference may result in generating a negligible amount of energy or "null" at the particular location within the transmission field where the power waves 135 converge to form destructive interference.

A. Transmitters

Transmitters 101 may comprise or be associated with a processor (not shown), a communications component 111, a sensor 113, and an antenna array 115. Processors may control, manage, and otherwise govern the various processes, functions, and components of the transmitters 101. Additionally or alternatively, transmitters 101 may comprise an internal mapping memory (not shown), and/or may be wired or wirelessly coupled to an external mapping memory 117.

i. Transmitter Processors

Transmitters 101 may comprise one or more transmitter processors that may be configured to process and communicate various types of data (e.g., heat-mapping data, sensor data). Additionally or alternatively, a transmitter processor of a transmitter 101 may manage execution of various processes and functions of the transmitter, and may manage the components of the transmitter 101. For example, the transmitter processor may determine an interval at which a beacon signal may be broadcast by a communications component 111, to identify receivers 103 that may inhabit the transmission field. As another example, the processor may generate heat-mapping data from communications signals 131 received by the communications component 111, and then, based upon sensor data received from a sensor 113 or sensor processor, the transmitter processor may determine the safest and most effective characteristics for power waves 135. In some cases, a single transmitter 101 may comprise a single transmitter processor. However, it should be appreciated that, in some cases, a single transmitter processor may control and govern multiple transmitters 101. For example, the transmitters 101 may be coupled to a server computer (not shown) comprising a processor that executes software modules instructing the processor of the server to function as a transmitter processor capable of controlling the behavior of the various transmitters 101. Additionally or alternatively, a single transmitter 101 may comprise multiple processors configured to execute or control specified aspects of the transmitter's 101 behavior and components. For example, the transmitter 101 may comprise a transmitter processor and a sensor processor, where the sensor processor is configured to manage a sensor 113 and generate sensor data, and where the transmitter processor is configured to manage the remaining functions of the transmitter 101.

It should be appreciated that an exemplary system 100 may comprise any number of transmitters 101, such as a first transmitter 101a and a second transmitter 101b, which may transmit waves 131, 133, 135 into one or more transmission fields. As such, the system 100 may comprise multiple discrete transmission fields associated with the transmitters 101, where the transmission field may or may not overlap, but may be managed discretely by transmitter processors. Additionally or alternatively, the system 100 may comprise transmission fields that may or may not overlap, but may be managed by the transmitter processors as a unitary transmission field.

ii. Communications Component of a Transmitter

Communications components 111 may effectuate wired and/or wireless communications to and from receivers 103 of the system 100. In some cases, a communications component 111 may be an embedded component of a transmitter 101; and, in some cases, the communications component 111 may be attached to the transmitter 101 through any wired or wireless communications medium. In some embodiments, the communications component 111 may be shared among a plurality of transmitters 101, such that each of the transmitters 101 coupled to the communications component 111 may use the data received within a communications signal 131, by the communications component 111.

The communications component 111 may comprise electromechanical components (e.g., processor, antenna) that allow the communications component 111 to communicate various types of data with one or more receivers 103, other transmitters 101 of the system 100, and/or other components of the transmitter 101. In some implementations, these communications signals 131 may represent a distinct channel for hosting communications, independent from the power waves 135 and/or the sensor waves 133. The data may be communicated using communications signals 131, based on predetermined wired or wireless protocols and associated hardware and software technology. The communications component 111 may operate based on any number of communication protocols, such as Bluetooth®, Wireless Fidelity (Wi-Fi), Near-Field Communications (NFC), ZigBee, and others. However, it should be appreciated that the communications component 111 is not limited to radio-frequency based technologies, but may include radar, infrared, and sound devices for sonic triangulation of the receiver 103.

The data contained within the communications signals 131 may be used by the wireless-charging devices 101, 103 to determine how the transmitter 101 may transmit safe and effective power waves 135 that generate a pocket of energy 137, from which the receiver 103 may capture energy and convert it to useable alternating current (AC) or direct current (DC) electricity. Using a communications signal 135, the transmitter 101 may communicate data that may be used, e.g., to identify receivers 103 within a transmission field, determine whether electronic devices 121 or users are authorized to receive wireless charging services from the system 100, determine safe and effective waveform characteristics for power waves 135, and hone the placement of pockets of energy 137, among other possible functions. Similarly, a communications component (not shown) of a receiver 103 may use a communications signal 135 to communicate data that may be used to, e.g., alert transmitters 101 that the receiver 103 has entered or is about to enter a transmission field, provide information about the user or the electronic device 121 being charged by the receiver 103, indicate the effectiveness of the power waves 135, and provide updated transmission parameters that the transmitters 101 may use to adjust the power waves 135, as well as other types of useful data. As an example, the communications component 111 of the transmitter 101 may communicate (i.e., send and receive) different types of data (e.g., authentication data, heat-mapping data, transmission parameters) containing various types of information. Non-limiting examples of the information may include a beacon message, a transmitter identifier (TX ID), a device identifier (device ID) for an electronic device 121, a user identifier (user ID), the battery level for the device 121, the receiver's 103 location in the transmission field, the device's 121 location in the transmission field, and other such information.

iii. Transmitter Sensors

Sensors 113 may be physically associated with transmitters 101 (i.e., connected to, or a component of), or devices may be configured to detect and identify various conditions of the system 100 and/or transmission field, and sensor data may then be generated for the transmitter 101, which may contribute to the generation and transmission of power waves 135 by the transmitters 101. The sensor data may help the transmitters 101 determine various modes of operation and/or how to appropriately generate and transmit power waves 135, so that the transmitters 101 may provide safe, reliable, and efficient wireless power to receivers 103. As detailed herein, sensors 113 may transmit sensor data collected during sensor operations for subsequent processing by a transmitter processor of a transmitter 101. Additionally or alternatively, one or more sensor processors may be connected to or housed within the sensors 113. Sensor processors may comprise a microprocessor that executes various primary data processing routines, whereby the sensor data received at the transmitter processor has been partially or completely pre-processed as useable mapping data for generating power waves 135.

Sensors 113 transmit sensor data to the transmitter 101. Although described in the exemplary embodiment as raw sensor data, it is intended that the sensor data is not limited to raw sensor data and can include data that is processed by a processor associated with the sensor, processed by the receiver, processed by the transmitter, or any other processor. The sensor data can include information derived from the sensor, and processed sensor data can include determinations based upon the sensor data. For example, a gyroscope of a receiver may provide raw data such as an orientation in X-plane, Y-plane, and Z planes, and processed sensor data from the gyroscope may include a determination of the location of the receiver or a location of a receiver antenna based upon the orientation of the receiver. In another example, raw sensor data from an infrared sensor of a receiver may provide thermal imaging information, and processed sensor data may include an identification of the person 141a based upon the thermal imaging information. As used herein, any reference to sensor data or raw sensor data can include data processed at the sensor or other device. In some implementations, a gyroscope and/or an accelerometer of the receiver 103 or electronic device associated with the receiver 103 may provide sensor data indicating the orientation of the receiver 103 or electronic device 121, which the transmitter 101 may use to determine whether to transmit power waves 135 to the receiver 103. For example, the receiver 103 may be embedded or attached to an electronic device 121 (e.g., smartphone, tablet, laptop) comprising a gyroscope and/or an accelerometer that generates sensor data indicating the orientation of the electronic device 121. The receiver 103 may then transmit this sensor data to the transmitter 101, via communications waves 131. In such implementations, the transmitter 101 may transmit power waves 135 to the location of the receiver 103 until the transmitter 101 receives, via communications waves 131, the sensor data produced by the gyroscope and/or accelerometer, indicating that the receiver 103 or electronic device is in motion or has an orientation suggesting that the electronic device 121 is in use or nearby a person 141a. As an example, a receiver 103 may be attached to or embedded within a smartphone comprising a gyroscope and an accelerometer. In this example, while the smartphone is flat on a table 141b for a time, the transmitter 101 may transmit power waves 135 to the smartphone. But when the person 141a lifts the smartphone to his or her head, the accelerometer then generates sensor data indicating that the smartphone is in motion and the gyroscope generates sensor data indicating that the smartphone has a planar-orientation indicating that the smartphone is against the person's 141a ear. The transmitter 101 may then determine from this sensor data produced by the gyroscope and accelerometer that the smartphone is against the person's 141a head, and thus the transmitter 101 ceases the power waves 131 transmitted to the receiver 103 associated with the smartphone. The transmitter 101 may make this determination according to any number of preset threshold values regarding data produced by gyroscopes and/or accelerometers.

Sensors 113 may be devices configured to emit sensor waves 133, which may be any type of wave that may be used to identify sensitive objects 141, 143 in a transmission field (e.g., a person 141, a piece of furniture 143). Non-limiting examples of sensor technologies for the sensors 113 may include: infrared/pyro-electric, ultrasonic, laser, optical, Doppler, accelerometer, microwave, millimeter, and RF standing-wave sensors. Other sensor technologies that may be well-suited to secondary and/or proximity-detection sensors may include resonant LC sensors, capacitive sensors, and inductive sensors. Based upon the particular type of sensor waves 133 used and the particular protocols associated with the sensor waves 133, a sensor 113 may generate sensor data. In some cases, the sensor 113 may comprise a sensor processor that may receive, interpret, and process sensor data, which the sensor 113 may then provide to a transmitter processor.

Sensors 113 may be passive sensors, active sensors, and/or smart sensors. Passive sensors, such as tuned LC sensors (resonant, capacitive, or inductive) are a simple type of sensor 113 and may provide minimal but efficient object discrimination. Such passive sensors may be used as secondary (remote) sensors that may be dispersed into the transmission field and may be part of a receiver 103 or otherwise independently capture raw sensor data that may be wirelessly communicated a sensor processor. Active sensors, such as infrared (IR) or pyro-electric sensors, may provide efficient and effective target discrimination and may have minimal processing associated with the sensor data produced by such active sensors. Smart sensors may be sensors 113 having on-board digital signal processing (DSP) for primary sensor data (i.e., prior to processing by the transmitter processor). Such processors are capable of fine, granular object discrimination and provide transmitter processors with pre-processed sensor data that is more efficiently handled by the transmitter processor when determining how to generate and transmit the power waves 135.

Sensors 113 may have the capability to operate and generate different types of sensor data and may generate location-related information in various formats. Active and smart sensors may be categorized by sensor type, characteristic hardware and software requirements, and capabilities for distance calculation and motion detection, as seen in the following Table 1:

TABLE 1

| | Active and Smart Sensor Attributes | | | |
| --- | --- | --- | --- | --- |
| Sensor Type | Hardware Requirements | Software Requirements | Distance Calculation | Motion Detection |
| One dimensional | Simple circuits | Minimal | Rough | None |
| Smart one dimensional | Simple circuits | Limited | Good | None |
| Two dimensional (2D) | Simple circuits | Limited | Good | Possible |
| Smart two dimensional | Complex circuits | Moderate | Good | Possible |
| Three dimensional (3D) | Complex circuits | Intensive | Good | Good |
| Smart three dimensional | DSP (primary processing) | Intensive | Precise | Excellent |

In some implementations, sensors 113 may be configured for human recognition, and thus may discriminate a person 141a from other objects, such as furniture 141b. Non-limiting examples of sensor data processed by human recognition-enabled sensors 113 may include: body temperature data, infrared range-finder data, motion data, activity recognition data, silhouette detection and recognition data, gesture data, heart rate data, portable devices data, and wearable device data (e.g., biometric readings and output, accelerometer data).

In an embodiment, control systems of transmitters 101 adhere to electromagnetic field (EMF) exposure protection standards for human subjects. Maximum exposure limits are defined by US and European standards in terms of power density limits and electric field limits (as well as magnetic field limits). These include, for example, limits established by the Federal Communications Commission (FCC) for MPE, and limits established by European regulators for radiation exposure. Limits established by the FCC for MPE are codified at 47 CFR § 1.1310. For electromagnetic field (EMF) frequencies in the microwave range, power density can be used to express an intensity of exposure. Power density is defined as power per unit area. For example, power density can be commonly expressed in terms of watts per square meter (W/m2), milliwatts per square centimeter (mW/cm2), or microwatts per square centimeter (μW/cm2).

In an embodiment, the present methods for wireless power transmission incorporate various safety techniques to ensure that human occupants 141a in or near a transmission field are not exposed to EMF energy near or above regulatory limits or other nominal limits. One safety method is to include a margin of error (e.g., about 10% to 20%) beyond the nominal limits, so that human subjects are not exposed to power levels at or near the EMF exposure limits. A second safety method can provide staged protection measures, such as reduction or termination of wireless power transmission if humans 141a (and in some embodiments, other living beings or sensitive objects) move toward a pocket of energy 137 with power density levels exceeding EMF exposure limits. A further safety method is redundant safety systems, such as use of power reduction methods together with alarms 119.

In operation, sensors 113 may detect whether objects, such as person 141 or furniture 143, enter a predetermined proximity of a transmitter 101, power waves 135, and/or a pocket of energy 137. In one configuration, the sensor 113 may then instruct the transmitter 101 or other components of the system 100 to execute various actions based upon the detected objects. In another configuration, the sensor 113 may transmit sensor data to the transmitter 101, and the transmitter 101 may determine which actions to execute (e.g., adjust a pocket of energy, cease power wave transmission, reduce power wave transmission). For example, after a sensor 113 identifies that a person 141 has entered the transmission field, and then determines that the person 141 is within the predetermined proximity of the transmitter 101, the sensor could provide the relevant sensor data to the transmitter 101, causing the transmitter 101 to reduce or terminate transmission of the power waves 135. As another example, after identifying the person 141 entering the transmission field and then determining that the person 141 has come within the predetermined proximity of a pocket of energy 137, the sensor 113 may provide sensor data to the transmitter 101 that causes the transmitter 101 to adjust the characteristics of the power waves 135, to diminish the amount of energy concentrated at the pockets of energy 137, generate a null, and/or reposition the location of the pocket energy 137. In another example, the system 100 may comprise an alarm device 119, which may produce a warning, and/or may generate and transmit a digital message to a system log or administrative computing device configured to administer the system 100. In this example, after the sensor 113 detects the person 141 entering the predetermined proximity of a transmitter 101, power wave 135, and/or pocket of energy 137, or otherwise detects other unsafe or prohibited conditions of system 100, the sensor data may be generated and transmitted to the alarm device 119, which may activate the warning, and/or generate and transmit a notification to the administrator device. A warning produced by the alarm 119 may comprise any type of sensory feedback, such as audio feedback, visual feedback, haptic feedback, or some combination.

In some embodiments, such as the exemplary system 100, a sensor 113 may be a component of a transmitter 101, housed within the transmitter 101. In some embodiments, a sensor 113 may be external to the transmitter 101 and may communicate, over a wired or wireless connection, sensor data to one or more transmitters 101. A sensor 113, which may be external to one or more transmitters 101 or part of a single transmitter 101, may provide sensor data to the one or more transmitters 101, and the processors of the transmitters 101 may then share this sensor data to determine the appropriate formulation and transmission of power waves 135. Similarly, in some embodiments, multiple sensors 113 may share sensor data with multiple transmitters 101. In such embodiments, sensors 113 or host transmitters 101 may send and receive sensor data with other sensors 113 or host transmitters in the system 100. Additionally or alternatively, the sensors 113 or the host transmitters 101 may transmit or retrieve sensor data, to or from one or more mapping memories 117.

As an example, as seen in the exemplary system 100 of FIG. 1, a first transmitter 101a may comprise a first sensor 113a that emits sensor waves 133a and generates sensor data, which may be stored on the first transmitter 101a and/or a mapping memory 117; the system 100 may also have a second transmitter 101b comprising a second sensor 113a that emits sensor waves 113b and generates sensor data, which may be stored on the second transmitter 101b and/or the mapping memory 117 of the system 100. In this example, both of the transmitters 101a, 101b may comprise processors that may receive sensor data from the sensors 113a, 113b, and/or fetch stored sensor data from the particular storage locations; thus, the sensor data produced by the respective sensors 113a, 113b may be shared among the respective transmitters 101a, 101b. The processors of each of the transmitters 101a, 101b may then use the shared sensor data, to then determine the characteristics for generating and transmitting power waves 133a, 133b, which may include determining whether to transmit power waves 133a, 133b when a sensitive object 141, 143 is detected.

As mentioned, a transmitter 101 may comprise, or otherwise be associated with, multiple sensors 113 from which the transmitter 101 receives sensor data. As an example, a single transmitter 101 may comprise a first sensor located at a first position of the transmitter 101 and a second sensor located at a second position on the transmitter 101. In this example, the sensors 113 may be binary sensors that may acquire stereoscopic sensor data, such as the location of a sensitive object 141 to the sensors 113. In some embodiments, such binary or stereoscopic sensors may be configured to provide three-dimensional imaging capabilities, which may be transmitted to an administrator's workstation and/or other computing device. In addition, binary and stereoscopic sensors may improve the accuracy of receiver 103 or object 141 location detection and displacement, which is useful, for example, in motion recognition and tracking.

To enable transmitter 101, to detect and confirm objects 141 that the user wishes to exclude from receipt of wireless energy (i.e., power waves 135, pockets of energy 137), the user may communicate to transmitter 101 tagging information to be recorded in a mapping memory of transmitter 101. For example, the user may provide tagging information via a user device 123 in communication with the controller of transmitter 101 via a graphical user interface (GUI) of the user device 123. Exemplary tagging information includes location data for an electrical device 121, which may include one-dimensional coordinates of a region in space containing the object 141, two-dimensional (2D) coordinates of a region in space containing the object 141, or three-dimensional (3D) coordinates of a region in space containing the object 141.

In some embodiments, tags may be assigned to particular objects 141 and/or locations within a transmission field. During a tagging process, tagging data may be generated and stored into a mapping database, and may inform the transmitter 101 about how the transmitter 101 should behave with regards to specific objects 141 or locations in the transmission field. Tagging data generated during a tagging process may inform transmitters 101 whether to transmit power waves to an object 141 or location, and/or where within a transmission field to transmit power waves 135 or generate pockets of energy 137. For example, a record for a location in the mapping database may be updated or generated with tagging data instructing the transmitter 101 to never transmit power waves 137 to the particular location. Likewise, in another example, tagging data may be populated into a record for a location, instructing the transmitter 101 to always transmit power waves 137 to that location. In other words, in some implementations, the process of tagging may be as simple as pre-populating tagging data into the mapping database, via a user interface of some kind. Although tags may be generated by merely inputting the tagging data into the mapping database of the transmitter 101, in some cases, the tagging data may be automatically generated by a sensor processor, transmitter processor, or other computing device, when the mapping database or other device receives a tagging indicator from a wireless tagging device 123, such as a smartphone or other mobile device. For example, say a user wants to prohibit power waves 137 from being transmitted to a table 141 in a child's playroom because the child has a habit of hiding under the table 141*b*. The user in this example may interact with a graphical interface on their smartphone 123 to generate and transmit tagging data containing the coordinates of the table 141*b* to the transmitter's 101 mapping database. In some cases, the user may place their mobile tagging device 123 next to the table 141*b* or outline coordinates of the table 141*b*, and then press an indicator button on the user interface, to transmit the relevant location data to the transmitter 101 or mapping database. If necessary, the transmitter 101 or mapping database may then convert the location data into useable coordinates of the transmission field. The generated transmission field coordinates may then be stored into the mapping database and referenced later when the transmitter 101 is determining where to generate a pocket of energy 137.

In some implementations, sensors 113 may detect sensitive objects 141 within a transmission field that have been predetermined or "tagged" as being sensitive. In some cases, it may be desirable to avoid particular obstacles in the transmission field, such as furniture 141*b* or walls, regardless of whether a sensor 113 has identified a person 141*a* or other sensitive object 141, entering within proximity to the particular obstacle. As such, an internal or external mapping memory 117 may store mapping data and/or sensor identifying the particular location of the particular obstacle, thereby effectively "tagging" the location of the particular location as being off-limits to power waves 135. Additionally or alternatively, the particular object may be digitally or physically associated with a digital or physical tag that produces a signal or physical manifestation (e.g. heat-signature) detectable by the sensor 113, communications components 111, or other component of the transmitter 101. For example, as part of generating sensor data for the transmitter 101, the sensor 113 may access an internal mapping memory (i.e., internal to the transmitter 101 housing the sensor 113) that stores records of tagged obstacles to avoid, such as a table 141*b*. In this example, the sensor 113 would detect the table 141*b* as a tagged obstacle, and generate sensor data 113 that causes the transmitters 101 to reduce the amount of energy provided by the power waves 135 where table 141*b* is located, terminate the power waves 135 being sent to the table 141*b*, or redirect the power waves 135.

Additionally or alternatively, in some implementations, sensors 113 may detect electrical devices 121 that have been tagged (i.e., previously recorded in an internal mapping memory or external mapping memory 117 or received a digital or physical tag detectable by the sensors 113) to receive wireless power waves 137. Under these circumstances, after detecting a tag or tagged object, or otherwise determining that a tag or tagged object should receive wireless energy, a sensor 113 may generate sensor data that causes a transmitter 101 to transmit power waves 135 to the tagged object to form a pocket of energy 137 at the location of the identified tag or tagged object.

iv. Antenna Array, Antenna Elements, and Antennas

Transmitters 101 may comprise an antenna array 115, which may be a set of one or more antennas configured to transmit one or more types of waves 131, 133, 135. In some embodiments, an antenna array 115 may comprise antenna elements, which may be configurable "tiles" comprising an antenna, and zero or more integrated circuits controlling the behavior of the antenna in that element, such as generating power waves 135 having predetermined characteristics (e.g., amplitude, frequency, trajectory, phase). An antenna of the antenna array 115 may transmit a series of power waves 135 having the predetermined characteristics, such that the series of power waves 135 arrive at a given location within a transmission field, and exhibit those characteristics. Taken together, the antennas of the antenna array 115 may transmit power waves 135 that intersect at the given location (usually where a receiver 103 is detected), and due to their respective characteristics, form a pocket of energy 137, from which the receiver 103 may collect energy and generate electricity. It should be appreciated that, although the exemplary system 100 describes radio-frequency based power waves 135, additional or alternative transmitter antennas, antenna arrays, and/or wave-based technologies may be used (e.g., ultrasonic, infrared, magnetic resonance) to wirelessly transmit power from the transmitter 101 to the receiver 103.

A transmitter 101 may use mapping data to determine where and how an antenna array 115 should transmit power waves 135. The mapping data may indicate for the transmitter 101 where power waves 135 should be transmitted and the pockets of energy 137 should be formed, and, in some cases, where the power waves 135 should not be transmitted. The mapping data may be captured, queried, and interpreted by processors associated with the transmitter 101, from which the transmitter 101 may determine how the antennas of the antenna array 115 should form and transmit the power waves 135. When determining how the power waves should be formed, the transmitter 101 determines the characteristics for each of the power waves 135 to be transmitted from each of the respective antennas of the antenna array 115. Non-limiting examples of characteristics for the power waves 135 may include: amplitude, phase, gain, frequency, and direction, among others. As an example, to generate a pocket of energy 137 at a particular location, the transmitter 101 identifies a subset of antennas from the antenna array, 115 transmits power waves 135 to the predetermined location, and then the transmitter 101 generates the power waves 135. The power waves 135 transmitted from each antenna of the subset have a comparatively different, e.g., phase and amplitude. In this example, a waveform-generating integrated circuit (not shown) of the transmitter 101 can form a phased array of delayed versions of the power waves 137, apply different amplitudes to the delayed versions of the power waves 137, and then transmit the power waves 137 from appropriate antennas. For a sinusoidal waveform, such as an RF signal, ultrasound, microwave, and others, delaying the power waves 137 is effectively similar to applying a phase shift to power waves 135. In some cases, one or more transmitter processors (not shown) control the formation and transmission of power waves 135 broadcast by the transmitter 101 through the antenna array 115.

Antenna arrays 115 may comprise one or more integrated circuits that are associated with the antennas to generate the power waves 135. In some embodiments, integrated circuits are found on antenna elements that house an integrated circuit and antenna associated with the integrated circuit. An integrated circuit may function as a waveform generator for an antenna associated with the integrated circuit, providing the appropriate circuitry and instructions to the associated antenna so that the antenna may formulate and transmit the power waves 135 in accordance with the predetermined characteristics identified for the power waves 135. The integrated circuits may receive instructions from a microprocessor (e.g., transmitter processor) that determines how the power waves 135 should be emitted into the transmitter's 101 transmission field. The transmitter processor, for example, may determine where to form a pocket of energy 137 based on mapping data and then may instruct the integrated circuits of the antenna array 115 to generate power waves 135 with a set of waveform characteristics. The integrated circuits may then formulate the power waves 135 and instruct their respectively associated antennas to transmit the power waves 135 into the transmission field accordingly.

As mentioned, the mapping data may be based upon heat-map data collected by the communications component 111 and generated by a transmitter processor, and/or sensor data collected by a sensor 113 and generated by a sensor processor. The heat-map data may contain data useful for identifying receivers 103 within the transmission field and their location within the transmission field relative to the transmitter 101. For example, the heat-map data may include data representative of a location of a receiver in a communication signal that the transmitter receives from the receiver identifying the location where the receiver detected a low power wave from the transmitter 101, and/or identifying whether or not the power level of the low power wave detected by the receiver exceeded a particular threshold. The sensor data may contain data useful for identifying sensitive objects 141, 143, which are objects found at locations within the transmission field where power waves 135 should exhibit minimal energy or should not be transmitted at all. In other words, the mapping data may represent input parameters used by the transmitter 101 to determine the characteristics with which to generate and transmit the power waves 135. As the mapping data (i.e., heat-map data and/or sensor data) is updated and queried by the transmitter 101, the transmitter 101 may adjust how the antenna array 115 is producing and transmitting the power waves 135 to account for changes of the environment within the transmission field, such as receiver 103 or people 141 movements.

In some cases, a transmitter 101 may split the antenna array 115 into groups of antennas, such that the constituent antennas perform different tasks. For example, in an antenna array 115 comprising ten antennas, nine antennas may transmit power waves 135 that form a pocket of energy 137 at a receiver 103, and a tenth antenna may operate in conjunction with the communications component 111 to identify new receivers (not shown) in the transmission field, by continuously and sequentially transmitting low levels of energy to discrete locations within the transmission field, which a new receiver may capture along with a communications signal 131 to then determine the new receiver's location relative to the transmitter 101 within the transmission field. In another example, the antenna array 115 having ten antennas may be split into two groups of five, each of which may transmit power waves 135 to two different receivers 103 in the transmission field.

v. Mapping Memory

Transmitters 101 may be associated with one or more mapping-memories, which may be non-transitory machine-readable storage media configured to store mapping data, which may be data describing aspects of transmission fields associated with the transmitters 101. Mapping data may comprise heat-map data and sensor data. The heat-map data may be generated by transmitter processors to identify receivers 103 located in a transmission field; and the sensor data may be generated by transmitter processors and/or sensor processors to identify sensitive objects 141, 143 located in the transmission field. Thus, mapping data stored in a mapping memory of the system 100 may include information indicating the location of receivers 103, the location of sensitive objects 141, 143, transmission parameters for power waves 135, and other types of data, which can be used by the transmitters 101 to generate and transmit safe and effective power waves 135 (e.g., location of tagged objects, tracking parameters). Transmitters 101 may query the mapping data stored in the records of a mapping memory, or the records may be "pushed" to the transmitters 101 in real-time, so that the transmitters 101 may use the mapping data as input parameters for determining the characteristics for transmitting the power waves 135 and where to generate pockets of energy 137. In some implementations, transmitters 101 may update the mapping data of a mapping memory as new, up-to-date mapping data is received, from the processors governing the communications components 111 or sensors 113.

In some embodiments, a wireless-charging system 100 may comprise an external mapping memory 117, which may be a database or a collection of machine-readable computer files, hosted by non-transitory machine-readable storage media of one or more server computers. In such embodiments, the external mapping memory 117 may be communicatively coupled to one or more transmitters 101 by any wired or wireless communications protocols and hardware. The external mapping memory 117 may contain mapping data for one or more transmission fields that are associated with one or more transmitters 101 of the system 100. The records of the external mapping memory 117 may be accessed by each transmitter 101, which may update the mapping data when scanning a transmission field for receivers 103 or sensitive objects 141, 143, and/or query the mapping data when determining safe and effective characteristics for the power waves 135 that the transmitter 101 is going to generate.

In some embodiments, a transmitter 101 may comprise non-transitory machine-readable storage media configured to host an internal mapping memory, which may store the mapping data within the transmitter 101. A processor of the transmitter 101, such as a transmitter processor or a sensor processor, may update the records of the internal mapping memory as new mapping data is identified and stored. In some embodiments, the mapping data stored in the internal mapping memory may be transmitted to additional transmitters 101 of the system 100, and/or the mapping data in the internal mapping memory may be transmitted and stored into an external mapping memory 117 at a regular interval or in real-time.

B. Receivers

Receivers 103 may be used for powering or charging an associated electronic device 121, which may be an electrical device 121 coupled to or integrated with one or more receivers 103. A receiver 103 may comprise one or more antennas (not shown) that may receive power waves 135 from one or more power waves 135 originating from one or more transmitters 101. The receiver 103 may receive one or more power waves 135 produced by and transmitted directly from the transmitter 101, or the receiver 103 may harvest power waves 135 from one or more pockets of energy 137, which may be a three-dimensional field in space resulting from the convergence of a plurality of power waves 135 produced by one or more transmitters 101.

In some embodiments, the receiver 103 may comprise an array of antennas configured to receive power waves 135 from a power transmission wave. Receiver 103 antennas may harvest energy from one or more power waves 135 or from a pocket of energy 137, which may be formed from the resulting accumulation of power waves 135 at a particular location within a transmission field. After the power waves 135 are received and/or energy is gathered from a pocket of energy 137, circuitry (e.g., integrated circuits, amplifiers, rectifiers, voltage conditioner) of the receiver 103 may then convert the energy of the power waves 135 (e.g., radio frequency electromagnetic radiation) to electrical energy (i.e., electricity), which may be stored into a battery (not shown) or used by an electronic device 121. In some cases, for example, a rectifier of the receiver 103 may translate the electrical energy from AC to DC form, usable by the electronic device 121. Other types of conditioning may be applied as well, in addition or as an alternative to conversion from AC to DC. For example, a voltage conditioning circuit may increase or decrease the voltage of the electrical energy as required by the electronic device 121. An electrical relay may then convey the electrical energy from the receiver 103 to the electronic device 121.

A receiver 103 or an electronic device 121 may comprise a receiver-side communications component (not shown), which may communicate various types of data with the transmitter 101 in real-time or near real-time, through a communications signal generated by the receiver's communications component. The data may include mapping data, such as heat-map data, and device status data, such as status information for the receiver 103, status information for the electronic device 121, status information for the power waves 135, and/or status information for the pockets of energy 137. In other words, the receiver 103 may provide information to the transmitter 101 regarding the present location data of the device 121, the amount of charge received by the receiver 103, the amount of charge used by the electronic device 121, and certain user account information, among other types of information.

As mentioned, in some implementations, the receiver 103 may be integrated into the electronic device 103, such that for all practical purposes, the receiver 103 and electronic device 121 would be understood to be a single unit or product, whereas in some embodiments, the receiver 103 may be coupled to the electronic device 121 after production. It should be appreciated that the receiver 103 may be configured to use the communications component of the electronic device 121 and/or comprise a communications component of its own. As an example, the receiver 103 might be an attachable but distinct unit or product that may be connected to an electronic device 121, to provide wireless-power charging benefits to the electronic device 121. In this example, the receiver 103 may comprise its own communications component to communicate data with transmitters 101. Additionally or alternatively, in some embodiments, the receiver 103 may utilize or otherwise operate with the communications component of the electronic device 121. For example, the receiver 103 may be integrated into a laptop computer 121 during manufacturing of the laptop 121 or at some later time. In this example, the receiver 103 may use the laptop's communication component (e.g., Bluetooth®-based communications component) to communicate data with transmitters 101.

C. Electronic Devices & Tagging Information for Devices and Objects

An electronic device 121 coupled to a receiver 103 may be any electrical device 121 that requires continuous electrical energy or that requires power from a battery. The receiver 103 may be permanently integrated into the electronic device 121, or the receiver 103 may be detachably coupled to the electronic device 121, which, in some cases, may result in a single integrated product or unit. As an example, the electronic device 121 may be placed into a protective sleeve comprising embedded receivers 103 that are detachably coupled to the device's 121 power supply input. Non-limiting examples of electronic devices 121 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smart watch), among other types of electrical devices 121.

Electronic devices 121 may comprise embedded or associated proximity sensors, accelerometers, compasses, gyroscopes and/or ambient light sensors, which may act as a secondary data source for transmitter 101 to supplement sensor data, heat-map data, and/or mapping data, as generated by the sensors 113 physically associated with transmitter 101.

In some cases, neither an electronic device 121 nor an associated receiver 103, are associated with a communications component capable of communicating with a transmitter 101. For example, the electronic device 121 might be a smaller household electrical device 121, such as a clock or smoke alarms, which might not include a communications component that transmits communications signals to the transmitter 101, and therefore the electrical device 121 and the receiver 103 attached to the electrical device 121 would not be able to exchange the data needed to guide the transmitter's 101 production of power waves 135.

To enable the transmitter 101 to locate and identify such an electrical device 121, a user may communicate to the transmitter 101 "tagging" data, which may be recorded into an internal or external mapping memory 117. For example, the user may provide tagging information via a user device (e.g., laptop 121, smartphone, administrative computer or server) that is in communication with the transmitter 101 or external mapping memory 117. The user device may execute an administrative software application that permits the user, via a graphical user interface (GUI), to generate tagging information. The tagging information may then be stored as mapping data (e.g., sensor data, heat-map data) into one or more mapping memories 117 of the system 100 for retrieval by one or more processors (e.g., transmitter processor, sensor processor, user device processor) of the system 100. Exemplary tagging information includes location data for an electrical device 121, level of power usage of electrical device 121, duration of power usage of electrical device 121, power transfer schedule of electrical device 121, and authentication credentials of the electrical device 121.

Additionally or alternatively, tagging information for electrical devices 121 may be automatically identified and generated by sensors 113 and/or communications components when scanning the transmission field to identify electrical devices 121 and/or sensitive objects 141. As an example, scanning with sensors 113 may dynamically maintain an internal mapping memory of a transmitter 101, which may update tagging information provided manually to the mapping memory 117 by a user device. In an embodiment, the transmission field of wireless power system 100 is scanned periodically to detect sensor 113 responses indicating updated tagging information for electrical devices 121 and/or sensitive objects 141, using one or more of pyroelectric sensors, ultrasound sensors, millimeter sensors, and power sensors. In operation, after one or more sensors 113 or communications components 111 identifies the electrical device 101 and then outputs the sensor data to the transmitter processor, the transmitter processor may compare the captured sensor data with tagging information stored in the mapping memory 117 of the system 100. Based on this comparison, the transmitter processor may determine whether the transmitter 101 should transmit power waves 135 to electrical device 121, or whether the transmitter processor should avoid transmitting power waves 135 to the electrical device 121.

In some embodiments, a system 100 may comprise an administrative device 123 that may function as an interface for an administrator to set configuration settings or provide operational instructions to various components of the system 100. The administrative device 123 may be any device comprising a communications component capable of wired or wireless communication with components of the system 100 and a microprocessor configured to transmit certain types of data to components of the system 100. Non-limiting examples of an administrative device 123 may include a guidance device (e.g., radio guidance device, infrared guidance device, laser guidance device), a computing device, a smartphone, a tablet, or other device capable of providing instructional and operational data to components of the system 100.

In some embodiments, the administrative device 123 may be a guidance device that may comprise a processor configured to execute various routines for "tagging" an electronic device 121, based upon the type of technology employed. As mentioned herein, tagging receivers 103 and other objects 141 within a transmission field may indicate to components of the system 100 that those components should or should not execute certain routines. As an example, the administrative device 123 may be a laser guidance device that transmits tagging data to a transmitter communication component 111, sensor 113, mapping memory 117, or other device of the system 100 that is configured to receive and process the laser guidance-based tagging data. In this example, the tagging data may be generated whenever a user interacts with an interface input, such as a push button or graphical user interface (GUI), and a laser "tags" the desired object. In some cases, the resulting tagging data is immediately transmitted to the transmitter 101 or other device for storage into mapping data. In some cases, a sensor 101 having laser-sensitive technology may identify and detect the laser-based tag. Although additional and alternative means of tagging objects and devices are described herein, one having ordinary skill in the art would appreciate that there are any number of guidance technologies that may be employed to "tag" an object and generate or detect tagging data.

In some embodiments, the administrative device 123 executes a software application associated with the wireless charging system 100, where the software application comprises software modules for generating and transmitting tagging data to components of the system 100. The tagging data generated by the software application may contain information useful for identifying objects or the locations of objects. That is, the tagging data may be used to instruct a sensor 113 that, when a particular sensory signature (e.g., infrared) is detected, the sensor 113 should generate certain sensor data, which would eventually inform how the transmitters 101 would generate and transmit the power waves 135.

In some implementations, the administrative device 123 may be a server computer or other workstation computer that is coupled to the transmitter processors. In such implementations, an administrator may provide tagging data directly to an external mapping memory 117, which may be stored until need by the transmitters 101. Although FIG. 1 shows the administrative device 123 as being a distinct device from the electronic device 121 being charged by the transmitters 101 and receivers 103, it should be appreciated that they may be the same devices and may function similarly. In other words, the electronic device 121 may function as an administrative device 123; and/or the administrative device 123 may receive wireless charging services through associated receivers 103, embedded or coupled to the administrative device 123.

II. Determining Receiver Locations & Heat-Map Data

Transmitters of the wireless charging system may determine the location of receivers in a transmission field covered by the transmitters. Transmitters may be associated with a mapping memory allowing the transmitters to track the motion of receivers, as the receivers move through a transmission field.

A. Exemplary Methods for Heat-Mapping

Figure 2:
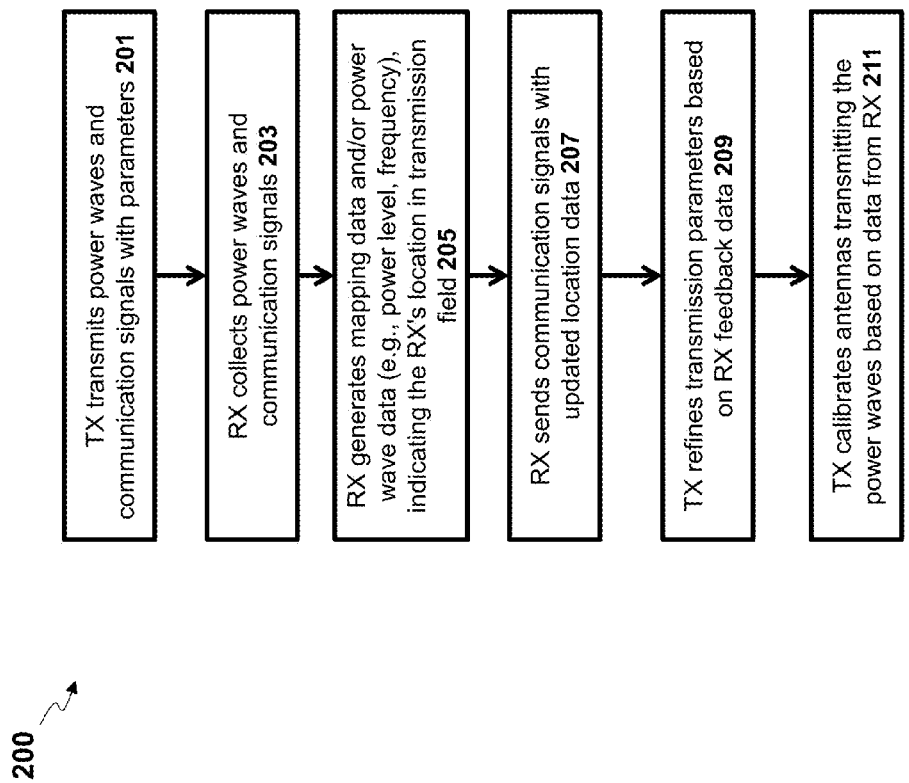
FIG. 2 shows an exemplary method for transmitters to locate receivers within a transmission field, according to an exemplary embodiment.

FIG. 2 shows an exemplary method 200 for one or more transmitters (TXs) of a wireless charging system to locate receivers within a transmission field, so that the transmitters may transmit power waves to the receiver devices. The method 200 describes actions executed by components of a single transmitter, though it should be appreciated that at least some the actions may be executed by additional or alternative components of the wireless power transmission system, such as other transmitters, microprocessors, computing devices, or other device capable of receiving and issuing instructions associated with transmitters. Moreover, it should be appreciated that the actions of the exemplary method 200 may be executed by any number of transmitters or microprocessors, simultaneously, or at individualized intervals that are particular to each device.

In a first step 201, a transmitter (TX) may continuously transmit power waves and a communication signal into a transmission field of the transmitter. The power waves may be any type of wave having any set of characteristics that may provide power to devices located at a given location within the transmission field. Non-limiting examples of power waves may include ultrasonic waves, microwaves, infrared waves, and radio-frequency waves. The power waves may be transmitted with a certain set of physical characteristics (e.g., frequency, phase, energy level, amplitude, distance, direction) that result in the power waves providing elevated energy levels at the given location in the transmission field. In this step 201, the transmitter may transmit so-called exploratory power waves, which are power waves having a power level comparatively lower than the power level ordinarily used to for power waves providing power to a receiver. Exploratory power waves may be used to identify receivers, and/or used to determine the appropriate characteristics for the power waves that will ultimately provide power to the receivers in the transmission field.

The communication signal may be any type of wave used by electrical devices to communicate data through associated protocols. Non-limiting examples may include Bluetooth®, NFC, Wi-Fi, ZigBee®, and the like. The communications signal may be used to communicate parameters used by the transmitter to properly formulate power waves. In this first step 201, a communications signal may contain data describing the characteristics of the low-level power waves being transmitted. This data may indicate, for example, the direction and energy level of the power waves transmitted with the communication signal. In some implementations, the power wave characteristics, as indicated by the data of the communication signal, may be used by receivers and transmitters as parameters for a number of determinations. These parameters may then be updated and exchanged over the communications signal to update the characteristics of the power waves being generated and transmitted.

In a next step 203, one or more antennas of a receiver may receive the power waves and the communication signal from the transmitter. The power waves may have waveform characteristics that give the power waves low-levels of power. The communication signal may contain data indicating the characteristics of the power waves. When the transmitter formulates and/or transmits the power waves in a certain direction or to a certain location within the transmission field, a communications component of the transmitter may generate and transmit data, within the communications signal, describing the power waves. For example, the communications signal may indicate information about the power wave formation, such as the amplitude, frequency, energy level, the trajectory of the power waves, and/or the desired location to which the power waves were transmitted.

In a next step 205, the receiver may respond to the transmitter with an indication of its location (e.g., an explicit communication of location information or a communication indicating receipt of an exploratory low power wave transmission in a segment or sub-segment, and/or confirmation that the power level of said exploratory wave exceeds a particular threshold) within the transmission field, using the data in the communications signal as input parameters. The receiver may comprise a processor configured to generate a message for responding to the transmitter with the indication of its location. The receiver may be integrated into (e.g., within a smart phone) or coupled to (e.g., a smart phone backpack) an electronic device comprising a processor that is configured to generate messages indicating the receiver's location when receiving a low power wave transmission. In an alternative embodiment, a receiver can determine its own location based upon characteristics of the received power waves as indicated by the received communication signal.

In some implementations, after the power waves are received by the receiver, the receiver must derive its location based upon the waveform characteristics of the power waves, as indicated by the communications signal. For example, the receiver processor may determine the receiver's location using data indicating a target area (i.e., where the power waves were transmitted to in the transmission field), the amount of low-level of the power waves, and the particular trajectory at which the power waves were transmitted. In this example, the receiver may determine its location within the transmission field of the transmitter, by determining the receiver's location in relation to the target area based on the amount of power actually received, and then determining where the target area is in relation to the transmitter based on the trajectory of the power waves. It should be appreciated that the above means of determining the receiver's location is merely exemplary; any number of additional or alternative calculations, inputs, parameters, and other information, may be communicated between the receiver and transmitter, and used by the receiver to determine its location within a transmission field.

In a next step 207, after determining the receiver's location within the transmission field, the receiver may respond to the transmitter with updated transmission parameters to be utilized by the transmitter for formulating the power waves. The transmitter may generate and transmit the power waves having certain waveform characteristics that are determined by the transmitter according to a set of parameters, which are predetermined or provided from receivers via the communications signal data. In this step 207, the receiver is providing the parameters to the transmitter after the receiver determines where it is located in relation to the transmitter. In some cases, the receiver may also provide updated parameters for the transmitter to use for generating and transmitting the power waves.

For example, the receiver may determine the effectiveness of the power waves, where the effectiveness may be determined as a ratio ("effectiveness ratio") of the amount of power being transmitted in the power waves versus the amount of power actually received by the receiver. In this example, the effectiveness may be transmitted to the transmitter using a communications signal (e.g., Bluetooth®, Wi-Fi, NFC, ZigBee®), which the transmitter may use as a parameter for determining how to generate and transmit the power waves. The receiver may also transmit updated parameter data indicating its location, as determined in a previous step 205. As another example, after the receiver determines the effectiveness ratio of the power waves and determines its location within the transmission field, the receiver may pre-process some or all of the communication signal data, so that the receiver transmits this data to transmitter and the transmitter to employ in determine where to place pockets of energy. The receiver may then determine and transmit other useful data that the transmitter may use as updated parameters for determining the waveform characteristics of the power waves. For example, data may include a battery level of the electronic device and/or a desired battery level of the electronic device.

In an optional next step 209, the transmitter may refine transmission parameters based on receiver feedback data to identify a more granular location of the transmitter. Based upon an initial identification scan, like in prior step 207, the transmitter may seek updated or more refined information regarding a transmission field or a particular receiver. In some instances, this data may be stored into a mapping memory as heat-map data for the particular receiver, or may be used to update a record for a receiver, as stored in the mapping memory.

In some instances, the data feedback produced by the receiver may indicate that location coordinates for a receiver have changed. In other words, the updated or changed data parameters used for identifying the receiver and for generating power waves for the transmitter may be revised based upon the updated location or based upon the movement of the receiver, as determined by the transmitter or receiver.

In a next step 211, the transmitter may calibrate the antennas, of the antenna array transmitting the power waves to the receiver, based on the feedback communication signal data received from the receiver.

B. Tracking Algorithms & Updating Heat-Map

Figure 3:
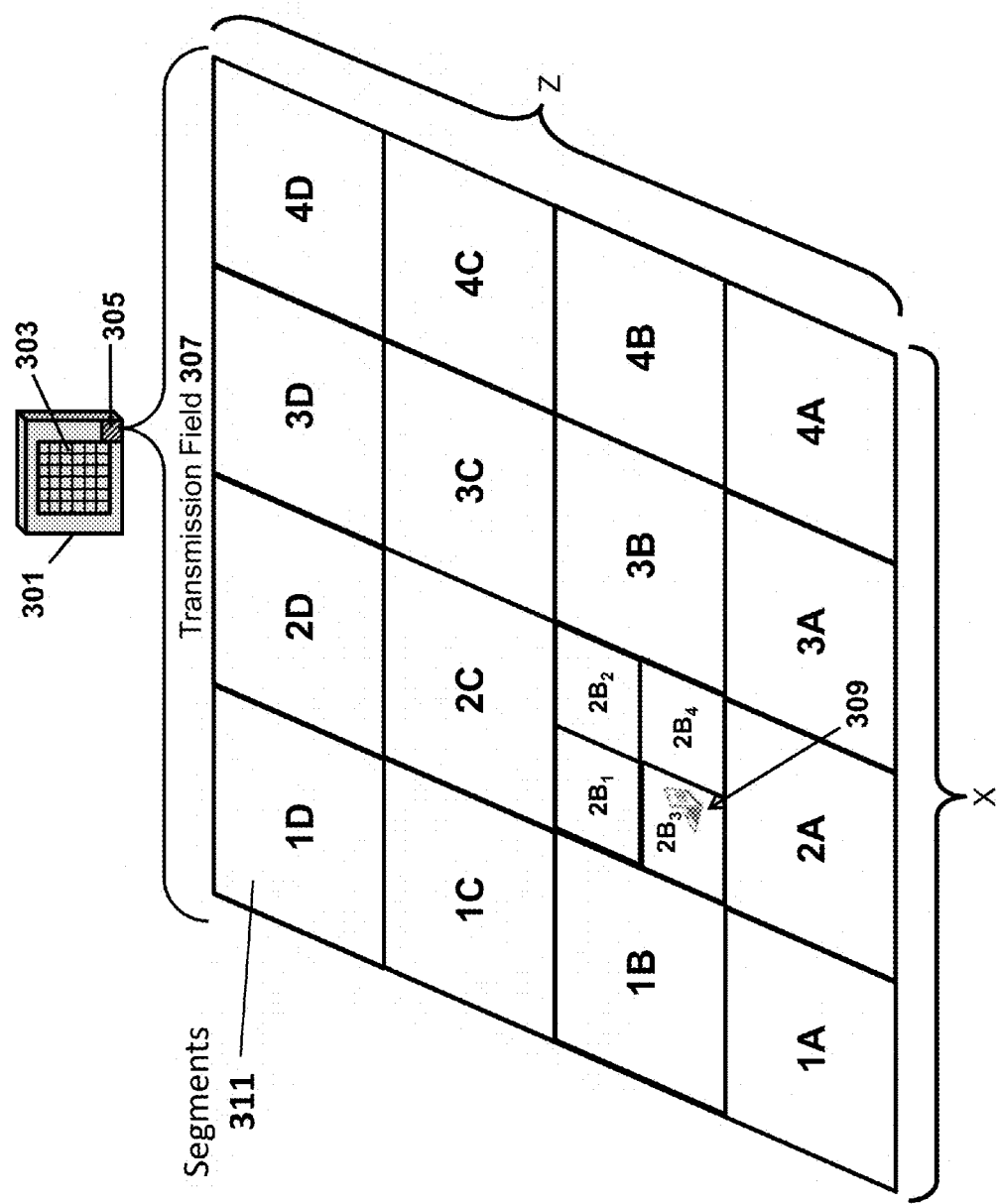
FIG. 3 shows components of a wireless charging system for tracking and updating mapping data for a transmission field of the exemplary system, where the exemplary system executes an exemplary method for locating receivers according to an exemplary embodiment.

FIG. 3 shows components of a wireless charging system 300 for tracking and updating mapping data for a transmission field 307 of the exemplary system 300, where the exemplary system 300 executes an exemplary method, similar to that shown in FIG. 2. The exemplary system 300 comprises a transmitter 301 and receiver device 309.

A transmitter 301 may comprise a communications component 305 that may transmit a communications signal to segments 311 of the transmission field 307 at a given interval. In addition to the communications signal, the transmitter 301 may transmit to the various segments 311, a low-level power wave, i.e., a power wave having a comparatively lower amount of energy that is detectable by receivers but may not contain enough energy to provide wireless power. The communications signal may contain data that indicates to which segment 311 the low-level power was transmitted. This indication may be in the form of information identifying the various characteristics of the low-level power wave (e.g., distance, height, azimuth, elevation, power level).

Although the exemplary embodiment recites the use of a sequential scanning of segments within a transmission field, it is intended that other scanning methods or location identification methods can be used. For example, a receiver may determine its location and identify this location in a transmission of a communication signal to a transmitter. In one configuration, the segments can be replaced by the use of X, Y, Z coordinates or polar coordinates (e.g., azimuth, elevation, distance). In another alternative embodiment, the receiver can respond to the transmitter with an indication of its location without having received a low-level power wave and having only received a communication signal from the transmitter.

In the exemplary embodiment, the transmitter 301 may transmit communications signals and low-level power waves in sequential manner, across the segments 311. A receiver 309 in an occupied segment 2B may eventually receive a communications signal and a low-level power wave, and respond that the receiver 309 gathered the energy from the low-level power wave or that the receiver received the low-level power wave at or above a particular threshold power level.

The transmitter 301 may need more information to determine the location of the receiver 309 with finer detail. In some cases, the transmitter 301 may scan the transmission field 307 more efficiently by scanning larger segments 311 of the transmission field 307. However, in such cases, the segments 311 may be too large to transmit power waves. For each instance where the transmitter 301 receives a response from a receiver 309 indicating that the receiver 309 is found at a particular occupied segment 2B, the transmitter may then scan sub-segments 2B1-4 of the occupied segment 2B; where scanning the sub-segments 2B1-4 may include transmitting communications signals to each respective sub-segment 2B1-4 to determine with finer resolution, the location of the receiver 309. As an example, the transmitter 301 may seek resolution, where a transmitter 307 may transmit a communications signals horizontally, along an X-axis at, e.g., thirty-degree increments. When the transmitter 301 receives an indication from the receiver 309 that the receiver 309 is found at a second segment along the X-axis, the transmitter 307 may then transmit communication signals at one-degree increments within the second segment. The receiver 309 may then indicate that it is located in a second sub-segment along the X-axis. This process may repeat along a Y-axis and a Z-axis, to determine a relative height or elevation for the receiver 309 and a relative distance to the receiver 309.

When a predetermined threshold for granularity is satisfied (i.e., the location of the receiver is determined within a sufficient area), and thus a satisfactorily small-enough pocket of energy may be defined around the receiver, the antennas of the transmitter 301 may transmit one or more power waves to the location of the receiver 309, where the location is defined by, e.g., three coordinates found within a small-enough three-dimensional space. In some embodiments, the transmitter 301 may direct a subset of antennas of a transmitter array 303 to work alongside the communications component of the transmitter 301 to continue scanning the transmission field 307 for additional receivers 309, while another subset of antennas of the antenna array continues to transmit the power waves to the location of the receiver 309. As an example, the transmitter 301 may have 95% of the antenna array 303; focus on transmitting power waves to occupied locations, while the remaining 5% continue to transmit low-level power waves in conjunction with the communication component scanning the transmission field 307.

A transmitter 301 may detect when the receiver 309 moves when the transmitter 301 receives updated feedback data, via the communications signal, from the receiver 309. The transmitter 301 may shut off power waves altogether if the receiver 309 moves too quickly to determine the new location of the receiver 309, or if the receiver 309 stops transmitting feedback data. Ordinarily, the feedback data provided by the receiver 309 indicates the relative amount of power received from the power waves, which may be used to identify and hone the transmitter's 301 and/or the receiver's 309 understanding of where the receiver 309 is located in the transmission field 307. Similarly, the transmitter 301 may implement tracking algorithms to determine whether the receiver 309 is in motion (i.e., determine displacement). In some implementations, the transmitter 301 may use this data to estimate the relative speed the receiver 309 is moving, and how to readjust the power waves accordingly. In some cases, the transmitter 301 can update the power waves such that the power waves converge at a new location where the receiver 309 is estimated to be; and in some cases, the transmitter 301 may update the power waves to transmit to an anticipated new location, in advance of the receiver's 309 arrival at the estimate new location. For example, the transmitter may determine that the antennas may transmit in new places along an X-axis in five-degree increments, as opposed to one-degree increments, as the transmitter 301 determines an increase in the rate of displacement of the receiver 309 over time.

In some instances, in order for the transmitter 301 to figure out which characteristics of the power waves to apply (e.g., phase) to the antennas of the antenna array 303, when searching granular location, the transmitter 301 may determine a distance to a location, such as the distance to a segment 311 on the Z-axis, from every antenna element. In such embodiments, the transmitter 301 may pre-calculate the distance for every point to a receiver 309 or other point of interest. That is, the transmitter 301 anticipates the distance from every transmitter antenna, so that the transmitter 301 may identify the phase and gain of the power waves. This may be done using, e.g., predetermined data or a table, or in real-time based on the receiver's coordinates (X, Y, Z). The transmitter 301 may then determine a delay in the phase of the respective power waves, because the transmitter 301 now knows a relatively precise distance to the receiver 309. In some cases, this pre-calculated distance may be transmitted by the communications component 305 in conjunction with the low-level power waves.

Figure 4:
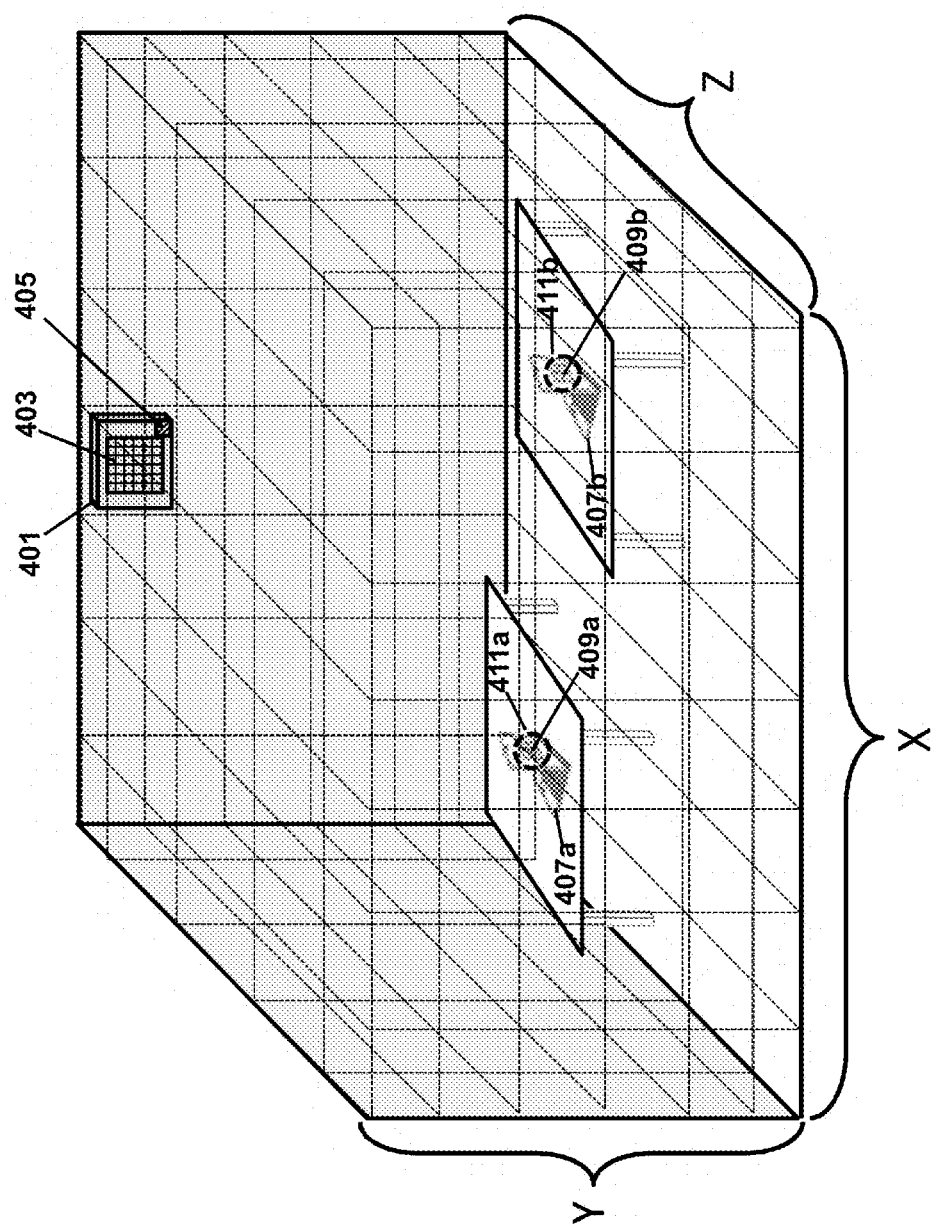
FIG. 4 shows an exemplary wireless power system that employs heat-mapping, for identifying receivers, according to an exemplary embodiment.

FIG. 4 shows an exemplary wireless power system 400 that employs heat-mapping, for identifying receivers 409 inside the service area (i.e., transmission field) of the wireless power system 400. The transmitter 401 may comprise a communications component 405 and an antenna array 403. In this example, the transmitter 401 may be situated at an elevated location within a room, from which the transmitter 401 may execute one or more mapping routines, such as heat-mapping routines to identify the receivers 409.

During heat-mapping routines, the communications component 405 may continuously transmit a communications signal to each sequential segment falling along an X-axis, a Y-axis, and a Z-axis. In addition, in some cases, the antenna array 403 may transmit a power wave having a relatively low power level (i.e., low-level power wave) into each sequential segment, in conjunction with the communications signal. The communication signal may indicate the parameters used to transmit the low-level power signal (e.g., intended coordinates, power level). In some cases, the receiver 409 may use the data of the communications signal to respond to the transmitter 401 with values for the parameters identified in the communication signal to allow the transmitter 401 to identify the receiver's location in the transmission field. And in some cases, the receiver 409 may respond to the communications signal, through a communications channel using a communications protocol and/or technology that is distinct from the power waves, by transmitting a responsive communications signal containing feedback data that the transmitter 401 may use to hone the locational coordinates of the receiver 409, or to otherwise generate or cease power waves. The communications component 405 may progress through each sequential segment in any order. For example, the communications component 405 may transmit a communications signal to segments of coarse intervals within a given plane, attempting to identify receivers 409 on that plane. The communications component 405 may then progress to the next coarse interval segment on the plane, but may rescan a particular segment at relatively more granular sub-segments when a receiver 409 is identified in the coarser segment scan.

In some embodiments, data records may be stored into a mapping memory. The data records may contain data pertaining to attributes of the transmission field. For example, data records of the mapping memory may store data associated with receivers 409, objects identified in the transmission field, and certain locations as defined by a set of coordinates. The mapping memory may be a database that contains the data received from a transmitter 301 and/or receivers 409. The sophistication of the data may vary, from a few bits of binary data indicating whether a receiver 409 received a power wave, to data record pertaining to each attribute of a transmission field. In the current example shown in FIG. 4, the mapping memory stores a number of data points for a number of attributes (e.g., receivers 409, furniture, walls), as such, the mapping memory may store data that may be used to logically generate the heat-map as shown in FIG. 4.

C. Additional or Alternative Methods Associated with Heat Mapping

Figure 5:
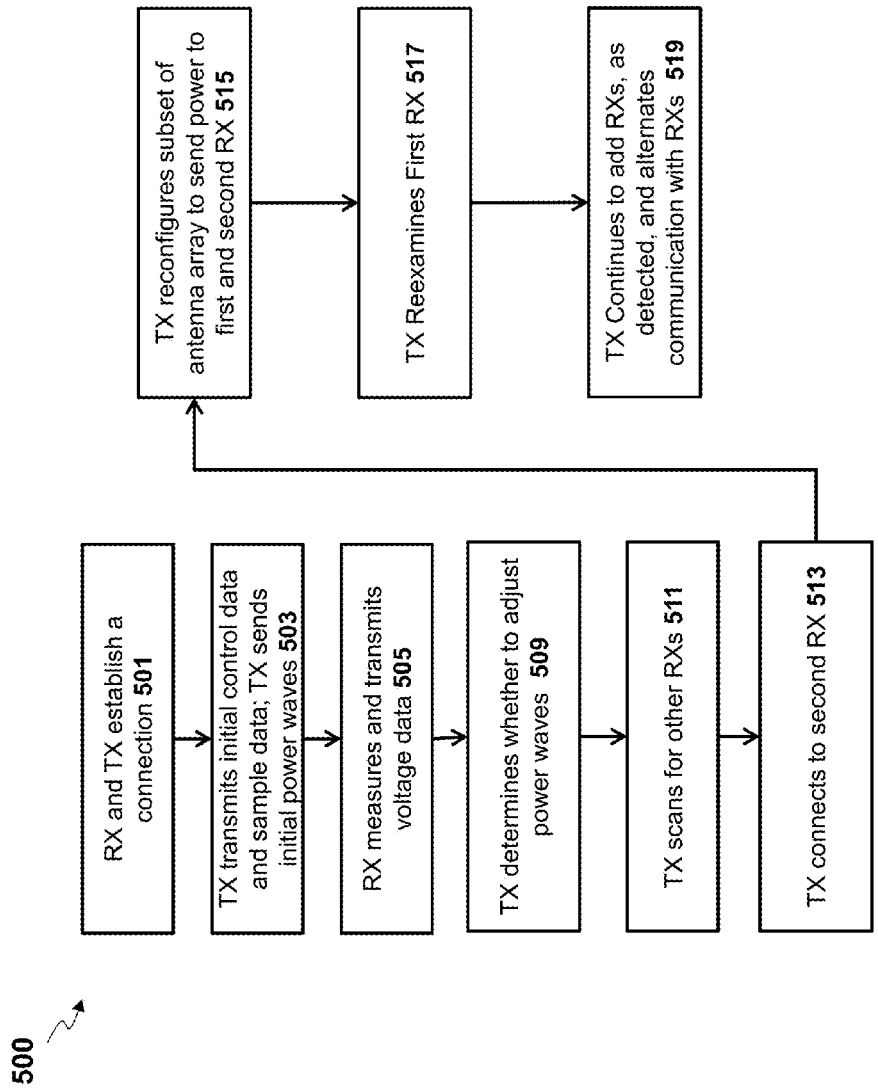
FIG. 5 shows an exemplary method for transmitting power wirelessly, according to an exemplary embodiment.

FIG. 5 shows an exemplary method 500 for transmitting power wirelessly, from a transmitter to any number of receiver devices, to power the receiver devices according to an exemplary embodiment.

In a first step 501, a transmitter (TX) establishes a connection or otherwise associates with a receiver (RX). That is, in some embodiments, transmitters and receivers may communicate control data over a communications signal, using a wireless communication protocol capable of transmitting information between two processors of electrical devices (e.g., Bluetooth®, BLE, Wi-Fi, NFC, ZigBee®). For example, in embodiments implement Bluetooth® or Bluetooth® variants, the transmitter may scan for receiver's broadcasting beacon signals, sometimes called "advertisement signals," or a receiver may transmit an advertisement signal to the transmitter. The advertisement signal may announce the receiver's presence to the transmitter, and may trigger an association between the transmitter and the receiver. As described later, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power waves. The transmitter may use the advertisement signal transmitted to identify the receiver and, in some cases, locate the receiver in a two-dimensional space or in a three-dimensional space. Once the transmitter identifies the receiver, the transmitter may establish the connection associated in the transmitter with the receiver, allowing the transmitter and receiver to communicate communication signals over a second channel.

As an example, when a receiver comprising a Bluetooth® processor is powered-up, or is brought within a detection range of the transmitter, the Bluetooth processor may begin advertising the receiver according to Bluetooth® standards. The transmitter may recognize the advertisement and begin establishing connection for communicating control signals and power transmission signals. In some embodiments, the advertisement signal may contain unique identifiers so that the transmitter may distinguish that advertisement and ultimately that receiver from all the other Bluetooth® devices nearby within range.

In a next step 503, when the transmitter detects the advertisement signal, the transmitter may automatically establish a communication connection with that receiver, the establishment of which may allow the transmitter and receiver to communicate via communications signals. The transmitter may then command the receiver to begin transmitting real-time sample data or control data. The transmitter may also begin transmitting power transmission signals from antennas of the transmitter's antenna array.

In a next step 505, the receiver may then measure the voltage, among other metrics related to effectiveness of the power transmission signals, based on the electrical energy received by the receiver's antennas. The receiver may generate control data containing the measured information, and then transmit control signals containing the control data to the transmitter. For example, the receiver may sample the voltage measurements of received electrical energy, for example, at a rate of one-hundred times per second. The receiver may transmit the voltage sample measurement back to the transmitter, one-hundred times a second, in the form of control signals.

In some embodiments, the transmitter may execute one or more software modules monitoring the metrics, such as voltage measurements, received via the communications signal from the receiver. Algorithms may vary production and transmission of power transmission signals by the transmitter's antennas, to maximize the effectiveness of the pockets of energy around the receiver. For example, the transmitter may adjust the phase at which the transmitter's antenna transmits the power transmission signals, until that power received by the receiver indicates that an effective pocket of energy is established around the receiver. When an optimal configuration for the antennas is identified, memory of the transmitter may store the configurations to keep the transmitter broadcasting at that highest level.

In a next step 509, algorithms of the transmitter may determine when it is necessary to adjust the power transmission signals and may also vary the configuration of the transmit antennas, in response to determining such adjustments are necessary. For example, the transmitter may determine the power received at a receiver is less than maximal, based on the data received from the receiver. The transmitter may then automatically adjust the phase of the power transmission signals, but may also simultaneously continue to receive and monitor the voltage being reported back from receiver.

In a next step 511, after a determined period of time for communicating with a particular receiver, the transmitter may scan and/or automatically detect advertisements from other receivers that may be in range of the transmitter. The transmitter may establish another communications signal connection with the second receiver, which in some cases may be established in response to the second receiver or the transmitter receiving an advertisement or beacon signal from the second receiver or the transmitter, respectively.

In a next step 513, after establishing a second communication connection with the second receiver, the transmitter may proceed to adjust one or more antennas in the transmitter's antenna array for transmitting power waves from the transmitter to the second receiver and the first receiver at the same time or in an alternating manner. In some embodiments, the transmitter may identify a subset of antennas to service the second receiver, thereby parsing the array into subsets of arrays that are associated with a receiver. In some embodiments, the entire antenna array may service a first receiver for a given period of time, and then the entire array may service the second receiver for that period of time.

The transmitter may prioritize transmissions to more than one receiver. For example, the prioritization may be based upon a distance between the receiver and the transmitter, to determine whether the receiver is capable of receiving a sufficient amount of power due to its distance from the transmitter. This distance may be obtained from a communication signal between the transmitter and receiver. In another example, the prioritization may be based upon a power level (i.e., battery level) of a device associated with a receiver and the need of that device to charge its battery (e.g., battery with a low charge may be prioritized over a battery that is almost fully charged). The power level of a device may be obtained from the receiver in a communication signal to the transmitter. Accordingly, the transmitter can allocate a first subset of antennas and a second subset of antennas based upon this prioritization.

Manual or automated processes performed by the transmitter may select a subset of arrays to service the second receiver. In this example, the transmitter's array may be split in half, forming two subsets. As a result, half of the antennas may be configured to transmit power transmission signals to the first receiver, and half of the antennas may be configured for the second receiver. In the current step 513, the transmitter may apply similar techniques discussed above to configure or optimize the subset of antennas for the second receiver. While selecting a subset of an array for transmitting power transmission signals, the transmitter and second receiver may be communicating control data. As a result, by the time that the transmitter alternates back to communicating with the first receiver and/or scan for new receivers, the transmitter has already received a sufficient amount of sample data to adjust the phases of the waves transmitted by second subset of the transmitter's antenna array, to transmit power waves to the second receiver effectively.

In a next step 515, after adjusting the second subset to transmit power transmission signals to the second receiver, the transmitter may alternate back to communicating control data with the first receiver, or scanning for additional receivers. The transmitter may reconfigure the antennas of the first subset, and then alternate between the first and second receivers at a predetermined interval.

In a next step 517, the transmitter may continue to alternate between receivers and scanning for new receivers, at a predetermined interval. As each new receiver is detected, the transmitter may establish a connection and begin transmitting power transmission signals, accordingly.

In one exemplary embodiment, the receiver may be electrically connected to a device like a smart phone. The transmitter's processor would scan for any Bluetooth devices. The receiver may begin advertising data indicating that it is, e.g., a Bluetooth-enabled device, through the communications component of the receiver, such as a Bluetooth® chip. Inside the advertisement, there may be unique identifiers so that the transmitter, upon receiving the response to the advertisement, could distinguish that receiver's advertisement, and ultimately that receiver, from all other receivers within the transmission range. When the transmitter detects that advertisement and notices it is a receiver, then the transmitter may immediately form a communication connection with that receiver and command that receiver to begin sending real time sample data.

The receiver would then measure the voltage at its receiving antennas, send that voltage sample measurement back to the transmitter (e.g., up to, or exceeding, 100 times a second). The transmitter may start to vary the configuration of the transmit antennas by adjusting the phase. As the transmitter adjusts the phase, the transmitter monitors the voltage being sent back from the receiver. In some implementations, the higher the voltage, the more energy may be in the pocket. The antenna phases may be altered until the voltage is at the highest level and there is a maximum pocket of energy around the receiver. The transmitter may keep the antennas at the particular phase so the voltage is at the highest level.

The transmitter may vary each individual antenna, one at a time. For example, if there are 32 antennas in the transmitter, and each antenna has 8 phases, the transmitter may begin with the first antenna and would step the first antenna through all 8 phases. The receiver may then send back the power level for each of the 8 phases of the first antenna. The transmitter may then store the highest phase for the first antenna. The transmitter may repeat this process for the second antenna, and step it through 8 phases. The receiver may again send back the power levels from each phase, and the transmitter may store the highest level. Next, the transmitter may repeat the process for the third antenna and continue to repeat the process until all 32 antennas have stepped through the 8 phases. At the end of the process, the transmitter may transmit the maximum voltage in the most efficient manner to the receiver.

In another exemplary embodiment, the transmitter may detect a second receiver's advertisement and form a communication connection with the second receiver. When the transmitter forms the communication with the second receiver, the transmitter may aim the original 32 antennas towards the second receiver and repeat the phase process for each of the 32 antennas aimed at the second receiver. Once the process is completed, the second receiver may get as much power as possible from the transmitter. The transmitter may communicate with the second receiver for a second, and then alternate back to the first receiver for a predetermined period of time (e.g., a second), and the transmitter may continue to alternate back and forth between the first receiver and the second receiver at the predetermined time intervals.

In yet another implementation, the transmitter may detect a second receiver's advertisement and form a communication connection with the second receiver. First, the transmitter may communicate with the first receiver and re-assign half of the exemplary 32 the antennas aimed at the first receiver, dedicating only 16 towards the first receiver. The transmitter may then assign the second half of the antennas to the second receiver, dedicating 16 antennas to the second receiver. The transmitter may adjust the phases for the second half of the antennas. Once the 16 antennas have gone through each of the 8 phases, the second receiver may be obtaining the maximum voltage in the most efficient manner to the receiver.

D. Mobile App for Receiver

In some instances, a receiver may be embedded into an electrical device, or may be controlled by a software application associated with the wireless power system. These instances arise where, e.g., the receiver and the electrical device are the same product, or the receiver has the capability to receive power waves, but may not comprise an operable communications component. In such instances, the software application, such as a smartphone application, may be used to identify or "tag" the receiver on behalf of a transmitter.

A tag may be any means of conveying to the transmitter that the transmitter is responsible for transmitting power waves to the receiver of the electrical device, regardless of whether the typical data exchange takes place. For example, in one embodiment, an administrator may use a smartphone, executing a software application of the system, to inform the transmitters to transmit power waves to a wall clock comprising receiver antennas, but lacking a communications component. Using the smartphone application, the user may place the smartphone nearby the wall clock and then select an interface input to transmit the transmission field coordinates of the wall clock to the transmitter and/or a mapping memory. As a result, the transmitter will continue to transmit power waves to the receiver, based upon the now "tagged" location provided by the smartphone application.

In some instances, the smartphone application may generate an interface indicating for the user a suggested location for receiving power waves in a pocket of energy. That is, the smartphone application may query a memory map to identify where the transmitters and/or receivers have determined to form pockets of energy and avoid identified sensitive objects. The mapping memory data may provide the smartphone application with coordinates data that the smartphone application may be preconfigured to understand and interpret to identify the locations of pockets of energy. In some embodiments, however, the smartphone may execute one or more of the algorithms performed by the receiver devices, as disclosed herein, to identify the most efficient location to place the receiver. The smartphone app may dynamically determine where within a transmission field the receiver may receive a maximally efficient amount of power from power waves or pockets of energy, as transmitted into a transmission field by one or more transmitters. The smartphone application may determine from any number of power pockets in a transmission field, which power pocket is most effective, or even the closest, and then generate an interface with an indicator, such as an arrow, directing the user to the pocket of energy.

III. Transmitter Sensors & Identifying Sensitive Objects

Some modes of operation may be sensitive to the regulatory requirements pertaining to living beings and sensitive objects. Living beings may include human beings, and other living beings such as domesticated animals. Sensitive objects include certain equipment and other valuable objects that are sensitive to electromagnetic energy in power waves. In another mode of operation, sensors may detect inanimate objects that have been tagged to avoid wireless power transmission, such as obstacles to power transmission, in trajectories of power waves. Under these circumstances, data sensors may cause transmitters to reduce or terminate power waves, or to redirect power waves (e.g., to avoid obstacles) or other responses described above.

In addition, the system for forming pockets of energy includes safety measures to address circumstances in which entities (such as objects) within the transmission field may interfere with reliable detection of humans or other living beings or sensitive objects in proximity to pockets of energy. In one embodiment, sensors detects inanimate objects or other entities (called objects in the following discussion) that have been tagged to be excluded from receipt of wireless power transmission in trajectories of power waves. Under these circumstances, sensors may cause transmitters to reduce or terminate power waves, to redirect power waves away from the tagged object, and/or other safety measures such as activating alarm. Tagged inanimate objects may include for example obstacles that interfere with sensor reception, and objects that may be occupied by infants or young children such as cribs.

To enable transmitter to detect and confirm objects that the user wishes to exclude from receipt of wireless power, the user may communicate to transmitter tagging information to be recorded in a mapping memory of transmitter. For example, the user may provide tagging information via a user device in communication with the controller of transmitter, via a graphical user interface (GUI) of the user device. Exemplary tagging information includes location data for an electrical device, which may include one-dimensional coordinates of a region in space containing the object, two-dimensional (2D) coordinates of a region in space containing the object, or three-dimensional (3D) coordinates of a region in space containing the object.

Additionally, tagging information for objects to be excluded from receipt of wireless power may be provided by scanning the transmission field of a wireless power system with sensors to detect such objects. Scanning with sensors dynamically maintains the mapping memory of transmitter, for example to update tagging information previously provided to the mapping memory via a user device as described above. In an embodiment, the transmission field of wireless power system is scanned periodically to detect sensor responses indicating updated tagging information for objects to be excluded from receipt of wireless power, using one or more of pyro-electric sensors, ultrasound sensors, millimeter sensors, and power sensors, or other sensor technologies.

Sensors may detect various conditions, such as the presence of sensitive objects or tagged objects, within a two or three-dimensional space (i.e., transmission field) serviced by a wireless charging system. Acting in conjunction with one or more transmitters of a wireless charging system, sensors and transmitters may execute various methods for providing safe, reliable, and efficient wireless power, by dynamically producing, adjusting, and/or terminating power waves generated by the transmitters. As detailed further herein, when determining the appropriate waveform characteristics for power waves, a transmitter may calculate the power levels of those power waves converging to form a pocket of energy at a predetermined location within a transmission field. These power levels measurements may include, for example, the power density (W/m2) and/or the electric field level (V/m), though one having ordinary skill in the art would appreciate that other measurements are possible as well.

A. Sensors Identifying Devices & Adjusting Power Waves

Figure 6:
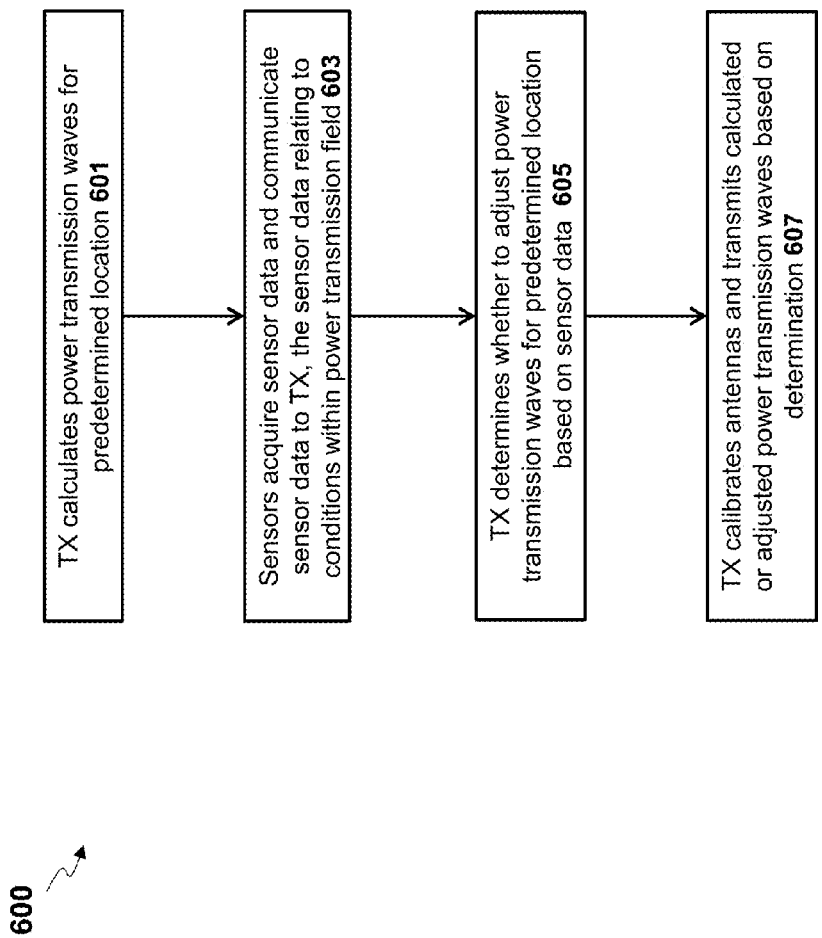
FIG. 6 illustrates steps of wireless power transmission using sensors, according to an exemplary embodiment.

FIG. 6 shows execution steps of an exemplary method 600 of wireless power transmission using sensor data to automatically identify and adjust certain operating conditions of wireless a power transmission system.

At a first step 601, a transmitter calculates power waves for a predetermined location within a transmission field, which may be a two or three-dimensional space receiving wireless power services from the transmitters of the wireless power system. The transmitter may calculate power waves for the predetermined location during the start-up of operation of the transmitter, or may calculate power waves for the predetermined location during ongoing wireless power transmissions of the transmitter. In some implementations, the transmitter calculates power waves for a predetermined location for forming pockets of energy at the predetermined location. As disclosed herein, in calculating power waves, the transmitter may calculate power levels of power waves that converge in a three dimensional space to form one or more first pockets of energy at a predetermined location at the predetermined location, such as power density (W/m2) and/or electric field level (V/m).

In some embodiments of this step 601, the transmitter's calculation power waves, for a predetermined location, is included in mapping data or heat-map data, used for determining pocket-forming locations for power waves transmitted by the transmitter. The heat-map data may be stored in a mapping database maintained by transmitter, or may be maintained in a database stored externally to transmitter, such as a database stored at a server in communication with transmitter. In an embodiment, the transmitter associates the calculated power waves with location coordinates (e.g., 3D or 2D coordinates) of a transmission field at the predetermined location.

In additional or alternative embodiments of this step 601, the transmitter transmits power waves that converge in a transmission field to form one or more first pockets of energy at the predetermined location, and power transmission signals that converge to form one or more second pockets of energy at a second location, separated from the predetermined location. In an embodiment, the power waves generate side lobes, which result in formation of, sometimes undesired, second pockets of energy. In an embodiment, the predetermined location of the one or more first pockets of energy, and the second location of the second pockets of energy, both are included in a heat-map of pocket forming locations of the transmitter. Where such side lobes result in undesired second pockets of energy, the location data for the second pockets of energy may be used to generate a null (i.e., converge power waves to produce destructive interference) at the location of the second pockets of energy.

At a next step 603, sensors may communicate, to the transmitter, sensor data relating to conditions within the power transmission field. In an embodiment, sensors communicate sensor data relating to unsafe or prohibited operating conditions of the system (e.g., power levels for power waves transmitted at a particular location would exceed a permissible amount). In one embodiment, the sensors communicate sensor data relating to the presence of living beings or sensitive objects within the transmission field. In another embodiment, the sensors communicate sensor data relating to presence of one or more objects to be excluded from receipt of power waves. For example, there may instances where, regardless of whether a person is presently detected by a sensor at a particular location; it might be preferable to altogether avoid transmitting power waves to the particular location.

In an embodiment of step 603, sensors acquire and communicate to the transmitter location related information concerning a living being or object. In an embodiment, one or more sensors acquire information concerning the distance from the one or more sensors of a detected living being or object. In another embodiment, one or more sensors acquire information indicating a motion of the living being or object based upon a series at different times of the data indicating the presence of the living being or object. In another embodiment of step 603, sensors acquire and communicate location-related information, and at least one non-location attribute, of a living being or object. In an embodiment, at least one non-location attribute of the living being or object includes one or more of pyro-electric sensor responses, optical sensor responses, ultrasound sensor responses, and millimeter sensor responses.

At step 605, a transmitter determines whether to adjust power waves for the predetermined location based on the sensor data acquired and communicated at a previous step 603. In an embodiment, a transmitter compares location data for a living being or object identified by the sensors in a previous step 603 with one dimensional, two dimensional, or three-dimensional coordinates of the predetermined location. In an embodiment, the transmitter compares the power levels (e.g., power density (W/m2), electric field level (V/m)) of the power waves converging at or set to converge at the predetermined location, as calculated at a previous step 601, against one or more maximum permissible power levels for safe operation.

In another embodiment of step 605, the transmitter compares object detection data that relates to one or more objects, and may be stored as mapping data or sensor data, against tagging information that indicates an object is to be excluded from receipt of power waves. In an embodiment, tagging information indicating an object is to be excluded from receipt of power waves was previously communicated to the transmitter by a user device, such as a workstation computer or smartphone executing a software application associated with the wireless power charging system. In another embodiment, tagging information relating to an object to be excluded from receipt of power waves was provided to transmitter by one or more sensors while scanning the transmission field for objects, e.g., sensitive objects and/or receivers. In a further embodiment, one or more sensors obtain measurements of the sensors' sensitivity at various regions within the transmission field, and communicate the sensitivity measurements to the transmitter. Regions in the transmission field where the sensors have low sensor sensitivity measurements are tagged to be excluded from receipt of power waves, by a sensor processor or transmitter processor.

At a next step 607, after determining power levels for transmitting power waves, the transmitter calibrates antennas and transmits power waves based on the determinations made during a previous step 605. In circumstances where the determination does not detect an unsafe or prohibited condition, then power waves transmitted in step 607 may have the waveform characteristics (e.g., power levels) that were initially calculated at a previous step 605. On the other hand, in circumstances where the determination detects an unsafe or prohibited condition, the power waves transmitted in step 607 may be terminated from transmitting or they may have updated waveform characteristics, adjusted as needed from the power waves calculated at step 601. In various embodiments, the unsafe or prohibited condition may be information relating to the location of a living being or a sensitive object indicating that the living being or sensitive object is proximate (e.g., touching, adjacent, nearby) to a predetermined location (e.g., location for a pocket of energy), or may be object detection data that corresponds to tagging information relating to an object to be excluded from receipt of power waves.

In an embodiment of step 607, the transmitter reduces the power level of the power waves at the predetermined location when the determination at step 605 identifies an unsafe or prohibited condition. In another embodiment, the transmitter terminates transmission of the power waves to the predetermined location when the determination at step 605 identifies an unsafe or prohibited condition. In a further embodiment, the transmitter adjusts the characteristics of the power waves to diminish the amount of energy provided by the power waves at the predetermined location, when the determination at step 605 identifies an unsafe or prohibited condition. In another embodiment, when the determination at step 605 identifies an unsafe or prohibited condition at a particular location in the transmission field, the transmitter may adjust the characteristics of the power waves, or adjusts the antenna array of the transmitter, to redirect the power waves around the particular location. Additionally or alternatively, the transmitter may activate an alarm when the transmitter identifies an unsafe or prohibited condition at step 605, based upon the sensor data received from the sensors associated with the transmitter.

The initially-calculated or adjusted power waves transmitted in the current step 607 may be RF waves the converge into constructive interference patters, which may eventually form pockets of energy, which may be intercepted or otherwise received by antennas of a receiver. The receiver may rectify the RF waves to then convert the rectified RF waves into a constant DC voltage, which may be used to charge or power an electronic device.

B. Adaptively Adjusting Power Waves in Ongoing Power Charging

Figure 7:
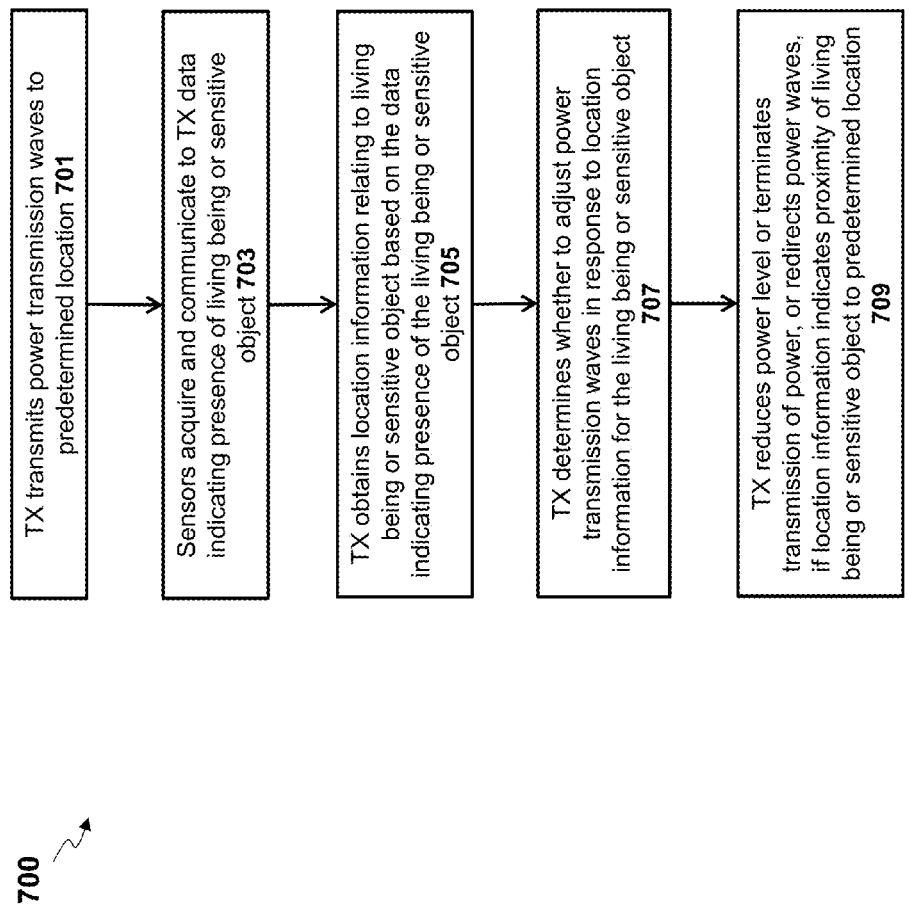
FIG. 7 illustrates steps of wireless power transmission using sensors, according to an exemplary embodiment.

FIG. 7 shows steps of an exemplary method 700 for wireless power transmission that protects living beings and other sensitive objects during ongoing transmission of power waves by transmitters of a wireless power system. Transmitters of a wireless power system may comprise sensors that detect whether a living being or sensitive object is in proximity to one or more pockets of energy, power waves, and/or a transmitter. In these circumstances, the sensor data generated by the sensors may cause the transmitter to reduce or terminate power levels of power waves, among a number of additional or alternative actions.

At a first step 701, a transmitter transmits power waves to a predetermined location. As mentioned, the power waves transmitted at this step 701 may converge into a three-dimensional constructive interference pattern, eventually forming one or more pockets of energy at the predetermined location. The predetermined location may be included in mapping data, such as sensor data or heat-map data, used for determining where in a transmission field to transmit power waves. In some implementations, the mapping data containing the predetermined location may be stored in a mapping memory that is internal or external to the transmitter. In some implementations, the mapping data may be generated in real-time or near real-time by a transmitter processor or a sensor processor. In addition, in some implementations, the mapping data containing the predetermined location may be provided from a user device, through a software application associated with the wireless charging system.

In some embodiments of step 701, the transmitter transmits power waves that converge in the transmission field to form a pocket of energy at the predetermined location, and also power waves that converge to form a second pocket of energy at a second location in the transmission field, which is separate from the predetermined location for the first pocket of energy. That is, in some instances, power waves may result in the generation of side lobes of power waves, which causes the formation of one or more second pockets of energy, in addition to the first pocket of energy generated at the predetermined location. In some implementations, the predetermined location for the first pocket of energy and the second location having the second pocket of energy, are both included in mapping data (e.g., sensor data, heat-map data), tracking the locations of pocket-forming for the transmitter. Although waveform generation and transmission techniques may be employed to avoid or reduce formation of side lobes, various embodiments of wireless power transmission disclosed herein, such as the exemplary method 700, may intelligently protect living beings and sensitive objects when these and other types of second pockets of energy are present in a transmission field.

At a next step 703, one or more sensors acquire raw sensor data indicating presence of a living being or sensitive object, and then communicate raw or processed sensor data to the transmitter. In an embodiment, sensors may acquire and communicate location-related information concerning the living being or sensitive object. In an embodiment, one or more sensors acquire and communicate to the transmitter location-related information, and at least one non-location attribute, of the living being or sensitive object. In an embodiment, at least one non-location attribute of the living being or sensitive object includes one or more of pyro-electric sensor responses, optical sensor responses, ultrasound sensor responses, and millimeter sensor responses.

In an embodiment, a first sensor is located at a first position on the transmitter, and a second sensor is located at a second position on the transmitter separated from the first position. The first and second sensors acquire stereoscopic data indicating presence of a living being or sensitive object.

In an embodiment, a first sensor provides a first type of data indicating the presence of the living being or the sensitive object, and a second sensor provides a second type of data indicating the presence of the living being or the sensitive object. Use of mixed sensor types generally improves target discrimination. In an embodiment, at least one of the first types of data and the second type of data indicates location in three-dimensional space of the living being or the sensitive object.

In an embodiment, one or more sensors acquire and communicate to the transmitter human recognition sensor data, including one or more of body temperature data, infrared range-finder data, motion data, activity recognition data, silhouette data, gesture data, heart rate data, portable devices data, and wearable devices data. Additionally or alternatively, the one or more sensors that acquire sensor data indicating presence of a living being or sensitive object may comprise one or more of a passive sensor, an active sensor, and a smart sensor. The sensors may include one or more of an infrared sensor, a pyro-electric sensor, an ultrasonic sensor, a laser sensor, an optical sensor, and Doppler sensor, an accelerometer, a microwave sensor, a millimeter sensor, a resonant LC sensor, and an RF standing wave sensor.

At a next step 705, the transmitter obtains sensor data from the sensor or mapping memory, comprising location-related information corresponding to a living being or sensitive object, as indicated by the raw or processed sensor data generated by the sensor indicating the presence of the living being or sensitive object. As an example, one or more sensors may acquire raw sensor data identifying the presence of a living being or sensitive object, process the raw sensor data, and then generate sensor data containing information indicating the distance of the living being or sensitive object from one or more sensors or transmitters.

In another embodiment, a first sensor is located at a first position on the transmitter, and a second sensor is located at a second position on the transmitter separated from the first position. In step 705, the transmitter obtains stereoscopic location data relating to a living being or sensitive object based on the data acquired by the first and second sensors located at separated positions on the transmitter. In an embodiment, in step 705, the transmitter combines distance information with other information, such as stereoscopic sensor data, in order to determine the proximity of the living being or sensitive object to a predetermined location for the power waves, or other location within the transmission field where transmission of power waves should be avoided.

In a further embodiment, one or more sensors may acquire raw sensor data or generate processed sensor data containing information indicating the displacement or motion of a living being or sensitive object in a transmission field, based upon a series at different times of the data indicating the presence of the living being or sensitive object. In step 705, the transmitter uses this motion information to sense movement of the living being or sensitive object relative to the predetermined location.

In some embodiments, in step 705, one or more sensors, the transmitter, or both, may filter sensor data indicating the presence of a living being or sensitive object, to eliminate or minimize false positives (i.e. false indications of the presence of a living being or sensitive object). This filter may query, alter, and/or remove the information relating to a location of the living being or the sensitive object, as required. As an example, a sensor processor of a pyroelectric sensor may apply filtering techniques to the pyroelectric sensor data associated with an extraneous heat source detected within the transmission field of a transmitter. In this example, the filtering may exclude data points corresponding to the extraneous heat source from the sensor data indicating a living being or sensitive object.

At a next step 707, a transmitter determines whether to adjust the characteristics of the power waves, based upon the location data associated with a living being or sensitive object identified in mapping data or sensor data. The transmitter compares the location data for the living being or sensitive object, obtained at a previous step 705, against planar coordinates (e.g., one-dimensional coordinates, two-dimensional coordinates, three-dimensional coordinates, polar coordinates) associated with the predetermined location, where the coordinates for the predetermined location may be stored in a mapping memory of the transmitter or the wireless charging system. In an embodiment, the transmitter compares the power levels generated by the power waves at the predetermined location (e.g., power densities (W/m2) and/or electric field levels (V/m)), which may be power levels that were calculated at a previous step 701, against one or more maximum permissible power level for the living being or sensitive object.

In some implementations, in step 707, the transmitter may apply safety techniques to the determination of whether to adjust the power waves, using the location data in the sensor data associated with the living being or sensitive object. One safety technique is to include a margin of error (e.g., a margin of 10%-20%) beyond the regulatory limits or other limits on maximum permissible power level or on EMF exposure, to ensure living beings or sensitive objects are not exposed to power levels at or near the limits. A second safety technique involves multistage determinations of whether, and how, to adjust characteristics of the power waves. For example, at a first stage, the location data generated by the sensor may indicate movement of a living being or sensitive object, toward the location of a pocket of energy, resulting in a determination to reduce power level of power waves (i.e., anticipating that living being or sensitive object enter the pocket of energy). At a second stage, the location data may indicate the arrival of the living being or sensitive object at the location of the pocket of energy, resulting in a determination to terminate power waves.

At a next step 709, the transmitter may execute one or more actions, if the transmitter determines at a previous step 707 to adjust power waves based on the location data in the sensor data associated with the living being or sensitive object. In some cases, the transmitter reduces the power level of the power waves at the predetermined location, when the transmitter determines at a previous step 707 to adjust the power waves. In some cases, the transmitter terminates transmission of the power waves to the predetermined location, when the transmitter determines at a previous step 707 to adjust or terminate the power waves. In some cases, the transmitter diminishes the amount of energy of the power waves at the predetermined location, when the transmitter determines at a previous step 707 to adjust the power waves. In some embodiments, the transmitter redirects the transmission of the power waves around the living being or sensitive object, when the transmitter determines at a previous step 707 to adjust the power waves. Additionally or alternatively, the transmitter may activate an alarm of the transmitter or wireless charging system, when the transmitter determines at previous step 707 to adjust the power waves.

C. Tagging Objects to Avoid

Figure 8:
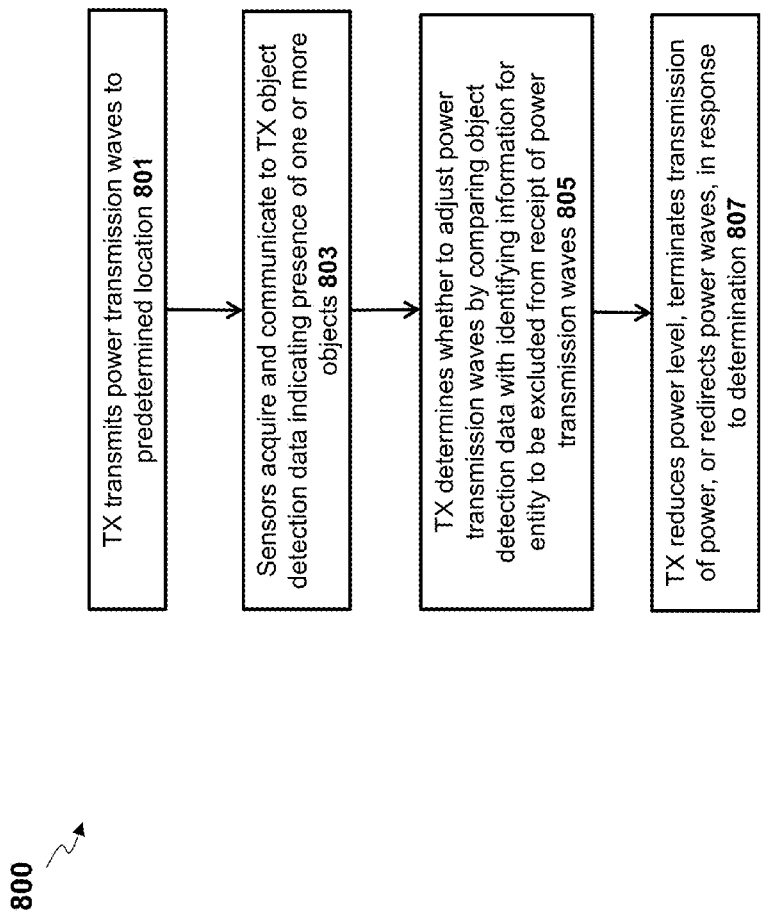
FIG. 8 illustrates steps of wireless power transmission using sensors, according to an exemplary embodiment.

FIG. 8 illustrates a method of wireless power transmission in which sensors acquire object detection data by detecting one or more objects, which may be inanimate objects such as obstacles to power transmission, during ongoing transmission of power waves by a transmitter. A transmitter compares the object detection data with identifying information relating to an entity to be excluded from receipt of power waves, and based on this comparison, determines whether to adjust transmission of the power waves.

At step 801, transmitter transmits power waves to a predetermined location. In an embodiment, the power waves transmitted at this step converge in a three dimensional pattern to form one or more pockets of energy at the predetermined location.

At step 803, at least one sensor acquires and communicates to the transmitter object detection data indicating presence of one or more objects. In an embodiment, the object detection data includes location related information for the one or more objects. In an embodiment, the object detection data comprises location related information for the one or more objects, and at least one non-location attribute for the one or more objects. In an embodiment, at least one sensor includes one or more of a passive sensor, an active sensor, and a smart sensor. In an embodiment, at least one sensor includes one or more of an infrared sensor, a pyroelectric sensor, an ultrasonic sensor, a laser sensor, an optical sensor, an Doppler sensor, an accelerometer, a microwave sensor, a millimeter sensor, a resonant LC sensor, and an RF standing wave sensor.

At step 805, the transmitter determines whether to adjust the transmission of the power waves by comparing the object detection data with identifying information relating to an entity to be excluded from receipt of the power waves. In an embodiment, identifying information for the object to be excluded from receipt of power waves was previously communicated by a user to the transmitter for storage in a database of the transmitter. The identifying information may include information concerning the location of the object to be excluded from receipt of power waves, and may include non-location information concerning the object to be excluded from receipt of power waves. The user may provide the identifying information using a graphical user interface (GUI) (such as a standard web browser) on a computer device in communication with the transmitter. The computer device may be for example a desktop computer, a laptop computer, a tablet, a PDA, a smartphone and/or another type of processor-controlled device that may receive, process, and/or transmit digital data. The computer device may be configured to download the graphical user interface from an application store to communicate with the transmitter.

In another embodiment, the identifying information for the object to be excluded from receipt of power waves is provided to the transmitter by at least one sensor via scanning a transmission field for the wireless power transmission to detect the identifying information.

In an embodiment, identifying information for the entity to be excluded from receipt of power waves comprises one-dimensional coordinates of a region in space containing the entity, or two-dimensional coordinates of the region in space containing the entity, or three-dimensional coordinates of the region in space containing the entity.

In an embodiment, the object detection data comprises location related information for the one or more objects and at least one non-location attribute of the one or more objects. In an embodiment, at least one non-location attribute includes one or more of pyro-electric sensor responses, optical sensor responses, ultrasound sensor responses, millimeter sensor responses of the designated device, and power sensor responses of the one or more objects.

In an embodiment, at least one sensor obtains sensitivity measurements of the sensor at various regions in space, and communicates these sensitivity measurements to the transmitter. A region in space with a low sensitivity measurement of the sensor is tagged by transmitter to be excluded from receipt of power waves. This dynamic scanning method avoids transmission of power waves to regions in space in which a sensor is blocked from detecting, or may be otherwise unable to detect, unsafe or prohibited conditions of wireless power transmission system.

In an embodiment, the object detection data includes location related information for the one or more objects, and the identifying information includes coordinates of the entity to be excluded from receipt of the power waves. In determining whether to adjust the transmission of the power waves, the transmitter determines whether the location related information indicates that the one or more objects are proximate to the coordinates of the entity to be excluded from receipt of the power waves.

At step 807, the transmitter reduces power level, terminates transmission of power waves, or redirects the power waves if the transmitter determines at step 805 to adjust the transmission of the power waves. In an embodiment, the transmitter reduces the power level of the power waves at the predetermined location when the transmitter determines at step 805 to adjust the power waves. In another embodiment, the transmitter terminates transmission of the power waves to the predetermined location when the transmitter determines at step 805 to adjust the power waves. In a further embodiment, the transmitter diminishes energy of the power waves at the predetermined location when the transmitter determines at step 805 to adjust the power waves. In another embodiment, the transmitter redirects the power waves when the transmitter determines at step 805 to adjust the power waves. In addition, the transmitter may activate an alarm when the transmitter determines at step 805 to adjust the power waves.

D. Identifying Receivers with Sensors

As previously mentioned, in some implementations, sensors may be configured to identify receivers in a transmission field that should receive power waves from a transmitter. In such implementations, the transmitter may gather mapping data for receivers in the transmission field as an alternative or as a supplement to the communications component typically used by the transmitter to identify receivers. As an example, this alternative or additional solution of identifying receivers may be implemented by a transmitter when the receiver and/or the transmitter do not have access to a communications component.

Figure 9:
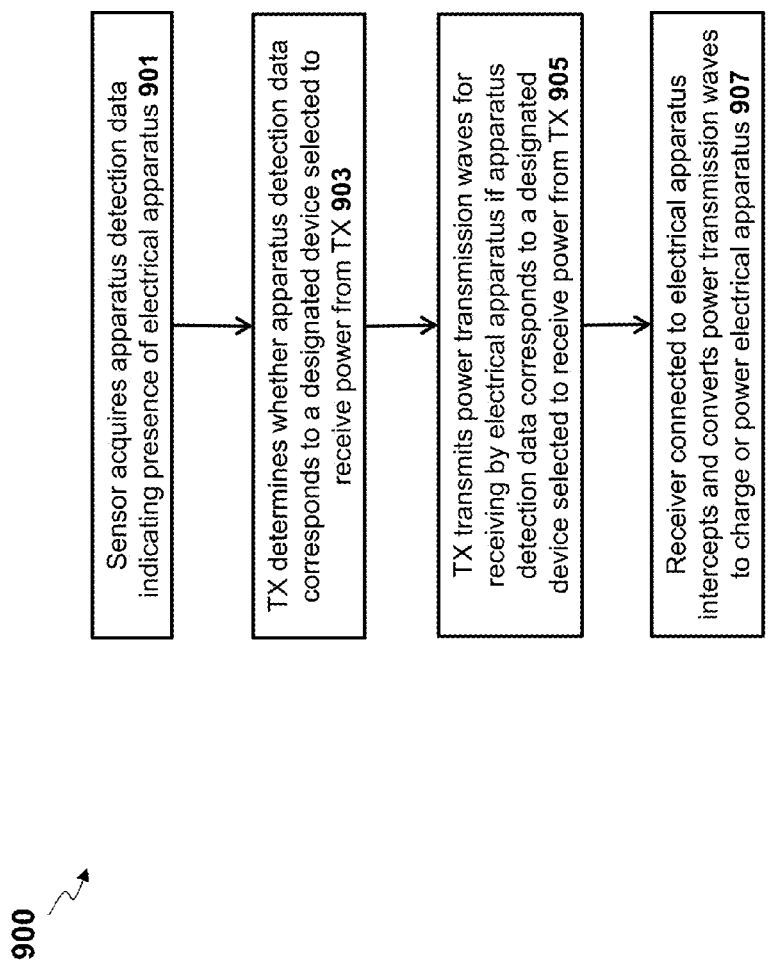
FIG. 9 illustrates steps of wireless power transmission using sensors, according to an exemplary embodiment.

FIG. 9 illustrates a method of wireless power transmission that powers or charges electrical devices selected (e.g., by a user) to receive power from the wireless power system. For example, the method of FIG. 9 can transmit wireless power to electrical devices, such as alarm clocks or smoke alarms, which do not include a communications component that transmits communications signals to the transmitter in order to exchange data in real-time or near real-time. In this method, sensors detect electrical devices and communicate apparatus detection data to the transmitter. The transmitter determines whether the apparatus detection data corresponds to a designated device selected to receive power from the transmitter with reference to a database of the transmitter including identifying information for one or more such designated devices. Based on this determination, transmitter may transmit power waves that converge to form one or more pockets of energy at the locations of any detected electrical devices corresponding to the designated devices selected to receive wireless power transmission.

At step 901, at least one sensor acquires apparatus detection data indicating the presence of an electrical apparatus. In an embodiment, the apparatus detection data includes information on the location of the electrical apparatus. In another embodiment, the apparatus detection data includes information on the location of the electrical apparatus, and at least one non-location attribute for the electrical apparatus. In an embodiment, at least one sensor includes one or more of pyro-electric sensors, optical sensors, ultrasound sensors, millimeter sensors, and power sensors, among other sensor technologies.

At step 903, the transmitter determines whether the apparatus detection data acquired at step 901 corresponds to a designated device selected to receive power from the transmitter. In an embodiment, identifying information for one or more designated device selected to receive power from the transmitter was previously communicated by a user to the transmitter for storage in a database of the transmitter. The identifying information may include information concerning the location of the one or more designated device, and may include non-location information concerning the designated device. The user may provide the identifying information using a graphical user interface (GUI) (such as a standard web browser) on a computer device in communication with the transmitter. The computer device may be for example a desktop computer, a laptop computer, a tablet, a PDA, a smartphone and/or another type of processor-controlled device that may receive, process, and/or transmit digital data. The computer device may be configured to download the graphical user interface from an application store to communicate with the transmitter.

In an embodiment, the apparatus detection data includes information on the location of the electrical apparatus, and the transmitters compares this information with previously stored one-dimensional coordinates of a region in space containing the designated device, two-dimensional coordinates of the region in space containing the designated device, or three-dimensional coordinates of the region in space containing the designated device. In an example, the transmitter compares apparatus detection data indicating the location of the electrical apparatus (e.g., wall clock) at coordinates within a transmission field, against previously stored data records in a database coupled to the transmitter, where the data records contain data for designated devices selected to receive power from the transmitter. Based on correspondence between the location of the electrical apparatus and the previously stored transmission field coordinates, the transmitter determines that the electrical apparatus corresponds to the wall clock, and thus the wall clock should receive power waves from the transmitter at the particular coordinates.

In an embodiment, the apparatus detection data includes information on the location of the electrical apparatus, and at least one non-location attribute of the electrical apparatus. In an embodiment, the at least one non-location attribute includes one or more of pyro-electric sensor responses, optical sensor responses, ultrasound sensor responses, millimeter sensor responses of the designated device, and power sensor responses of the designated device. In an example of a non-location attribute, the apparatus detection data includes an identifier, such an RFID tag, and the transmitter compares this identifier with a unique identifier of the designed device previously stored in the transmitter. Based on correspondence between the identifier of the apparatus detection data and the previously stored unique identifier of the designed device, the transmitter determines that the electrical apparatus corresponds to the designated device. The transmitter may make a determination to transmit power to the electrical apparatus in this example, even though the electrical apparatus may have moved to a different location than a location of the designated device previously stored in the transmitter database.

In an embodiment, the apparatus detection data includes information on the location of the electrical apparatus, and in addition to carrying out the determination step 903, the transmitter stores mapping information corresponding to the location of the electrical apparatus, for future reference. In an embodiment, the apparatus detection data includes information on the location of the electrical apparatus, and in addition to carrying out the determination step 903, the transmitter updates previously stored mapping information corresponding to the location of the electrical apparatus.

In an embodiment of step 903, in determining whether the apparatus detection data corresponds to a designated device, the transmitter further determines identification and attribute information for the designated device, the identification and attribute information including one or more of level of power usage of the designated device, duration of power usage of the designated device, power schedule of the designated device, and authentication credentials of the designated device.

At step 905, the transmitter transmits power waves for receiving by the electrical apparatus if the apparatus detection data corresponds to a designated device selected to receive power from the transmitter. In an embodiment in which the transmitter determines identification and attribute information for the designated device, that identification and attribute information may control whether, or when, the transmitter transmits power waves for receiving by the electrical apparatus. Examples of identification and attribute information include power usage of the designed device, duration of power usage of the designated device, power schedule of the designated device, and authentication credentials of the designated device.

At step 907, in the event the electrical apparatus is connected to a receiver, the receiver intercepts and converts the power waves to charge or power the electrical apparatus. In an embodiment in which the power waves are RF waves that form one or more pockets of energy in the form of constructive interference patterns of the RF waves, and then the receiver gathers the energy from the resulting pocket of energy. Here, the receiver rectifies the energy from the RF waves that produce the pocket of energy, and converts the rectified RF waves into a constant DC voltage that can charge or power the electrical apparatus.

E. Exemplary Embodiment

In the following exemplary embodiment of a sensor subsystem of a wireless power transmitter ("transmitter"), the transmitter may comprise two types of sensors: a primary sensor and a secondary sensor. The primary sensor may implement any sensor technology capable of capturing and generating sensor data regarding temperature or heat information for objects (e.g., living beings) located within a transmission field, which may include infrared or thermal sensors. The secondary sensor may operate with a sensor technology whose purpose is to measure objects at some distance and/or in proximity to the transmitter using an alternative sensor technology, such as an ultrasonic sensor. It should be appreciated that, in some embodiments, references to "primary" and "secondary" sensors does not always indicate a level of priority of the information produced by these sensors.

Continuing with this example, the primary thermal sensor and the secondary distance sensor may report analog data (i.e., raw sensor data) directly to application-specific integrated circuits (ASICs) associated with the respective sensor. The operations of the ASICs may be controlled by a sensor processor, which may be a microcontroller or processor configured to control the ASICs. As an example, after receiving the raw sensor data, each ASIC may then digitize, process, and communicate the processed sensor data to the respective processor. The ASIC and/or sensor processor may be integrated into the sensor assembly or be separated from the sensors by some physical or mechanical distance. In some embodiments, the ASIC and/or sensor processor may communicate data and commands using Serial-Peripheral-Interface (SPI) and/or an I2C serial digital communications interfaces. And in some embodiments, the sensor processor and/or primary and secondary sensor assembly may be integrated into a single printed circuit board ("sensor PCB"), or may be separated, depending upon specific mechanical requirements, and different system application needs. In this example, a sensor comprises a single PCB having the sensor processors and ASICs.

In operation, a sensor processor will communicate processed sensor data with one or more transmitters. For example, the processor may transmit the sensor data to a main transmitter's Command-and-Control-Unit (CCU), using SPI. In some implementations, the sensor PCB-to-CCU communication is performed only as often as required to optimize safe and effective operation of the system, but while maintaining optimal resource (e.g., power, memory, processing) efficiency.

i. Exemplary Calibration Operation

At a first time sample (e.g., time=0 (T0)), the system is powered up or initialized for the first time or after memory is purged. A self-test is performed determine whether the components are operational at a low level of power. A secondary test is performed, which checks for network connectivity and (assuming an internet connection is found) software updates. Assuming all systems are operational and firmware is up-to-date, the sensor PCB will perform a self-calibration that will complete in less than 2 seconds. The sensor PCB will be fully functional and can complete calibration, even without network connectivity. Network connectivity will not be a precursor for safe and effective operation.

In some implementations, self-calibration may commence upon startup and subsequently, when several criteria are simultaneously met. As an example, for a primary sensor operating on thermal-based technology, the sensor will determine whether no thermal objects of interest (TOoI) are present in the field of view and that no power receivers are present in the field of transmission; and the presence of power receivers is detected through the CCU. For secondary sensors in this exemplary embodiment, the startup criteria requires the transmitter to be stationary, with no TOoI present nor movement detected within the transmission field, for a minimum amount of time necessary to perform self-calibration.

Next, primary sensor self-calibration processes and gain control is started when nothing in the transmission field is detected that could be determined to be a TOoI. In other words, the sensors must not detect any object with a thermal and/or shape profile matching likely presence of a living being, including (but not limited to) humans of any age and pets free to roam the transmission field. The primary sensor may then perform self-calibration processes, according to the technology implemented.

In an exemplary method of the primary sensor's self-calibration, the primary sensor shall self-calibrate by use of an isothermal shutter, which, in operation, momentarily covers the lens or input to a thermal camera array of the sensor. An independent, previously calibrated temperature sensor (e.g., NTC or PTC thermistor, 2 or 4-contact RTD, a thermocouple or other accurate temperature-sensing device) is integrated with the primary sensor assembly and is as close to isothermal with the lens or input shutter device as possible. While the isothermal shutter inhibits the primary sensor input, the external temperature-sensing device and the entire pixel array of the thermal camera is read. The analog sensor value for each thermal pixel is analyzed and assigned to (calibrated to) the temperature reading of the external (shutter-isothermal) temperature sensing device. This analog to digital, thermal-auto-calibration may be a function of the primary sensor ASIC, and may require or not require an external input or interaction from the sensor processor/controller. When the shutter is opened again (the primary sensor is unblocked), the readings from each pixel in the large array of thermal pixels in the primary sensor will be assigned an accurate, absolute temperature reading. These values will be analyzed in all subsequent thermal array collections (thermal frames) by the sensor processor to determine the position of any TOoI within the transmission field or nearby room/space.

The secondary sensor's calibration may occur simultaneous or within 1 second of primary sensor calibration, provided no scene movement or TOoI is detected by the primary sensor. The operation of ultrasonic distance and other proximity sensors is to transmit a small number of quick transmit pulses into the room or space, and receive reflections back from all objects in the room. The transmit pattern will typically occur for less than $\frac{1}{1000}$ of a second (<1 ms), and the reflections may be sensed for tens of milliseconds, allowing for depth range as well as sensing and bounding of the area of interest (which includes the area of wireless power transmission). The reflections gathered by each secondary sensor, under these conditions (i.e., no TOoI and no movement detected) will form the reference frame, or the background reflection pattern against which future secondary sensor reception frames will be measured.

ii. Normal Operation:

After the primary sensor is calibrated, objects like a thermal objects of interest (TOoI) can be sensed and identified by the sensor processor. When a TOoI is sensed, a pair of ultrasonic or proximity sensors will send standard transmit pulses out and receive reflection patterns back. The reflection patterns give the distance and angle to the TOoI, based upon mathematical (e.g., trigonometric) sensor analysis and processing. The mathematics and reflection processing will be used to detect and track the living bodies (e.g., humans, animals) within the field of power transmission; and in some embodiments, primary sensor operation and detection may be done completely without the CCU.

In some cases, when the CCU detects the presence of a power receiver, the CCU may request for the coordinates of living bodies (TOoI) in X, Y, Z or X, Y, and directional angle from the transmitter, which the sensor PCB will report back almost immediately. From the knowledge of the location of any receivers and/or the locations of any living bodies (e.g., an end user) in the room, the power waves used to generate a pocket of energy may be controlled, not just in space, but in power output as well, because the CCU shall have the power to modulate, scale, and control the power waves transmitted to a pocket of energy around a receiver. Advantageously, this system enables optimal power transmission, simultaneous with maximum compliance and safety, with zero active interaction or thought from the end user.

A receiver may receive maximum power for a pocket of energy when the system detects that a living object is outside of a periphery of that pocket of energy in the transmission field. If the pocket of energy is very close to the living body, then the power transmission will be automatically throttled, by adjusting the power waves, to be within FCC compliance and safety specifications.

If there is a receiver receiving wireless power, but no TOoI (i.e., living bodies) are detected in the transmission field, and any obstruction quickly moves across the field of view (potentially very close to the transmitter), then the sensor and sensor processor shall sense and respond fast enough to send an interrupt signal to the CCU of the transmitter, which will immediately and temporarily disable power transmission until such time as the area of the receiver is free of the obstruction and the power transmission can be resumed. For example, a transmitter can have a sensor that detects that a TOoI is in close proximity to the transmitter, whereby the transmitter disables power transmission until the TOoI is no longer in a transmission path between the transmitter and a receiver. In another example, the transmitter can have a sensor that detects that a TOoI is in close proximity to the transmitter, whereby the transmitter disables power transmission until the TOoI is no longer in proximity to the transmitter.

IV. Generating Power Waves & Forming Pockets of Energy

In a wireless charging system, transmitters are devices that comprise, or are otherwise associated with, various components and circuits responsible for, e.g., generating and transmitting power waves, forming pockets of energy at locations in a transmission field, monitoring the conditions of the transmission field, and generating null spaces where needed. A transmitter may generate and transmit power waves for pocket-forming and/or null steering based on the one or more parameters. The parameters may be determined by a transmitter processor, sensor processor, or other processor providing instructions to the transmitter, based on data received from the one or more receivers, sensors internal to the transmitter, and/or sensors external to the transmitter. With regard to the sensors of the system, it should be appreciated that an internal sensor may be an integral component of the transmitter, or receiver. It should also be appreciated that an external sensor may be a sensor that is placed within the working area of a transmitter, and may be in wired or wireless communication with one or more transmitters of the system.

Transmitters may wirelessly transmit power waves having certain physical waveform characteristics, which are particular to the particular waveform technology implemented. The power waves may be transmitted to receivers within a transmission field of the transmitters in form of any physical media capable of propagating through space and being converted into useable electrical energy for charging the one or more electronic devices. The examples of the physical media may include radio frequency (RF) waves, infrared, acoustics, electromagnetic fields, and ultrasound. The power transmission signals may include any radio signal, having any frequency or wavelength. It should be appreciated by those skilled in the art that the wireless charging techniques are not limited to RF wave transmission techniques, but may include alternative or additional techniques for transmitting energy to the one or more receivers.

A. Components of a System Generating and Using Power Waves

Figure 10:
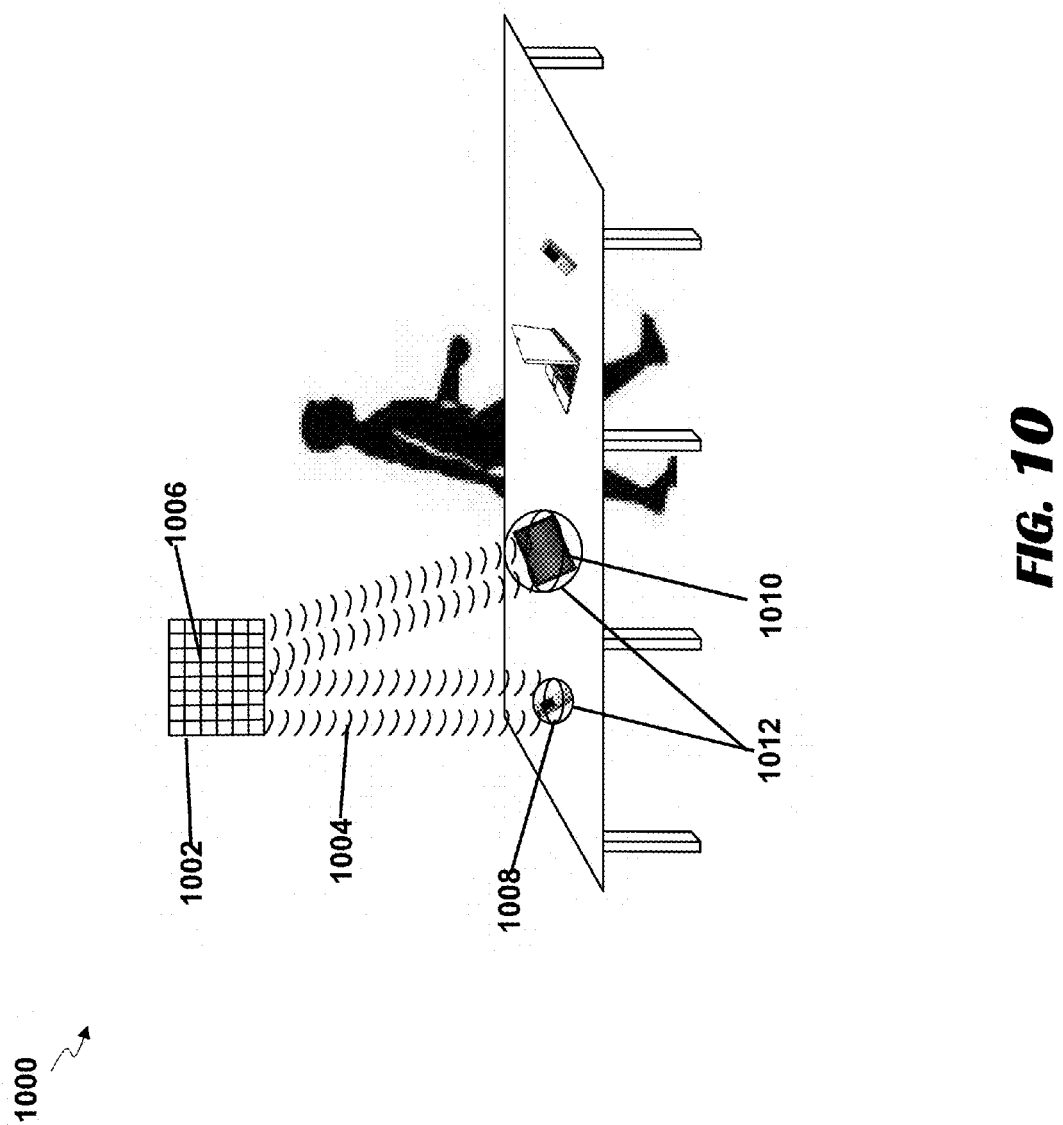
FIG. 10 illustrates generation of pocket of energy to power one or more electronic devices in a wireless power transmission system, according to an exemplary embodiment.

FIG. 10 illustrates generation of pocket of energy to power one or more electronic devices in a wireless power transmission system, according to an exemplary embodiment.

The wireless power transmission system 1000 comprises a transmitter 1002 that transmits the one or more power transmission waveforms 1004 from the antenna array 1006 to power the one or more electronic devices such as a mobile phone 1008 and a laptop 1010. Non-limiting examples of one or more electronic devices may include laptops, mobile phones, smartphones, tablets, music players, toys, batteries, flashlights, lamps, electronic watches, cameras, gaming consoles, appliances, and GPS devices among other types of electrical devices.

The examples of the power waves may include microwaves, radio waves, and ultrasound waves. The power waves 1004 are controlled through the microprocessor of the transmitter 1002 to form the pocket of energy 1012 in locations where the pocket of energy 1012 is intended. In the illustrative embodiment, the pocket of energy 1012 is intended in the locations of the one or more electronic devices 1008 and 1010. The transmitter 1002 is further configured to transmit the power waves 1002 that may converge in three-dimensional space to create the one or more null spaces in the one or more locations where transmitted power waves cancel each other out substantially.

The microprocessor of the transmitter 1002 is further configured to, based on one or more parameters, select the power transmission waveform, select the output frequency of the power transmission waveforms, the shape of the one or more antenna arrays 1006, and the spacing of the one or more antennas in at least one antenna array 1006 to form the pocket of energy at the targeted location to power the one or more electronic devices 1008, 1010. The microprocessor of the transmitter 1002 is further configured to, based on the one or more parameters, select the output frequency of the power waves, the shape of the one or more antenna arrays 1006, and the spacing of the one or more antennas in at least one antenna array 1006 to form the one or more null spaces at the one or more locations within the transmission field of the transmitter 1002. The pockets of energy are formed where the power waves 1002 accumulate to form a three-dimensional field of energy, around which one or more corresponding transmission null in a particular physical location may be generated by the transmitter 1002.

The antennas of the antenna array 1006 of the transmitter 1002 that transmit the power waves may operate in a single array, a pair array, a quad array, or any other arrangement that may be selected in accordance with the one or more parameters by the microprocessor of the transmitter 1002. In the illustrative embodiment, the antennas of the antenna array 1006 of the transmitter 1002 are operable as the single array.

The receiver may communicate with the transmitter 1002 in order to indicate its position with respect to the transmitter 1002. The communications component may enable receiver to communicate with the transmitter 1002 by transmitting communication signals over a wireless protocol. The wireless protocol can be selected from a group consisting of Bluetooth®, BLE, Wi-Fi, NFC, or the like. The communications component may then be used to transfer information, such as an identifier for the one or more electronic devices 1008, 1010, as well as battery level information of the one or more electronic devices 1008, 1010, geographic location data of the one or more electronic devices 1008, 1010, or other information that may be of use for the transmitter 1002 in determining when to send power to receiver, as well as the location to deliver power waves 1002 creating the pockets of energy 1012. The receiver may then utilize power waves 1002 emitted by the transmitter 1002 to establish the pocket of energy 1012, for charging or powering the one or more electronic devices 1008, 1010. The receiver may comprise circuitry for converting the power waves 1002 into electrical energy that may be provided to the one or more electronic devices 1008, 1010. In other embodiments of the present disclosure, there can be multiple transmitters and/or multiple antenna arrays for powering various electronic equipment for example, may include smartphones, tablets, music players, toys, and other items.

In some embodiments, the one or more electronic devices 1008, 1010 may be distinct from the receiver associated with the one or more electronic devices 1008, 1010. In such embodiments, the one or more electronic devices 1008, 1010 may be connected to the receiver over a wire that conveys converted electrical energy from the receiver to the one or more electronic devices 1008, 1010.

After receiving the communication from the receiver by the transmitter 1002, the transmitter 1002 identifies and locates the receiver. A path is established, through which the transmitter 1002 may know the gain and phases of the communication signals coming from the receiver. In addition to the communication signals from the receiver, the transmitter 1002 receives information/data from the one or more internal sensors, the one or more external sensors, and heat mapping data about the location of the receiver and the location of the one or more objects such as human beings and animals. Based on the all the information and data received from the internal and external sensors, the heating mapping data, and the communication signals from the receiver, the microprocessor of the transmitter 1002 analyzes the information and data, and then determines the one or more parameters that will act as the inputs in determining the selections require to produce the pocket of energy 1012 at the targeted locations. After the determination of the one or more parameters, the transmitter 1002 then selects the type of power transmission wave 1002 to be transmitted, and the output frequency of power transmission wave 1002, to generate the pockets of energy 1012 at the targeted locations within the transmission field of the transmitter 1002. In another embodiment, in addition to selecting the type of power transmission wave 1002, and determining the output frequency of power transmission wave 1002, the transmitter 1002, may also select a subset of antennas from a fixed physical shape of the one or more antenna arrays 1006 that corresponds to a desired spacing of antennas, which will be used to generate the pockets of energy 1012 at the targeted locations within the transmission field of the transmitter 1002. After the selection of the output frequency of power waves 1002, shape of one or more antenna arrays 1006, and spacing of one or more antennas in each of the one or more antenna array 1006, the antennas of the transmitter 1002 may start to transmit the power waves 1002 that may converge in three-dimensional space. These power waves 1002 may also be produced by using an external power source and a local oscillator chip using a piezoelectric material. The power waves 1002 are constantly controlled by the microprocessor of the transmitter 1002, which may also include a proprietary chip for adjusting phase and/or relative magnitudes of power waves 1002. The phase, gain, amplitude, frequency, and other waveform features of the power waves 1002 are determined based on the one or more parameters, and may serve as one of the inputs for the antennas to form the pocket of energy 1012.

Figure 11:
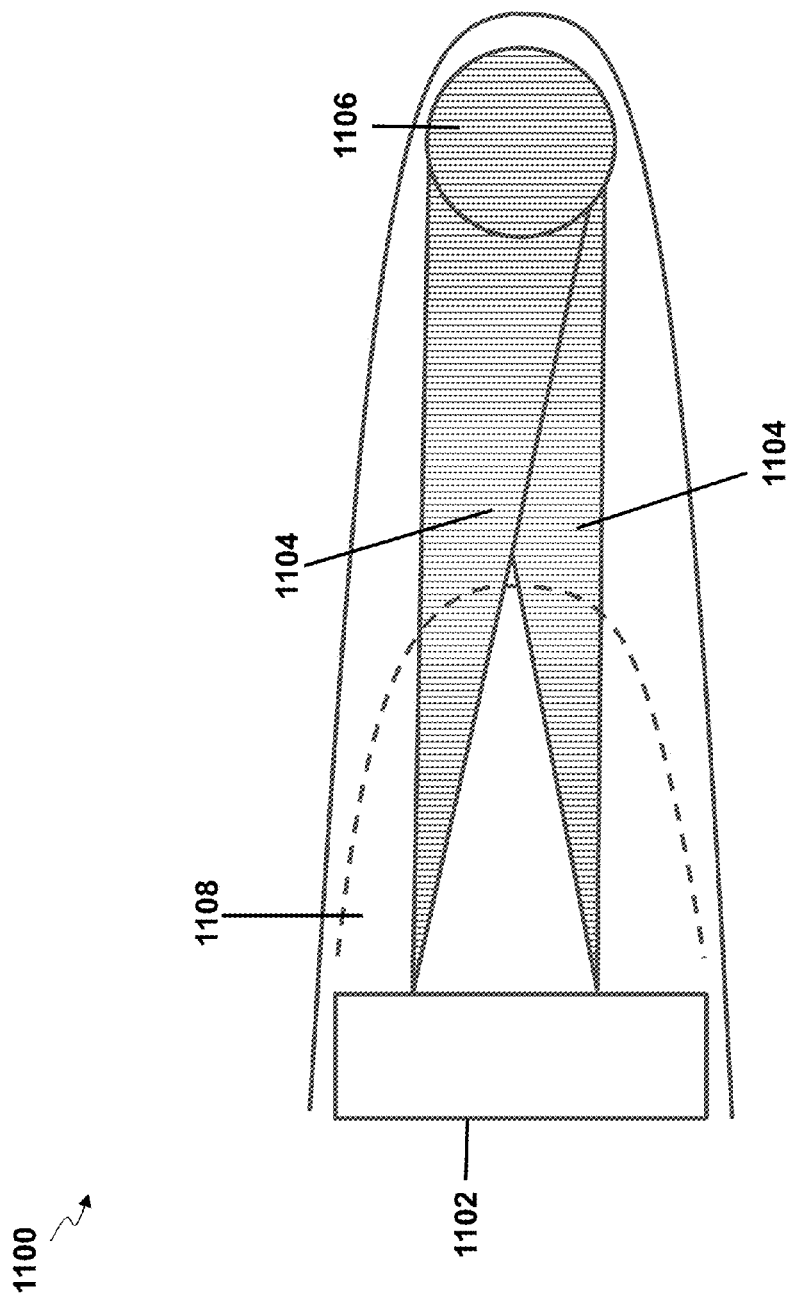
FIG. 11 illustrates generation of pocket of energy in a wireless power transmission system, according to an exemplary embodiment.

FIG. 11 illustrates generation of pocket of energy in a wireless power transmission system, according to an exemplary embodiment.

As illustrated in the FIG. 11, the transmitter 1102 generates the power waves 1104 that form the pocket of energy 1106 at the receiver. As discussed earlier, the microprocessor of the transmitter 1106 will determine the one or more parameters based on all the information and data received from the internal and external sensors, the heating mapping data, and the communication signals from the receiver. The one or more parameters will then be used as the input by the microprocessor of the transmitter 1102 to select the power waves 1104 from a list of one or more waveforms and then generate the power waves 1104 by the waveform generator at the desired output frequency. The phase, gain, amplitude, frequency, and other waveform features of the power waves 1104 are also determined based on the one or more parameters by the microprocessor of the transmitter 1102. The one or more parameters will also be used as the input by the microprocessor of the transmitter 1102 to select a subset of antenna arrays from the total number of the antenna arrays, and the subset of antennas from total number of antennas in the selected subset of the antenna arrays for transmitting the power waves 1104 to form the pocket of energy 1106.

Based on the one or more parameters, the microprocessor of the transmitter 1102 will select the antenna array, select the shape of the selected antenna array, select the antennas to be used in the selected antenna array, select the waveform to be generated by the waveform generator for transmission by the selected antennas of the selected antenna array, and lastly the output frequency of the selected waveform to be transmitted by the selected antennas of the selected antenna arrays. The microprocessor of the transmitter 1102 may further select the transmission timing of the selected waveform from the selected antennas of the selected antenna array based on the one or more parameters. In one embodiment, the microprocessor of the transmitter 1102, continuously receives the new information and data from the internal and external sensors, the heating mapping data, and the communication signals from the receiver; and based on the newly received information and data, the microprocessor of the transmitter 1102 may generate a new set of the one or more parameters. The new set of the one or more parameters are then utilized by the microprocessor of the transmitter 1102 to manipulate the frequency of the transmitted power waves 1104, as well as selection of new set of antenna array and antennas for the transmission of new power waves 1104. For example, as shown in FIGS. 3 and 4, the transmitter 1102 can continuously scan segments of the transmission field to identify a new location of the receiver, and as shown in FIG. 13, the transmitter 1102 can adjust direction of an antenna power wave transmission, a selection of antennas in the antenna array (e.g., shape of the antenna array, spacing of antennas), and output frequency based on the new parameters.

In FIG. 11, a safe zone 1108 may be an area proximate to the transmitter 1102 that is within such proximity to the antenna array that the power waves 1104 cannot be "canceled-out" using null steering, and thus the radiated energy of the power waves 1104 cannot be nullified by the transmitter 1102. In some implementations, the energy generated by the power waves 1104 from the transmitter 1102 is not suitable for objects such as human beings and animals. As such, the safe zone 1108 represents a location within the transmission field where the transmitter 1102 automatically drops the amount of energy produced or halts transmission of power waves 1104 altogether, particularly if a sensor identifies a human being or sensitive object within the safe zone.

Figure 12:
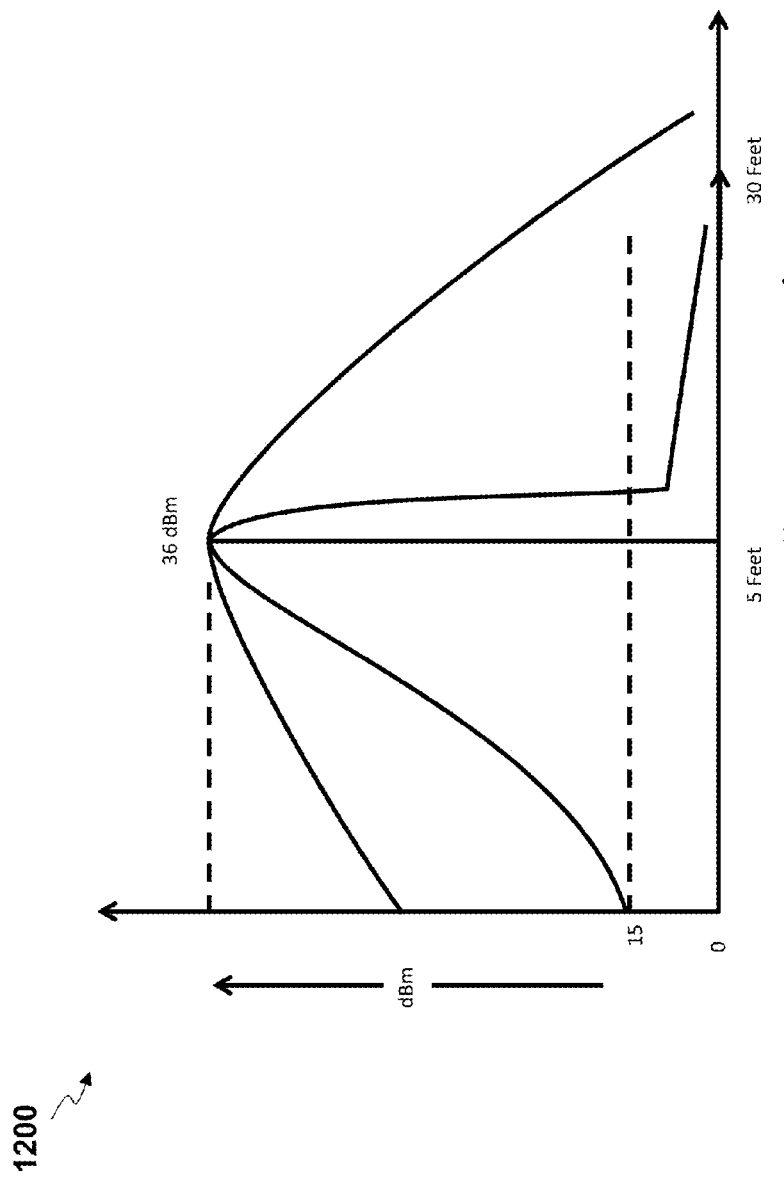
FIG. 12 illustrates a graphical representation of formation of pocket of energy in a wireless power transmission system, according to an exemplary embodiment.

FIG. 12 illustrates a graphical representation of formation of pocket of energy in a wireless power transmission system, according to an exemplary embodiment. As illustrated in the FIG. 12, a graphical representation between the distance and decibel milliwatts (dBm) is shown. The pocket of energy is formed at 36 dBm and 5 feet. The transmitter antennas transmit the power transmission signals such that the power transmission signals converge in this three-dimensional space around the receiver, which is located at the 5 feet distance. The resulting field around the receiver forms the pocket of energy at 36 dBm from which the receiver may harvest electrical energy. As illustrated, the amount of energy contained in the power waves quickly diminishes beyond the intended location for the pocket of energy, in order to avoid creating unwanted energy in other areas nearby the location of the pocket of energy. In the present figure, the pocket of energy is intended to be generated at a distance of five feet, and therefore the power transmission signals diminish at any distance beyond five feet. FIG. 12 shows two curves of how power waves die down using antenna arrays of equally spaced antennas, versus antenna arrays that may have unequal antenna spacing and may be placed in a non-planar antenna array. In the case of unequal antenna spacing and non-planar antennas, the power level quickly diminishes beyond the intended location of the pocket of energy.

Figure 13:
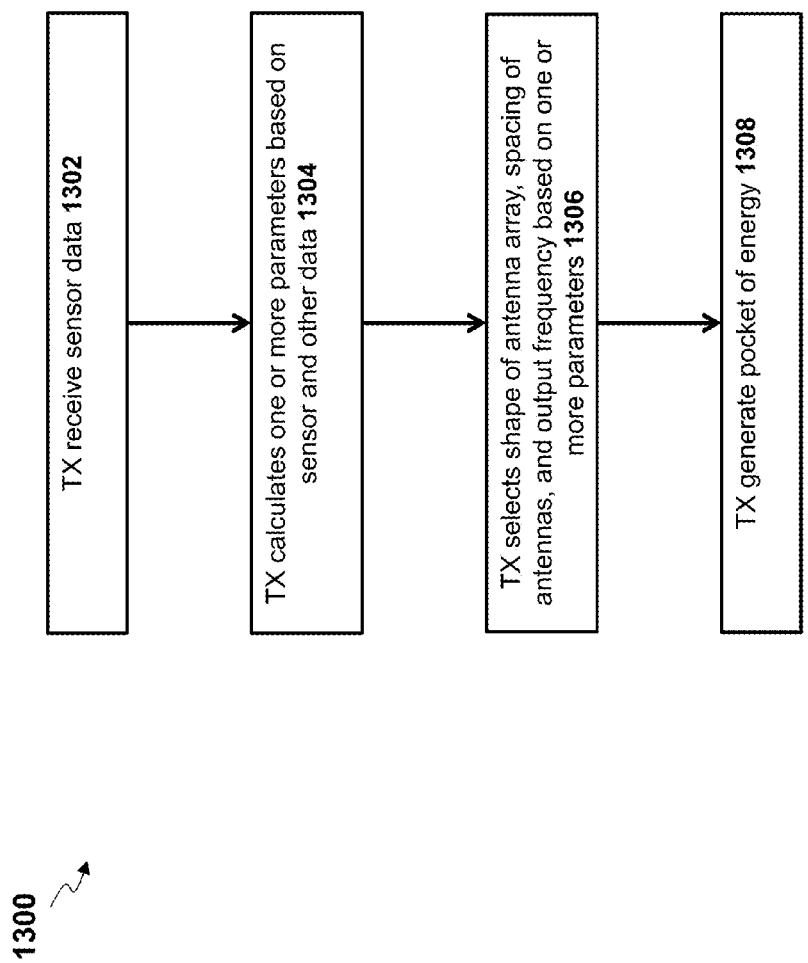
FIG. 13 illustrates a method of formation of pocket of energy for one or more devices in a wireless power transmission system, according to an exemplary embodiment.

FIG. 13 illustrates a method of formation of pocket of energy for one or more devices in a wireless power transmission system, according to an exemplary embodiment.

In a first step 1302, a transmitter (TX) receives sensor data collected and produced from one or more sensors. In some cases, the transmitter establishes a connection with a receiver (RX), according to the wireless protocol used for communications between a communications component of the transmitter and a communications component of the receiver. That is, a communications component of the transmitter and a communications component of the receiver may communicate data with one another using a wireless communication protocol (e.g., Bluetooth®, Wi-Fi, NFC, ZigBee) capable of transmitting information between processors of electrical devices, such as a transmitter processor and a receiver processor. For example, the transmitter may scan for a receiver's broadcasting signals or vice-versa, or a receiver may transmit a signal to the transmitter. The signal may announce the receiver's presence to the transmitter, or the transmitter's presence to the receiver, and may trigger an association between the transmitter and the receiver. Once the transmitter identifies the receiver, the transmitter may establish the connection associated in the transmitter with the receiver, allowing the transmitter and receiver to communicate signals. The transmitter may then command that the receiver begins transmitting data. The receiver measures the voltage among other metrics and may transmit the voltage sample measurement back to the transmitter. The transmitter further receives the information and data from the one or more internal sensors, the one or more external sensors, and the heat mapping data related to the location of the receiver, the information about the one or more electronic devices, and the one or more objects.

In a next step 1304, the transmitter may determine the one or more parameters. In one embodiment, the microprocessor of the transmitter may execute one or more software modules in order to analyze the received data and information, and based on the analysis identify the one or more parameters. The one or more parameters act as an input to the microprocessor to make the necessary selections to form the pocket of energy at one or more targeted locations.

In a next step 1306, the transmitter may execute one or more software modules based on the one or more parameters to select a waveform to be generated by the waveform generator, select the output frequency of the waveform, a subset of antennas from a fixed physical shape of the one or more antenna arrays that correspond to a desired spacing of antennas to form the pocket of energy at the targeted location of the one or more receivers.

In one embodiment, the transmitter algorithms based on the one or more parameters may vary production and transmission of power transmission signals by the transmitter's antennas to optimize the pockets of energy around the receiver. For example, the transmitter may adjust the phase at which the transmitter's antenna transmits the power transmission signals, until that power received by the receiver indicates an effectively established pocket of energy around the receiver. When an optimal configuration for the antennas is identified, memory of the transmitter may store the configurations to keep the transmitter broadcasting at that highest level.

In one embodiment, the algorithms of the transmitter based on the one or more parameters may determine when it is necessary to adjust the power transmission signals and may also vary the configuration of the transmit antennas. For example, the transmitter may determine the power received at a receiver is less than maximal, based on the one or more parameters. The transmitter may then adjust the phase of the power transmission signals, but may also simultaneously continues to generate the new one or more parameters based on the information and data being reported back from receiver and the sensor devices.

In one embodiment, when the transmitter receives the information and data from the receiver and sensor devices regarding a presence of a new receiver, the transmitter will generate new one or more parameters, and based on the new one or more parameters, the transmitter may adjust one or more antennas in the transmitter's antenna array. In some embodiments, the transmitter may identify a subset of antennas to service the new receiver, thereby parsing the array into subsets of arrays. In some embodiments, the entire antenna array may service the original receiver for a given period of time, and then the entire array may service the new receiver. The automated processes are performed by the transmitter to select a subset of arrays to service the new receiver. In one example, the transmitter's array may be split in half, forming two subsets. As a result, half of the antennas may be configured to transmit power transmission signals to the original receiver, and half of the antennas may be configured for the new receiver.

In the next step 1308, the transmitter will generate the pocket of energy for the one or more receivers. The one or more receivers may be electrically connected to the electronic device like a smart phone. The transmitter may continue to alternate between receivers and scanning for new receivers at a predetermined interval and thereby generating the new one or more parameters. As each new receiver is detected, the new one or more parameters are generated, and based on the new one or more parameters, the transmitter may establish a connection and begin transmitting power transmission signals, accordingly.

B. Waveforms for Power Waves & Manipulating Waveforms

FIGS. 14A and 14B illustrates a waveform to form a pocket of energy in a wireless power transmission system, according to an exemplary embodiment. The waveforms or the power waves 1402, 1404 are produced by the transmitter 1406 and transmitted by the one or more antennas of the transmitter 1406 directed to the receiver 1408 to form the pocket of energy at the desired location.

The transmitter 1406 receives a communication signal. In one embodiment, the transmitter 1406 may receive the communication signal from a sensor device. The sensor device may comprise one or more internal sensors and/or one or more external sensors. The one or more internal sensors are integral components of the transmitter 1406. The one or more external sensors are located outside the transmitter 1406. The one or more external sensors may be formed as an integral component of the receiver 1408. In another example, the one or more external sensors may be located in an operating area of the wireless communication system of the present disclosure. In yet another example, one or more external sensors may be fixed on the one or more electrical devices to be charged. In another embodiment, the transmitter 1406 may receive the communication signal directly from the receiver 1408. The microprocessor of the transmitter 1406 processes the communication signal or the information sent by the receiver 1408 through a communications component for determining optimum times and locations for forming the pocket of energy. The communications component and the sensor device may be used to transfer information such as an identifier for the device or user, battery level, location or other such information. Other communications components may be possible which may include radar, infrared cameras or sound devices for sonic triangulation for determining the device's position and the or more objects position. The transmitter 1406 may further generate a transmission signal based on the received communication signal. The transmitter 1406 generates the transmission signal according to an operational mode determined by the microprocessor. The operation mode reflects the transmission frequency determined by the microprocessor of the transmitter 1406. In one embodiment, a user manually sets the operational mode using a user interface associated with the microprocessor of the transmitter 1406. In another embodiment, the operational mode is automatically set by the microprocessor of the transmitter 1406, based on received information in the communication signal.

Once transmitter 1406 identifies and locates receiver 1408 based on the information/data contained in the communication signal, a path is established. The transmitter 1406 may start to transmit power waves that converge in a three dimensional space, by using the one or more antennas of at least one antenna array of the one or more antenna arrays.

In an embodiment, the operation mode (operating frequency) of the transmitter 1406 is determined based on the communication signal received by the transmitter 1406 from the sensor device or the communication component. The microprocessor of the transmitter 1406 then evaluates the communication signal, and based on the results of the communication signal, the transmitter 1406 initiates the generation of the waveforms (of one or more types) to be transmitted by the one or more antennas of each of the one or more antenna arrays. In one example, if the information/data received by the sensor device or the communication component comprises data indicating a first location of the receiver 1408 (e.g., close to the transmitter 1406), then a low power waveform generator may be used. In the continuous wave mode, the waveforms can have durations as long as milliseconds. In another example, if the information/data received by the sensor device or the communication component comprises data indicating a second location of the receiver 1408 (e.g., far from the transmitter 1406), then high power pulses may be required to transmit more energy to the receiver, so the transmitter uses a high power path (a pulsed waveform generator). Each of these waveforms is typically stored in a database to be used as a suite of possible transmitted waveforms as conditions require. In other words, based on information contained in the communication signal received from the sensor device or the communication component, the transmitter 1406 then generates the desired type of waveforms for transmission by the one or more antennas and further selects the operating frequency and amplitude of the generated waveforms. As discussed above, the transmitter 1406, using a waveform generator, or any arbitrary waveform generator circuit, may produce both pulse and continuous waveforms. In another embodiment, these RF waves may also be produced by using an external power source and a local oscillator chip using a piezoelectric material. The RF waves may be controlled by an RFIC circuit, which may include a proprietary chip for adjusting phase and/or relative magnitudes of RF signals that may serve as inputs for one or more antennas to form pocket forming. The pocket forming may take advantage of interference to change the directionality of the one or more antennas where one form of the interference generates the pocket of energy and another form of the interference generates the null space. The receiver 1408 may then utilize the pocket of energy produced by pocket forming for charging or powering the electronic devices and therefore effectively providing wireless power transmission.

The transmitter 1406 comprises waveform generation components for generating waveforms that are utilized in one embodiment of the present disclosure. The transmitter 1406 includes a housing. The housing can be made of any material that may allow for signal or wave transmission and/or reception. The housing may include the one or more microprocessors, and the power source. In an embodiment, several transmitters may be managed by a single base station and a single microprocessor. Such capability may allow the location of transmitters in a variety of strategic positions, such as ceiling, walls, or the like.

The housing of the transmitter 1406 comprises the one or more antennas arrays. Each of the one or more antenna arrays comprises the one or more antennas. The one or more antennas may include antenna types for operating in frequency bands, such as roughly 900 MHz to about 100 GHz or other such frequency band, such as about 1 GHz, 5.8 GHz, 24 GHz, 60 GHz, and 72 GHz. In one embodiment, the antenna may be directional and include flat antennas, patch antennas, dipole antennas, and any other antenna for wireless power transmission. The antenna types may include, for example, patch antennas with heights from about ⅛ inch to about 6 inches and widths from about ⅛ inch to about 6 inches. The shape and orientation of antenna may vary in dependency of the desired features of the transmitter 1406; the orientation may be flat in X-axis, Y-axis, and Z-axis, as well as various orientation types and combinations in three-dimensional arrangements. The antenna materials may include any material that may allow RF signal transmission with high efficiency and good heat dissipation. The number of antennas may vary in relation with the desired range and power transmission capability of the transmitter 1406. In addition, the antenna may have at least one polarization or a selection of polarizations. Such polarization may include vertical polarization, horizontal polarization, circularly polarized, left hand polarized, right hand polarized, or a combination of polarizations. The selection of polarizations may vary in dependency of the transmitter 1406 characteristics. In addition, the antenna may be located in various surfaces of the transmitter 1406. The antenna may operate in single array, pair array, quad array and any other arrangement that may be designed in accordance with the one or more parameters.

The housing of the transmitter 1406 further comprises one or more printed circuit boards (PCB), one or more RF integrated circuits (RFIC), one or more waveform generators, and one or more microprocessors.

The transmitter 1406 may include a plurality of PCB layers, which may include antennas, and/or RFICs for providing greater control over forming the pockets of energy based on the one or more parameters. PCBs may be single sided, double sided, and/or multi-layer. The multiple PCB layers may increase the range and the amount of power that could be transferred by the transmitter. The PCB layers may be connected to a single microprocessor and/or to dedicated microprocessors. In some implementations, the transmitter 1406 including a plurality of PCB layers inside it may include antenna for providing greater control over forming the pockets of energy and may increase the response for targeting receivers based on the one or more parameters. Furthermore, range of wireless power transmission may be increased by the transmitter. The multiple PCB layers may increase the range and the amount of power waves that could be transferred and/or broadcasted wirelessly by transmitter 1406 due the higher density of antenna. The PCB layers may be connected to a single microcontroller and/or to dedicated microcontroller for each antenna.

The transmitter 1406 may include a RFIC that may receive the RF waves from the microprocessor, and split the RF waves into multiple outputs, each output linked to an antenna. In one implementation, each RFIC may be connected to four antennas. In other implementations, each RFIC may be connected to multiple antennas. The RFIC may include a plurality of RF circuits that may include digital and/or analog components, such as, amplifiers, capacitors, oscillators, piezoelectric crystals or the like. The RFIC control features of the antenna, such as gain and/or phase for pocket forming. In other implementations of the transmitter 1406, the phase and the amplitude of the transmitted power waves from each antenna may be regulated by the corresponding RFIC in order to generate the desired pocket of energy and null steering based on the one or more parameters. The RFIC and the antenna may operate in any arrangement that may be designed in accordance with the desired application. For example, the transmitter 1406 may include the antenna and the RFIC in a flat arrangement. A subset of and/or any number of antennas may be connected to a single RFIC based on the one or more parameters.

The microprocessor comprises an ARM processor and/or DSP. The ARM may comprise one or more microprocessors based on a reduced instruction set computing (RISC). The DSP may be a signal processing chip configured to provide a mathematical manipulation of an communications signal, to modify or improve the communications signal in some way, where the communications signal can be characterized by the representation of discrete time, discrete frequency, and/or other discrete domain signals by a sequence of numbers or symbols and the processing of these signals. The DSP may measure, filter, and/or compress continuous real-world analog signals. The first step may be conversion of the signal from an analog to a digital form, by sampling and then digitizing it using an analog-to-digital converter (ADC), which may convert the analog signal into a stream of discrete digital values. The microprocessor may also run Linux and/or any other operating system. The microprocessor may also be connected to Wi-Fi in order to provide information through a network. Furthermore, the microprocessor may transmit power waves that converge to form multiple pockets of energy for multiple receivers. The transmitter may allow distance discrimination of the wireless power transmission. In addition, the microprocessor may manage and control communication protocols and signals by controlling the communication component.

The waveform generation components of the transmitter 1406 further comprises the waveform generator, the Digital to Analog (D/A) convertor, the power amplifier, and the one or more filters. The waveform generator of the transmitter 1406 is typically programmed to produce waveforms with a specified amount of noise, interference, frequency offset, and frequency drift. The waveform generator of the transmitter 1406 is configured to generate multiple versions of the waveform, one for each antenna at the transmitter based on the one or more parameters. In one implementation, the waveform generator of the transmitter 1406 produces the waveforms to be transmitted by the individual elements of the antenna array. A different wave signal is produced by the waveform generator of the transmitter 1406 for each of the one or more antennas. Each of these signals is then passed through the D/A converter and the one or more filters. The resulting analog signals are each amplified by a power amplifier and then sent to a corresponding antenna of the one or more antennas. A description of a waveform generator may be found in commonly-assigned U.S. application Ser. No. 13/891,445, entitled "Transmitters for Wireless power Transmission," filed Dec. 27, 2014 and commonly-assigned U.S. application Ser. No. 14/584,364, entitled "Enhanced Transmitter for Wireless Power Transmission," filed Dec. 29, 2014, each of which are hereby incorporated by reference herein, in their entirety.

In one example, assuming that the transmitted signals are to be in the form of cosine waveforms determined based on the one or more parameters, the waveform generator of the transmitter 1406 first produces a series of phase angles corresponding to the phase of the waveform to be transmitted. The series of phase angles produced by the waveform generator of the transmitter 1406 may or may not be common to all the antennas. In the present example, the series of phase angles produced by the waveform generator of the transmitter 1406 is common to all the antennas. The waveform phase angles may also be adjusted to steer the waveform by adding a time delay and a phase adjustment for each antenna. A series of adjusted phase angles is thus produced for each antenna. A signal is then produced for each antenna by applying a cosine function to the adjusted phase angles. This may be accomplished using a Cosine Look-up Table. Each cosine wave is then loaded and read out to the D/A converters. The waveform generator of the transmitter 1406 produces a series of phase angles corresponding to the phase of the signal to be transmitted. These phase angles are common to each antenna in the antenna array. The phase angle selection by the waveform generator of the transmitter 1406 can be implemented by a Direct Digital Synthesizer (DDS) or similar device. The waveform phase angles are then worked upon to add a time delay and a phase adjustment for each antenna. The time delay allows uniform pointing over a wide bandwidth, and the phase adjustment compensates for the time delay quantization at the center frequency. In order to steer the transmitted wave, each antenna may also need to have a particular phase angle added to the common waveform. The waveform generator of the transmitter 1406 is configured to perform all of the above-mentioned functions on the waveform based on the input of the one or more parameters.

The waveform generator of the transmitter 1406 is further configured to generate the one or more power waves having the one or more characteristics according to the one or more transmission parameters. The one or more power waves are non-continuous waves having a frequency and amplitude that may be increased and decreased based on one or more updates to the one or more transmission parameters corresponding to the one or more characteristics of the one or more power waves. In one example, the non-continuous power waveform may be a chirp waveform. The chirp waveforms are typically used since the frequency of the waveform is changing linearly or logarithmically in time and thereby sweeps the frequency band without creating concentrated energy in one particular frequency, which may not be desirable. Of course, other time dependences of the frequencies can be used, depending on the application and on which frequency domain waveform may be currently needed. In other words, the chirp waveform is a frequency modulated pulse or signal where the modulated frequency typically linearly increases from an initial frequency over a finite time equaling a pulse width, for example, from −50 MHz to +50 MHz, providing a 100 MHz bandwidth, over the pulse width, for example, 10 microseconds, and modulating an intermediate center frequency, for example, 160 MHz. This modulated waveform is typically stepped up and may be mixed to a higher RF carrier prior to transmission by the one or more antennas of the transmitter, such as 900 MHz to 100 GHz. The chirp waveforms may be generated by various other hardware means. One of the methods to produce chirp waveforms may include a group of lumped circuit elements. For example, the group of lumped circuit elements may include a group of the circuits that generate a respective group of staggered delay signals which are summed together and which provide the chirp waveforms. Another method of producing a chirp waveform may comprise a metalized crystalline device that is subjected to the high impulse signal to produce the linear frequency modulated chirp waveform. In yet another example method of producing chirp waveform, Direct Digital Synthesis systems may be employed. The DDS methods of generating the chirp waveform typically employ programmed memories having stored sinusoidal values that are typically fed into the D/A converter, such that as the digital values are cycled into the D/A converter at an increasing rate for a certain pulse width time, the analog converter produces the chirp waveforms through that pulse width.

In another embodiment, a chirp sub pulse waveform may be generated and mixed to a desired center intermediate frequency based on the one or more parameters. A plurality of chirp sub pulses waveforms are contiguously generated and respectively mixed with intermediate frequencies of a plurality of intermediate frequencies. This contiguous mixed chirp waveform has an extended pulse width equaling the sum of the pulse widths of all of the chirp sub pulse waveforms. In the situation, where all of the chirp sub pulse waveforms have the same pulse width, the extended pulse width of the contiguous chirp pulse waveform will be equal to the number of sub pulses multiplied by the pulse width of each sub pulse.

In yet another embodiment, a relatively high frequency carrier signal may be modulated with the data to produce the waveform to drive one or more antennas based on the one or more parameters. One type of modulation is angle modulation, which involves modulating the angle of the carrier signal. The angle modulation may involve modulating the frequency of the carrier signal or modulating the phase of the carrier signal. The waveform forming process includes generating an angle modulated wave signal and progressively filtering the angle modulated wave signal in the waveform generator of the transmitter using a plurality of low pass filters to produce a modulated sinusoidal waveform to drive the one or more antennas. The technique includes programming the transmitter to tune a corner frequency of the filtering to a frequency within a range of frequencies selectable using the programming by the microprocessor of the transmitter 1406.

In order to generate the pocket of energy, the transmitter 1406 using a waveform generator produces one or more power waves having a very low correlation with itself. In one example, a chirp wave is being used. The chirp wave has a very low correlation with itself. In one embodiment, the waveform generator of the transmitter 1406 produces a same chirp waveform for all of the one or more antennas. In another embodiment, the waveform generator of the transmitter 1406 produces a different chirp waveform for each of the one or more antennas. In yet another embodiment, the waveform generator of the transmitter 1406 produces a first chirp waveform for a first set of antennas in the one or more antennas and a second chirp waveform for a second or remaining set of antennas in the one or more antennas. In yet another embodiment, the waveform generator of the transmitter 1406 may include one or more sub waveform generators wherein a first sub waveform generator is configured to produce a first chirp waveform for a first antenna array in the one or more antenna arrays and a second sub waveform generator is configured to produce a second chirp waveform for a second antenna array in the one or more antenna arrays and so on.

The waveform generator of the transmitter 1406 described above produces the chirp waveform. The chirp waveform may be generated as a linear chirp waveform and as a non-linear chirp waveform. The nonlinear chirp waveform is selected from the group consisting of exponential, logarithmic, and arbitrarily formulated chirp waveform. The waveform generator of the transmitter 1406 produces the chirp waveform based on one or more parameters. The one or more parameters are identified by the microprocessor of the transmitter 1406 based on the information received in the communication signal from the sensor devices and/or the communication component. The output frequency of the chirp waves generated by the waveform generator of the transmitter 1406 is also determined based on the one or more parameters. Based on the one or more parameters, the waveform generator of the transmitter 1406 may produce multiple chirp waveforms for multiple antennas wherein each of the chirp waveform has a unique output frequency and amplitude. The transmitter 1406 is further configured to increase, based on the one or more parameters, the frequency and the amplitude of the transmitted chirp waves in relation to the change in time and distance. The transmitter 1406 is further configured to decrease, based on the one or more parameters, the frequency and the amplitude of the transmitted one or more power waves in relation to change in time and distance. In one example, the frequency of the chirp waveforms transmitted by the transmitter 1406 is randomly changed between 1 to 1000 times per second. The frequency may be increased at Nth second, and then the frequency may be decreased at N+2th second. In another embodiment, the frequency of the one or more power waves transmitted by the one or more antennas of the transmitter is varied based on maximum permissible exposure level (MPE) of one or more objects.

In the illustrated figures, a first waveform generator of the transmitter 1406 generate a first waveform 1402 having a frequency f1 based on a first set of one or more parameters determined by the microprocessor of the transmitter 1406. The microprocessor of the transmitter 1406 continually receives new data and new information from the sensor devices and the receivers, and based on the new data and the new information, the microprocessor of the transmitter 1406 may generate a second set of one or more parameters. The second set of the one or more parameters are different from the first set of the one or more parameters. Based on the second set of the one or more parameters, the microprocessor of the transmitter 1406 may provide instructions to the first waveform generator to change (increase/decrease) the frequency f1 of the transmitted waveform. In another embodiment, based on the second set of the one or more parameters, the microprocessor of the transmitter 1406 may provide instructions to the first waveform generator to generate a new waveform 1404 having a frequency f2. In yet another embodiment, based on the second set of one or more parameters, the microprocessor of the transmitter 1406 may use a new waveform generator other than the first waveform generator to generate a new waveform 1404 having a frequency f2.

Figure 15:
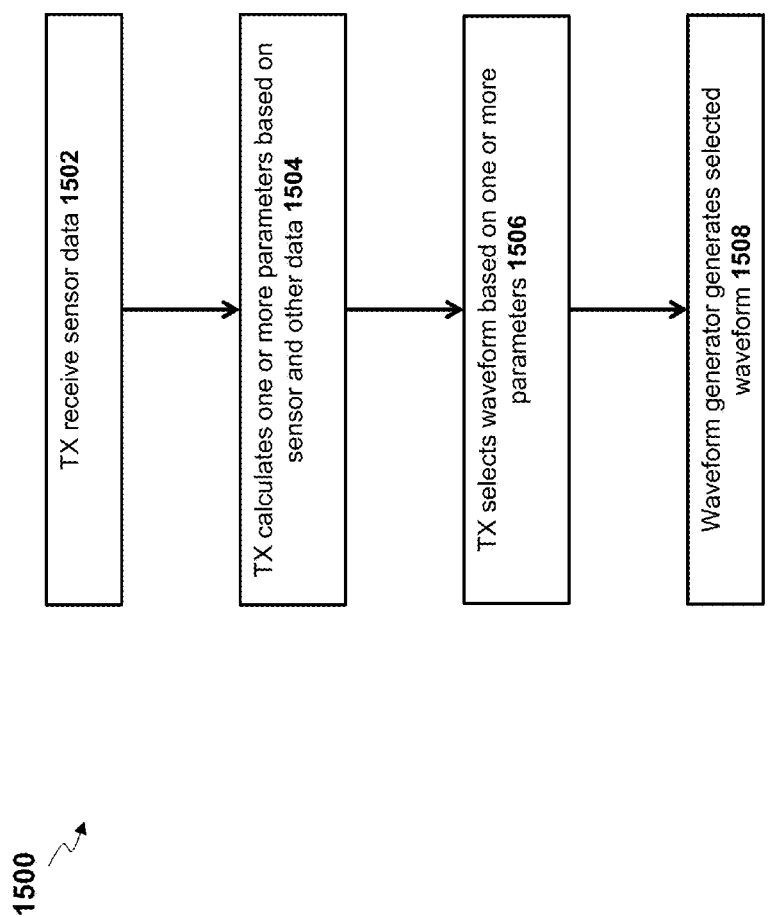
FIG. 15 illustrates a method to generate a waveform in a wireless power transmission system, according to an exemplary embodiment.

FIG. 15 illustrates a method to generate a waveform in a wireless power transmission system, according to an exemplary embodiment.

In a first step 1502, a transmitter (TX) receives sensor data. The transmitter establishes a connection with a receiver (RX). The transmitter and receiver communicate information and data over the communications signal, using a wireless communication protocol capable of transmitting information between two processors of electrical devices, such as Bluetooth®. For example, the transmitter may scan for a receiver's broadcasting signals or visa-versa, or a receiver may transmit a signal to the transmitter. The signal may announce the receiver's presence to the transmitter, or the transmitter's presence to the receiver, and may trigger an association between the transmitter and the receiver. Once the transmitter identifies the receiver, the transmitter may establish the connection associated in the transmitter with the receiver, allowing the transmitter and receiver to communicate signals. The transmitter may then command that the receiver begins transmitting data. The receiver measures the voltage among other metrics and may transmit the voltage sample measurement back to the transmitter. The transmitter further receives the information and data from the one or more internal sensors, the one or more external sensors, and the heat mapping data related to the location of the receiver, the information about the one or more electronic devices such as battery usage, and the one or more objects.

In a next step 1504, the transmitter may determine the one or more parameters. In one embodiment, the microprocessor of the transmitter may execute one or more software modules in order to analyze the received data and information, and based on the analysis identify the one or more parameters. The one or more parameters acts as an input to the microprocessor to make the necessary selections of the waveforms and their output frequency to form the pocket of energy at one or more targeted locations.

In the next step 1506, the transmitter selects the waveform (e.g., radio frequency waves, ultrasound waves) to be generated by the waveform generator based on the one or more parameters. For example, based on one set of the one or more parameters the transmitter may select the chirp waves for transmission, and based on another set of the one or more parameters, the transmitter may select sine waves for transmission. The transmitter may select the chirp waves since the frequency and the amplitude of the chirp waves continually increases or decreases with increases in the time and distance, and the one or more parameters may suggest the requirement of the signals that do not have a continuous frequency over a period of time.

In the next step 1508, the transmitter provides instructions to the waveform generator to generate the selected waveform such as chirp waves. The waveforms may also be produced by using an external power source and a local oscillator chip using a piezoelectric material. The waveforms may be controlled by the waveform generator and the transmitter circuitry, which may include a proprietary chip for adjusting frequency, phase and/or relative magnitudes of waveforms. The frequency, phase, gain, amplitude, and other waveform features of the waveforms are adjusted to form the pocket of energy at the targeted locations of the one or more electronic devices.

C. Null Steering

Figure 16:
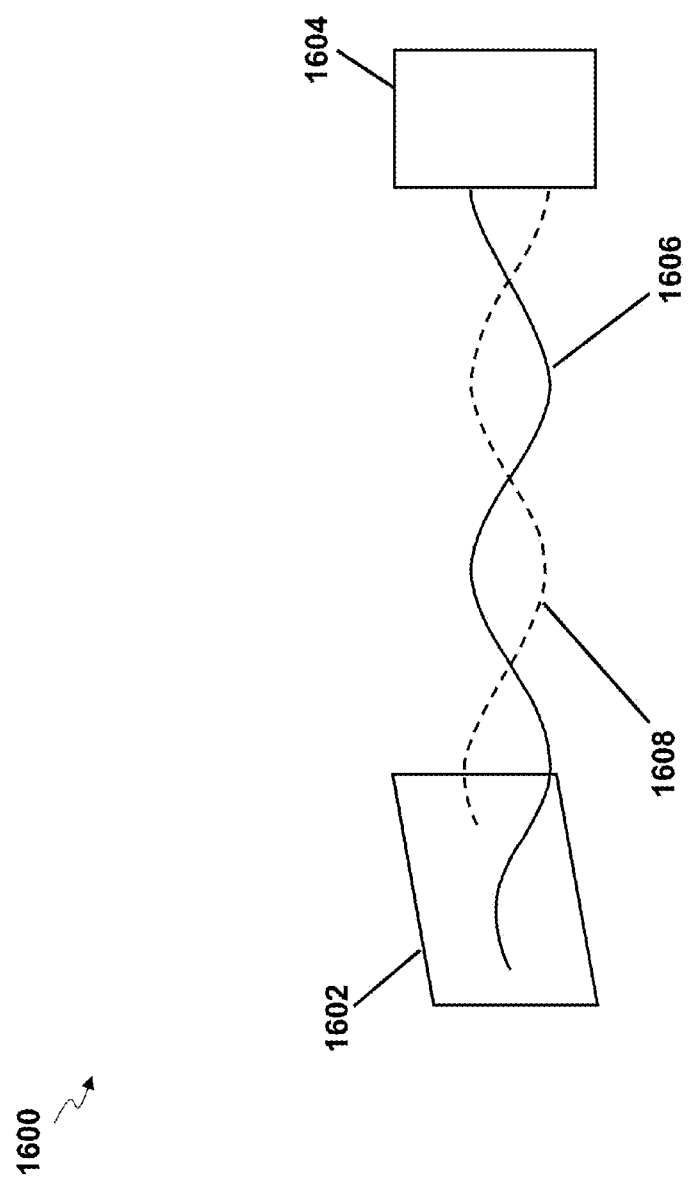
FIG. 16 illustrates formation of a null space in a wireless power transmission system, according to an exemplary embodiment.

FIG. 16 illustrates formation of a null space in a wireless power transmission system, according to an exemplary embodiment. The transmitter 1602 comprises the one or more antennas in the antenna array. The transmitter is configured to adjust the phase and amplitude among other possible attributes of power waves being transmitted from antennas of the transmitter 1602 to the receiver 1604. In the absence of any phase or amplitude adjustment, the power waves may be transmitted from each of the antennas of the transmitter 1602 and will arrive at different locations and have different phases. These differences are often due to the different distances from each antenna of the transmitter 1602 to receivers located at the respective locations. In order to form the pocket of energy, the power waves transmitted by the transmitter 1602 arrive at the receiver 1604 exactly in phase with one another and combine to increase the amplitude of the each wave to result in a composite wave that is stronger than each constituent power wave.

In the illustrated figure, the receiver 1604 may receive multiple power transmission signals from the transmitter 1602. Each of the multiple power transmission signals comprising power waves from multiple antennas of the transmitter 1602. The composite of these power transmission signals may be essentially zero, because the power waves add together to create the null space. That is, the antennas of the transmitter 1602 may transmit the exact same power transmission signal, which comprises the power waves having the same features (e.g., phase, amplitude). Because the power waves 1606, 1608 of each power transmission signal have the same characteristics, when the power waves 1606, 1608 of arrive at the receiver 1604, the power waves 1606, 1608 are offset from each other by 180 degrees. Consequently, the power waves 1606, 1608 transmitted by the transmitter 1602 cancel or nullify one another.

In one embodiment, based on the communication signal and mapping data (e.g., heat mapping data and/or sensor data), the transmitter 1602 will generate power waves based upon an indication of a location of the receiver 1604. The transmitter 1602 will then generate the null space behind the location of the receiver 1604, 1604 or in other locations proximate to the receiver 1604, or otherwise, where it would be undesirable to have a pocket of energy with power levels exceeding a particular threshold. In another embodiment, based on the mapping data (e.g., heat mapping data and/or sensor data), the transmitter 1602 will determine the location of the one or more objects such as the human beings and the animals, and then generate the null space at or near the location of the one or more objects, or where it would otherwise be undesirable to have a pocket of energy with power levels exceeding a particular threshold. The transmitter 1602 will continuously receive the data from the sensors regarding the one or more objects and the location of the one or more receivers. The transmitter 1602 on one hand is configured to generate the pocket of energy at the location of the one or more receivers, and on the other hand the transmitter 1602 will generate the one or more null spaces outside of the location of the receivers, and at or near the location of the one or more objects, or where it would otherwise be undesirable to have a pocket of energy with power levels exceeding a particular threshold. The transmitter 1602 is configured to constantly measure the distance between the location of the one or more objects and the one or more receivers. Based on the distance, the transmitter 1602 will select the power waves transmitting from the one or more antennas of the one or more antenna arrays for creating the pocket of energy or the null spaces.

In one embodiment, at least two waveforms may be generated by the generated by the waveform generator of the transmitter 1602. The at least two waveforms generated have different frequencies. The change in phase of the frequency of one of the at least two waveforms or all waveforms of the at least two waveforms may result in formation of a unified waveform. The uniform waveform is such that it will generate the pocket of energy at one or more targeted spots, along with one or more null spaces in certain areas.

Figure 17:
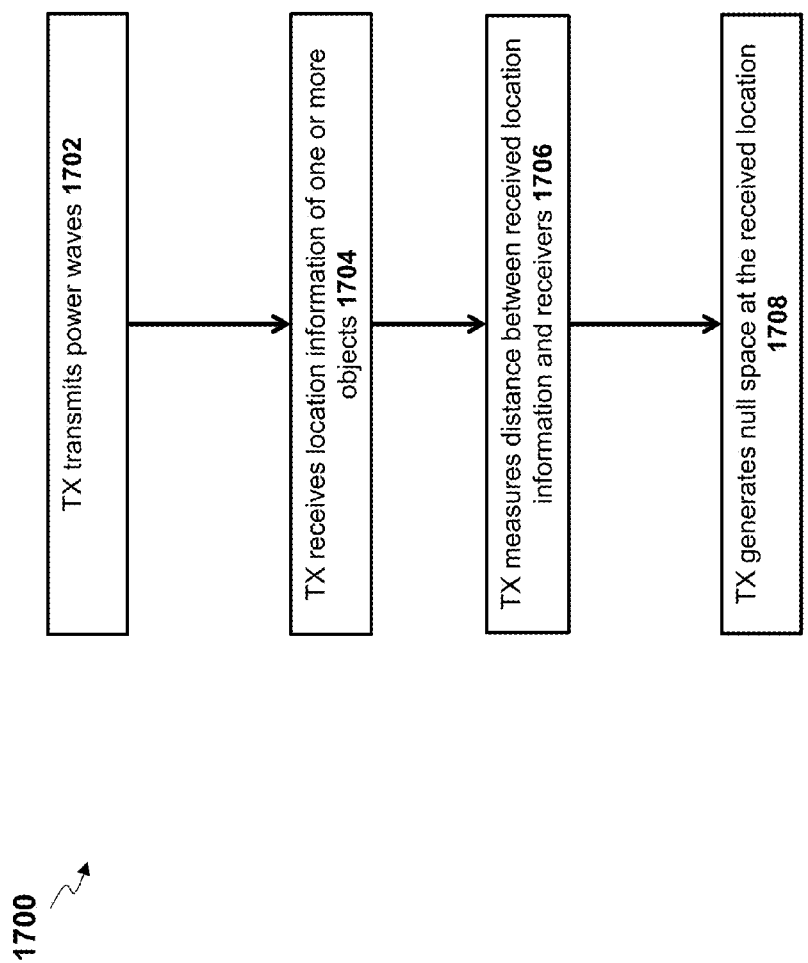
FIG. 17 illustrates a method for forming a null space in a wireless power transmission system, according to an exemplary embodiment.

FIG. 17 illustrates a method for forming a null space in a wireless power transmission system, according to an exemplary embodiment.

In a first step 1702, a transmitter (TX) transmits the power waves to generate the pocket of energy at the location of the one or more targeted electronic devices. The transmitter transmit power waves that converge in three-dimensional space. The power waves are controlled through phase and/or relative amplitude adjustments to form the pocket of energy in locations where the pocket of energy is intended. The pocket of energy is formed by the two or more power waves that converge at the targeted location in three-dimensional space.

In a next step 1704, the transmitter receives location data of objects. The one or more internal sensors and the one or more external sensors transmits the data to the transmitter regarding the presence and location of the objects within the working area of the transmitter. The one or more objects may include humans and animals.

In the next step 1706, the transmitter measures the distance between objects and receivers. Once the location data of the objects is received, the transmitter measures the distance between the location data of the objects and the location of the one or more receivers (e.g., as identified in the process described in FIG. 2) where the pocket of energy is directed. The transmitter is further configured to measure the distance between location data of the one or more objects from the transmitter and the power waves. Based on these measurements of various distances, the transmitter then determines whether to generate the null spaces or not, and if yes, the location of the null spaces.

In the next step 1708, if the transmitter determines that the objects are close to the pocket of energy with a power level that exceeds a given threshold, the transmitter creates a null space at or proximate to the location of the pocket of energy, or corresponding to the location of the objects. In some circumstances, transmitter can create a null space at the location where a pocket of energy is intended to be generated, when an object is detected at the same location as the intended pocket of energy. In these circumstances, the transmitted power waves cancel each other out, resulting in no significant energy being transmitted to the location containing the object.

Figure 18:
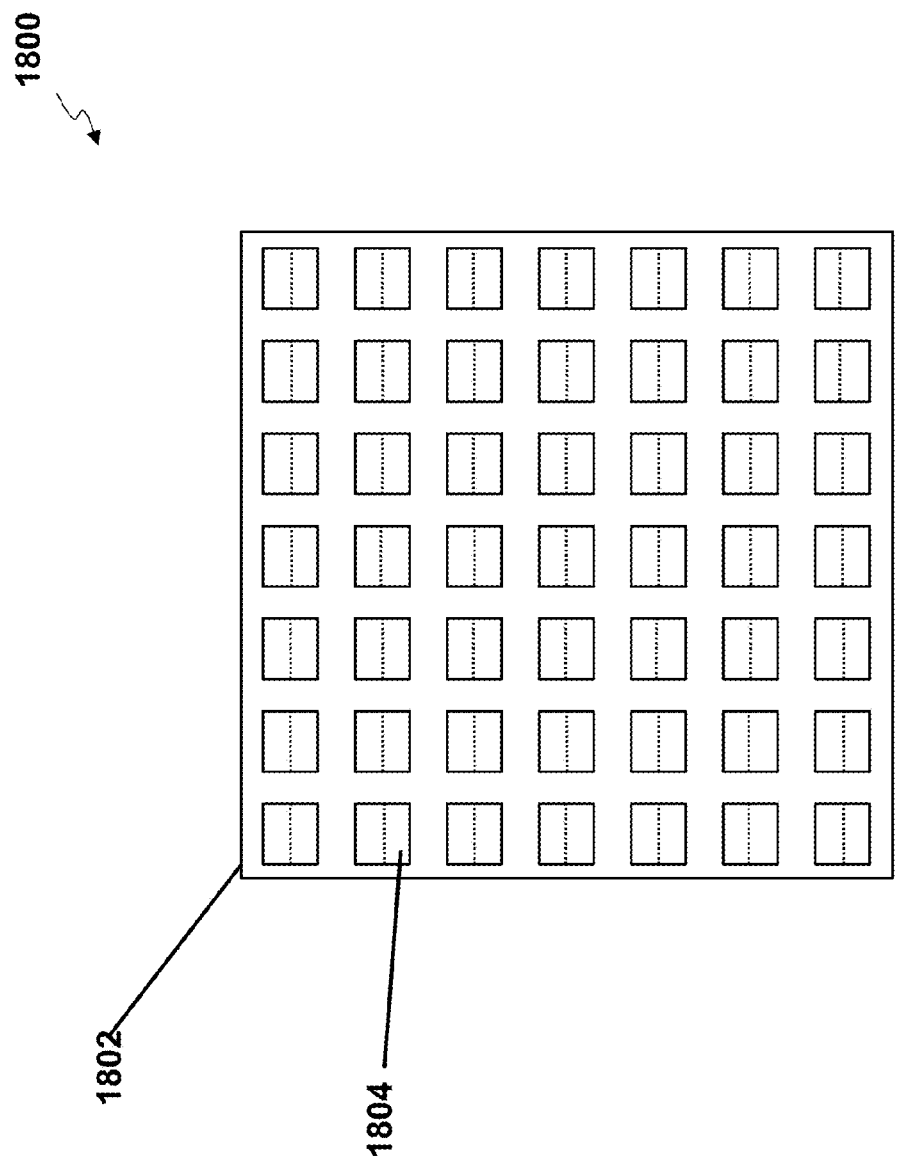
FIG. 18 illustrates arrangement of antennas in an antenna array of a wireless power transmission system, according to an exemplary embodiment.

D. Configurations of Transmitter Antenna Array i. Spacing of Antennas in Antenna Array FIG. 18 illustrates arrangement of antennas in an antenna array of a wireless power transmission system, according to an exemplary embodiment.

In one implementation, the system for wireless power transmission comprises the one or more transmitters. Each of the one or more transmitters comprises one or more antenna arrays. In the illustrative embodiment, a single antenna array 1802 is shown. Each of the one or more antenna arrays comprises one or more antennas to transmit one or more power waves. In the illustrative embodiment, the single antenna array 1802 comprises a plurality of antennas 1804. The antennas of the one or more antennas are spaced from each other such that the one or more power waves transmitted by the plurality of antennas are directed to form the pocket of energy to power the targeted electronic device.

The system for wireless power transmission further comprises a receiver configured to receive the pocket of energy generated using the one or more power waves transmitted by the one or more antennas in the one or more antenna arrays of the one or more transmitters. In an embodiment, the height of at least one antenna of the one or more antennas on the transmitter can be from about ⅛ inches to about 1 inch, and the width of the at least one antenna can be from about ⅛ inches to about 1 inch. A distance between two adjacent antennas in an antenna array can be between ⅓ to 12 Lambda. In one embodiment, the distance can be greater than 1 Lambda. The distance can be between 1 Lambda and 10 Lambda. In one embodiment, the distance can be between 4 Lambda and 10 Lambda.

The antennas of the one or more antennas in the antenna array are placed at a pre-defined distance with respect to each other such that the one or more power waves transmitted by the antennas are directed to form the pocket of energy at the receiver. Further, each of the one or more antennas are positioned at the pre-defined distance with respect to each other in a 3-dimensional space such that the one or more power waves transmitted by each of the one or more antennas do not form the pocket of energy outside the receiver. Further, each of the one or more antennas are positioned at the pre-defined distance with respect to each other in a 3-dimensional space such that the one or more power waves transmitted by each of the one or more antennas are directed to form the pocket of energy at the receiver, wherein the energy within the pocket of energy is greater than the energy present outside a periphery of the receiver because of the one or more power waves.

In one embodiment, the one or more antennas are fixed upon movable elements and the distance between the one or more antennas in each of the one or more antenna arrays is dynamically adjusted depending on location of the receiver such that the one or more power waves transmitted by the one or more antennas are directed to form the pocket of energy at the receiver. The movable elements are any mechanical actuators that are controlled by the microprocessor of the transmitter. The microprocessor of the transmitter receives the information from the one or more internal sensors, the one or more external sensors, and the heat mapping data regarding the location of the receiver or the targeted electronic device, and based on some or all of this sensor data, the microprocessor controls the movement of the mechanical actuators on which the antennas are mounted.

In one embodiment, the one or more antennas in each of the one or more antenna arrays are positioned at the pre-defined distance from each other that allows the mutual coupling between the one or more antennas, and wherein the mutual coupling is inductive or capacitive coupling between the plurality of antennas.

The one or more antennas of each of the one or more antenna arrays are configured to transmit the one or more power waves at a different time from each other because of the placement of the one or more antennas. In another embodiment, the one or more antennas of each of the one or more antenna arrays are configured to transmit the one or more power waves at a different time from each other because of a presence of timing circuit that is controlled by the microprocessor of the transmitter. The timing circuit can be used to select a different transmission time for each of the one or more antennas. In one example, the microprocessor may pre-configure the timing circuit with the timing of transmission of the one or more transmission waves from each of the one or more antennas. In another example, based on the information received from the one or more internal sensors, the one or more external sensors, and the communication signal, the transmitter may delay the transmission of few transmission waves from few antennas.

In yet another embodiment, there is provided the system for wireless power transmission. The system comprises a transmitter. The transmitter comprises the one or more antenna arrays. Each of the one or more antenna arrays comprises a plurality of antennas. The plurality of antennas transmit one or more power waves. The transmitter further comprises the microprocessor configured to activate a first set of antennas of the plurality of antennas based on the target for directing a pocket of energy using the one or more power waves. The first set of antennas is selected from the one or more antennas based on distance between antennas of the first set of antennas that corresponds to the desired spacing of the antennas to form the pocket of energy. In other words, the distance selected between antennas of the first set of antennas is such that the adjacent antennas are preferably far away from each other, and the one or more power waves transmitting from the first set of antennas forms the pocket of energy to power the targeted electronic device.

In one implementation, the transmitter comprises the antenna circuit configured to switch, each of the one or more antennas in the antenna array, on or off based on the communication signals. The communication signals may be received from the one or more internal sensors, the one or more external sensors, or the heat mapping data. In one embodiment, the antenna array is configured such that the power wave direction can be steered in a first direction by switching on a first set of antenna of the one or more antennas, and the power waves direction of the antenna array can be steered in a second direction by switching on a second set of antennas of the one or more antennas. The second set of antennas can include one or more antennas from the first set of antennas, or the second set of antennas may not include any antennas from the first set. In one embodiment, the power wave direction of the antenna array can be steered in a plurality of directions by switching on a set of antennas from the one or more antennas for each of the plurality of directions. The selections of antennas in the first set of antennas and the second set of antennas are based upon the distances between the antennas in the first set of antennas and the second set of antennas. The distances are so chosen that the power waves emerging out of the first set, second set or any set of antennas generate the efficient pocket of energy at the desired locations.

In one implementation, the spacing between the antennas that will transmit the transmission waves for generating the pocket of energy is determined based on the location of the receiver where the pocket of energy has to be created. The transmitter will determine the location of the receiver. In one example, the location of the receiver is measured using the communication signals such as Bluetooth signals transmitted by the receiver over the communication component. The location of the receiver may be used by microprocessor in order to adjust and/or select antennas from the plurality of antennas to form pockets of energy that may be used by the receiver in order to charge an electronic device.

In one embodiment, the antenna array comprises 1000 antennas. The antenna switching circuit configured to connect any number of the 1000 antennas at a given time. The switching circuit comprises a signal splitter adapted to split a signal into any number of signals. In addition, the switching circuit includes 1000 number of switches, and switching circuit adapted to control the number of switches so that a specified set of the number of 1000 antennas are switched on. The switching circuit may comprise micro electro-mechanical system switches. In another embodiment, the switching circuit may comprise a filter adapted to separate transmit and receive signals to/from the antenna array.

In another embodiment, the antenna array comprises Z number of the antennas, and the switching circuitry is configured to control X number of antennas at a given time. In accordance with this embodiment, the switch circuit comprises a signal splitter adapted to split a signal into X number of signals, a switching matrix comprising X number of 1×Z switches, and switch circuit adapted to control the switching matrix so that a contiguous set of the X-number of the antennas are activated. In some embodiments, the 1×Z switches comprise multiplexers.

ii. Shape of Antenna Array Configuration

Figure 19:
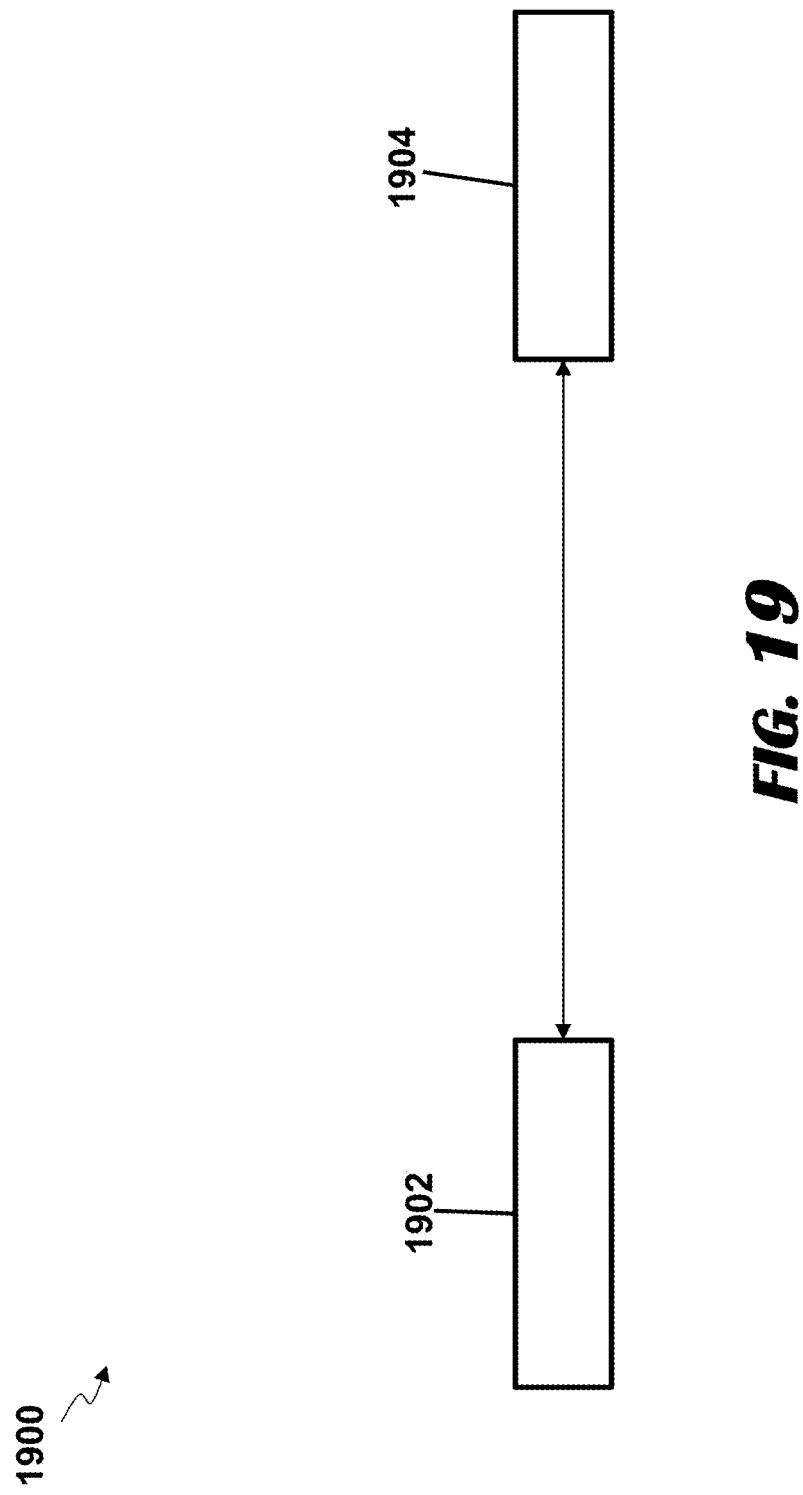
FIG. 19 illustrates arrangement of a plurality of antenna arrays in a wireless power transmission system, according to an exemplary embodiment.

FIG. 19 illustrates arrangement of a plurality of antenna arrays in a wireless power transmission system, according to an exemplary embodiment.

In an embodiment, the system for wireless power transmission is provided. The system comprises the transmitter. The transmitter comprises at least two antenna arrays. In one example, the at least two antenna arrays comprises a first antenna array 1902 and a second antenna array 1904. It should be noted that for the simplicity of explanation only the system with the first antenna array 1902 and the second antenna array 1904 is being described, however more than two antenna arrays may be included in the system without moving out from the scope of the disclosed embodiments. Each of the first antenna array 1902 and the second antenna array 1904 comprises one or more rows and one or more columns of antennas configured to transmit one or more power waves. The transmitter further comprises the microprocessor. The microprocessor is configured to control the spacing between the first antenna array 1902 and the second antenna array 1904. The first antenna array 1902 of the at least two arrays is spaced to be offset at the pre-defined distance behind the second antenna array 1904 of the at least two arrays in the 3-dimensional space such that the one or more power waves transmitted by the antennas of each of the first antenna array 1902 and the second antenna array 1904 are directed to form the pocket of energy to power the targeted electronic device. The first antenna array 1902 and the second antenna array 1904 are positioned at the pre-defined distance from each other depending on the location of the targeted electronic device. In other words, the pre-defined distance is selected by the transmitter based on the location of the targeted electronic device.

In an embodiment, the distance between the first antenna array 1902 and the second antenna array 1904 is dynamically adjusted depending on the location of the targeted electronic device such that the one or more power waves transmitted by antennas of the first antenna array 1902 and the second antenna array 1904 are directed to form the pocket of energy at the targeted electronic device. In an embodiment, the first antenna array 1902 and the second antenna array 1904 are flat shaped and the offset distance between the at least two antenna arrays is 4 inches.

iii. Multiple Arrays

Figure 20:
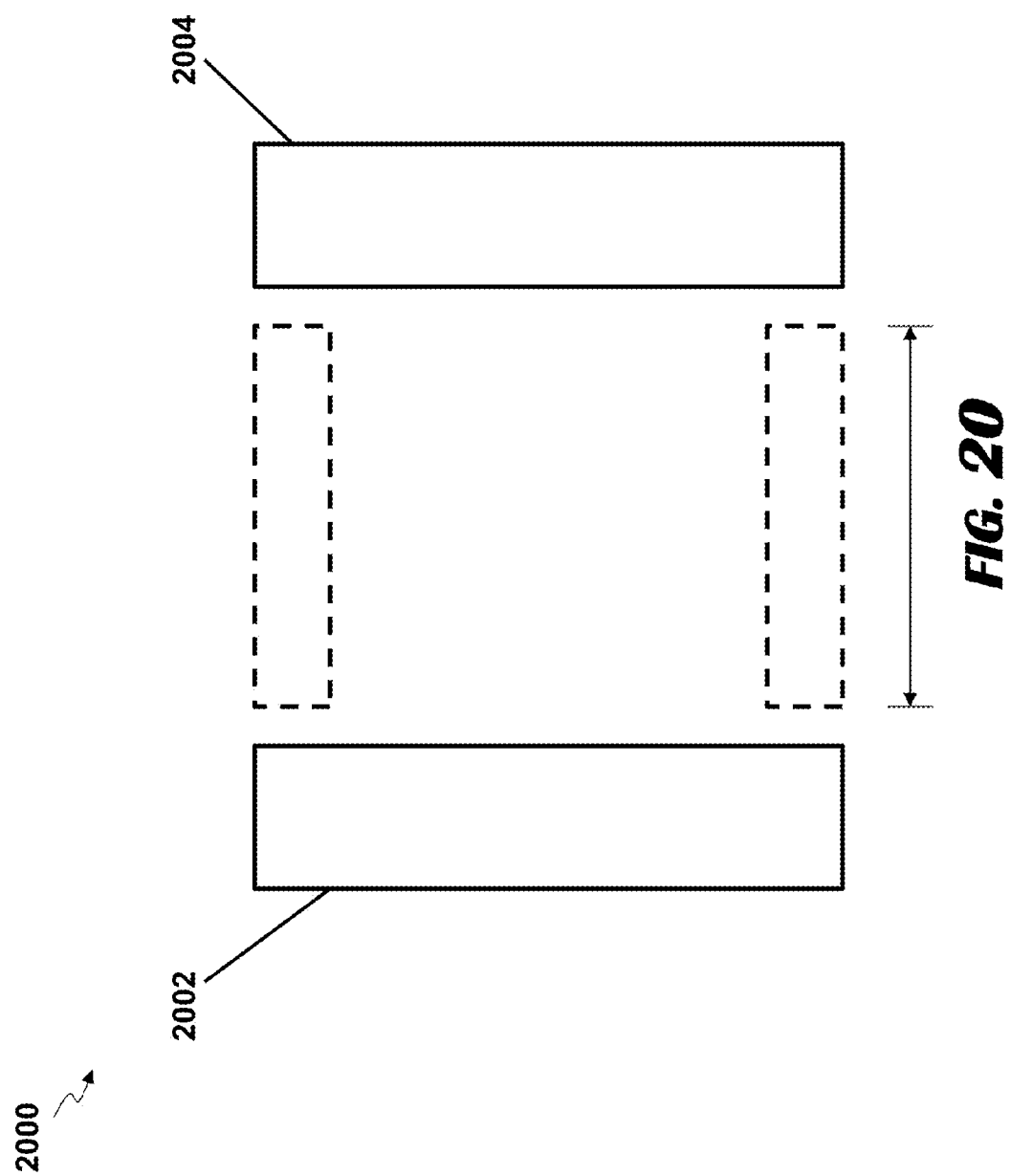
FIG. 20 illustrates arrangement of a plurality of antenna arrays in a wireless power transmission system, according to an exemplary embodiment.

FIG. 20 illustrates arrangement of a plurality of antenna arrays in a wireless power transmission system, according to an exemplary embodiment.

In an embodiment, the system for wireless power transmission is provided. The system comprises the transmitter. The transmitter comprises at least two antenna arrays. In one example, the at least two antenna arrays comprises a first antenna array 2002 and a second antenna array 2004. It should be noted that for the simplicity of explanation only the system with the first antenna array 2002 and the second antenna array 2004 is being described, however more than two antenna arrays may be included in the system without moving out from the scope of the disclosed embodiments.

Each of the first antenna array 2002 and the second antenna array 2004 comprises one or more rows and one or more columns of antennas configured to transmit one or more power waves.

In one embodiment, the first antenna array 2002 and the second antenna array 2004 are both used for creation of the pocket of energy at the same time. In another embodiment, the first antenna array 2002 and the second antenna array 2004 are both used for creation of the null space at the same time. In yet another embodiment, the first antenna array 2002 and the second antenna array 2004 are both used for creation of the pocket of energy and the null space at the same time.

iv. Three-Dimensional Array Configuration

Figure 21:
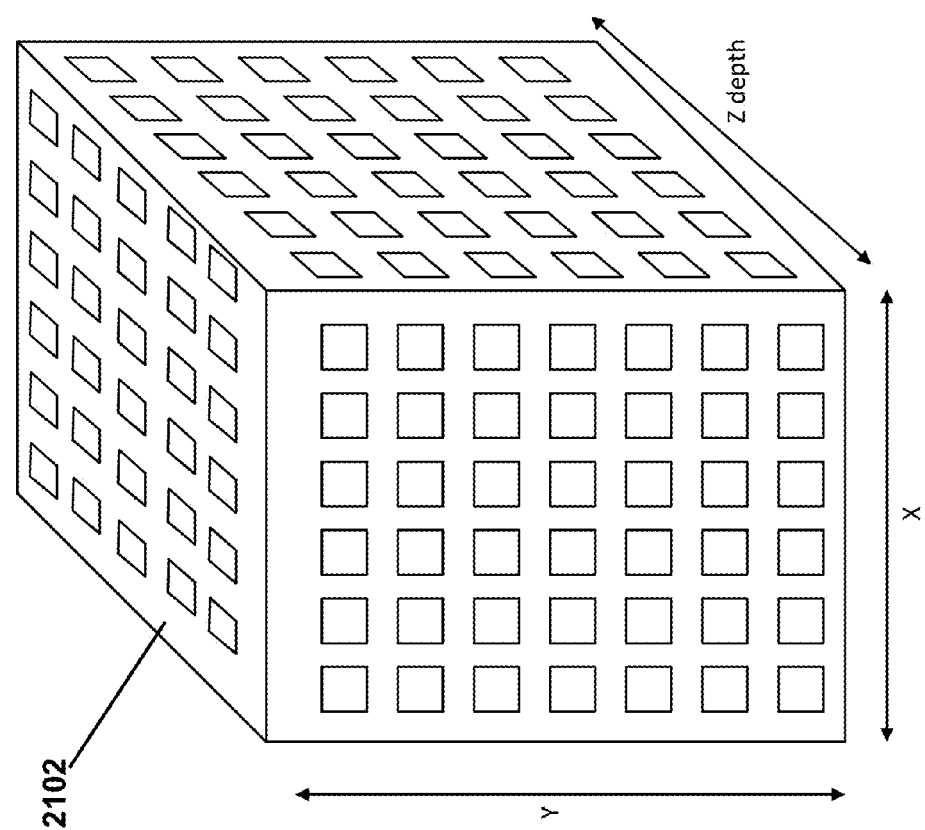
FIG. 21 illustrates an antenna array configuration in a wireless power transmission system, according to an exemplary embodiment.

FIG. 21 illustrates an antenna array configuration in a wireless power transmission system, according to an exemplary embodiment.

In one embodiment, an antenna array 2102 having a particular array size and shape is disclosed. The antenna array 2102 described herein is a three dimensional antenna array. The shape of the three-dimensional antenna array may include, but not limited to, arbitrary shaped planar antenna arrays as well as cylindrical, conical, and spherical. The antenna array comprises the one or more antennas of a particular type, size and shape. For example, one type of antennas is a so-called patch antenna having a square shape and a size compatible with operation at a particular frequency (e.g. 10 GHz). Further, the antennas are arranged in a square configuration and having a spacing, e.g., of one wavelength (1λ). Those of ordinary skill in the art will recognize that additional or alternative shapes, spaces, and types of antennas may also be used. One skilled in the art would also appreciate that the size of one or more antennas may be selected for operation at any frequency in the RF frequency range (e.g., any frequency in the range of about 900 MHz to about 100 GHz). The types of antennas that may be used in the antenna array of the present disclosure may include, but are not limited to, notch elements, dipoles, or slots, or any other antennas well known to those of ordinary skill in the art. In addition, reference will be made herein to generation of an antenna power transmission wave having a particular shape or power transmission wave-width based on the shape of the antenna array. Those of ordinary skill in the art will appreciate that antenna power waves having other shapes and widths may also be used and may be provided using well-known techniques such as by inclusion of amplitude and phase adjustment circuits into appropriate locations in the antenna feed circuit.

In one embodiment, the three dimensional antenna arrays are used in the wireless power transmission system of the present disclosure. The three dimensional antenna array may be of two types. The two types comprise an active antenna array and a passive antenna array. The active antenna array includes active devices such as semiconductor devices to aid in transmission of the power waves. The passive antenna array does not aid in the transmission of the power waves. The phase characteristics between the antennas of the array are provided in some way in either the active or passive arrays. In one embodiment, the active antenna array will generally include controllable phase-shifters which can be used to adjust the phase of the RF waves being fed to one (or to a subset) of the antennas of the array. In another embodiment, the need for a phase-shifting power transmission wave-former may be avoided by using a non-phase-controlled signal amplitude divider in conjunction with control of the phase control elements associated with each antenna or subset of antennas. Thus, in general, the active antenna array comprises the plurality of antennas and radio frequency circuits connected to the antennas. The active antenna array is an antenna system for imparting an appropriate phase difference or the phase difference and an appropriate gain difference to a RF signal to be transmitted, of each antenna. Thus, directional power transmission wave scan can be performed or an arbitrary directional power transmission wave can be realized. The active antenna array may further have a transmit amplifier and a receive amplifier associated with each antenna or subset of antennas.

In an alternative or additional embodiment, the antenna array includes the cubical shaped surface. In order to point a power wave in a particular direction with maximum gain or a desired gain, to generate the pocket of energy, it may be preferable to select (i.e., activate) as many antennas of the plurality of the antennas as possible, or at least a pre-selected number of antennas. Because of the shape of the array not being linear, the shape will cause the phase differences between the antennas. For example, one antenna, which may be considered as the reference antenna, will produce a gain pattern or radiation pattern that has a main lobe axis in the desired power transmission wave direction. Other antennas also will have radiation patterns, which can contribute to the power transmission wave gain in the desired direction, but because of the shape of the array, phase differences caused by the contour of the antenna surface will limit the cluster size that may produce a useful antenna power transmission wave shape. In one implementation, the phase differences are caused by the location of the antennas with respect to reference antenna that has the radiation pattern in the desired direction. For example, reference antenna points its power transmission wave perpendicular to its aperture. Because of the shape of the array, other antennas do not point in the same direction, and in addition, their signal phases are not aligned with the signal from reference antenna. In most instances, the phase shift is greater for elements further away from reference element and is a function of the angle between plane and the surface of the antenna array. Because of the phase shift, there is a loss of coherence between the signal from reference antenna and all other antenna in its cluster and on the antenna array. The phase-delayed waves will have components that can add to the overall wave, but at a certain point, will also subtract or cancel from the wave. This limits the size of the cluster, and hence, the maximum gain of a cluster array.

In another embodiment, the one or more antennas comprise a first set of antennas and a second set of antennas. The first set of antennas and the second set of antennas are placed at a different angles in relation to the non-planar shaped antenna array surface of the three dimensional array. By selecting which antennas should transmit power waves, the shape of the three dimensional array can be dynamically adjusted based on the location of the receiver. In an alternative embodiment, one or more antenna arrays can have a particular configuration based upon a predetermined, predicted, or expected receiver location.

A first antenna can be positioned at a distance from a second antenna, where both antennas transmit power waves to the receiver wherein the pocket of energy is generated at receiver. It may be desirable to have a distance between the first and second antennas such that the transmitted power waves are not substantially parallel to each other. An optimal distance between the first and second antennas is based upon the distance of a receiver, a size of a room, frequency of the power waves, and an amount of power to be transmitted.

FIGS. 22A and 22B illustrate an antenna array configuration in a wireless power transmission system, according to an exemplary embodiment. The plurality of antennas 2202 are arranged in the antenna array 2204. As illustrated in FIGS. 22A and 22B, the antenna array 2204 is a 3-dimensional antenna array. The increased spacing between the plurality of antennas 2202 in the antenna array 2204 results in the size (or pocket size) of the pocket of energy to be small as represented in FIG. 22C. In this example, the configuration of the antenna array 2204 is 40"×40".

FIGS. 23A and 23B illustrate an antenna array configuration in a wireless power transmission system, according to an exemplary embodiment. The plurality of antennas 2302 are arranged in the antenna array 2304. The antenna array 2304 is a 3-dimensional antenna array. As illustrated in FIGS. 23A and 23B, the addition of depth in the arrangement of the plurality of antennas 2302 in the antenna array 2304 results in the size (or pocket size) of the pocket of energy to be small as represented in FIG. 23C. In this example, the configuration of the antenna array 2304 is 40"×40"×5".

FIGS. 24A and 24B illustrate an antenna array configuration in a wireless power transmission system, according to an exemplary embodiment. The plurality of antennas 2402 are arranged in the antenna array 2404. The antenna array 2404 is a 3-dimensional antenna array. As illustrated in FIGS. 16A and 16B, the nonlinear spacing between the plurality of antennas 2402 in the antenna array 2404 results in the change in the distribution of energy by the one or more power waveforms around the size (pocket size) of the pocket of energy as represented in FIG. 24C. The nonlinear spacing represented in the figures is logarithmic spacing. In this example, the configuration of the antenna array 2404 is 40"×40".

FIGS. 25A and 25B illustrate an antenna array configuration in a wireless power transmission system, according to an exemplary embodiment. The plurality of antennas 2502 are arranged in the antenna array 2504. The antenna array 2504 is a 3-dimensional antenna array. As illustrated in FIGS. 25A and 25B, the nonlinear spacing between the antennas 2502 in the antenna array 2504, results in the change in the distribution of energy by the one or more power waveforms around the size (pocket size) of the pocket of energy as represented in FIG. 25C. The nonlinear spacing represented in the figures is logarithmic spacing. In this example, the configuration of the antenna array 2504 is 40"×40"×6".

FIGS. 26A and 26B illustrate an antenna array configuration in a wireless power transmission system, according to an exemplary embodiment. The plurality of antennas 2602 are arranged in the antenna array 2604. The antenna array 2604 is a 3-dimensional antenna array. As illustrated in FIGS. 26A and 26B, the increase in the distance between the plurality of antennas 2602 in the antenna array 2604 results in the creation of multiple power waves that do not cancel each other and thus results in producing a large pocket of energy as represented in FIG. 26C. In this example, the configuration of the antenna array 2604 is 13"×75".

FIGS. 27A and 27B illustrate an antenna array configuration in a wireless power transmission system, according to an exemplary embodiment. The plurality of antennas 2702 are arranged in the antenna array 2704. The antenna array 2704 is a 3-dimensional antenna array. As illustrated in FIGS. 27A and 27B, the decrease in the distance between the plurality of antennas 2702 in the antenna array 2704 results in the creation of strong power waves that do not cancel each other and thus results in producing a large pocket of energy as represented in FIG. 27C. In this example, the configuration of the antenna array 2704 is 8"×16".

FIGS. 28A and 28B illustrate an antenna array configuration in a wireless power transmission system, according to an exemplary embodiment. The plurality of antennas 2802 are arranged in the antenna array 2804. The antenna array 2804 is a 3-dimensional antenna array. As illustrated in FIGS. 28A and 28B, the spacing/distance between the plurality of antennas 2802 in the antenna array 2804 along with the size of antenna array 2804 results in the production of the pocket of energy as represented in FIG. 28C. In this example, the configuration of the antenna array 2804 is 45"×93".

FIGS. 29A and 29B illustrate an antenna array configuration in a wireless power transmission system, according to an exemplary embodiment. The plurality of antennas 2902 are arranged in the antenna array 2904. The antenna array 2904 is a 3-dimensional antenna array. As illustrated in FIGS. 29A and 29B, the spacing/distance between the plurality of antennas 2902 in the antenna array 2904 along with the size of antenna array 2904 results in the production of the pocket of energy as represented in FIG. 29C. In this example, the configuration of the antenna array 2904 is 30"×63".

Figure 30:
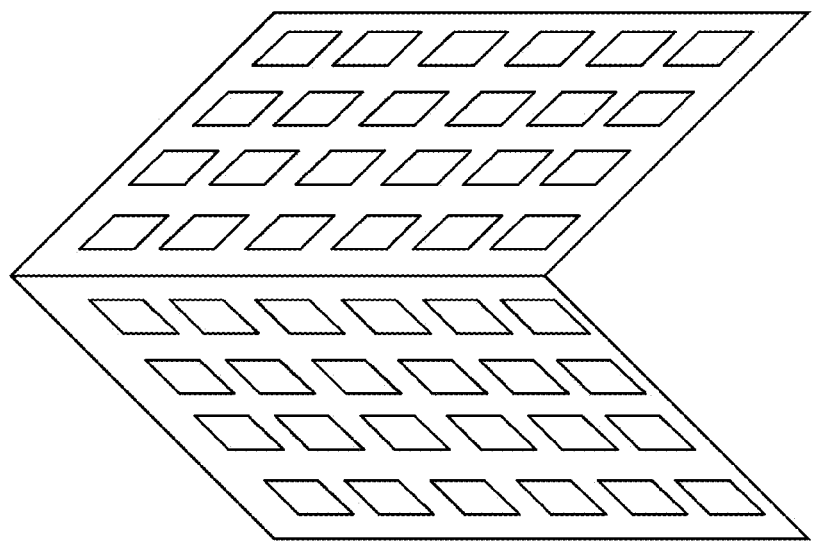
FIG. 30 illustrates an antenna array configuration in a wireless power transmission system, according to an exemplary embodiment.
Figure 31:
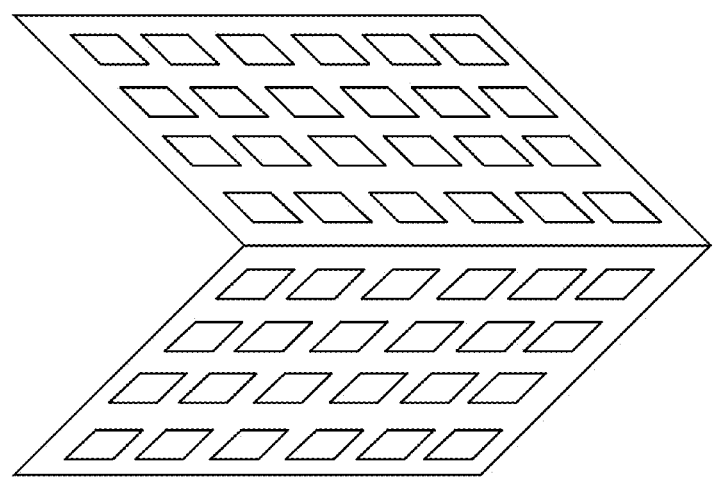
FIG. 31 illustrates an antenna array configuration in a wireless power transmission system, according to an exemplary embodiment.

FIGS. 30 and 31 illustrate an antenna array configuration in a wireless power transmission system, according to an exemplary embodiment. The transmitter comprises one or more antennas configured to transmit one or more power waves for forming the pocket of energy to power the targeted electronic device. The one or more antennas are positioned on a non-planar shaped antenna array surface of a three dimensional array selected from the group consisting of a concave shape and a convex shape. The non-planar shape may also be selected from the group consisting of a spherical concave shape, a spherical convex shape, a parabolic concave shape, and a parabolic convex shape. In one embodiment, the one or more antennas in the three-dimensional antenna array are positioned in such a way with respect to each other due to the non-planar shaped antenna array surface that the one or more power waves transmitted by the one or more antennas do not form the pocket of energy outside a periphery of a receiver, as described in FIGS. 11-16. In another embodiment, the one or more antennas in the three-dimensional antenna array are positioned in such a way with respect to each other due to the non-planar shaped antenna array surface that the one or more power waves transmitted by the one or more antennas are directed to form the pocket of energy at a receiver which is greater than the energy present outside a periphery of a receiver.

V. Exemplary Wireless Power Transmission Method, Using Heat Mapping and Sensors

Figure 32:
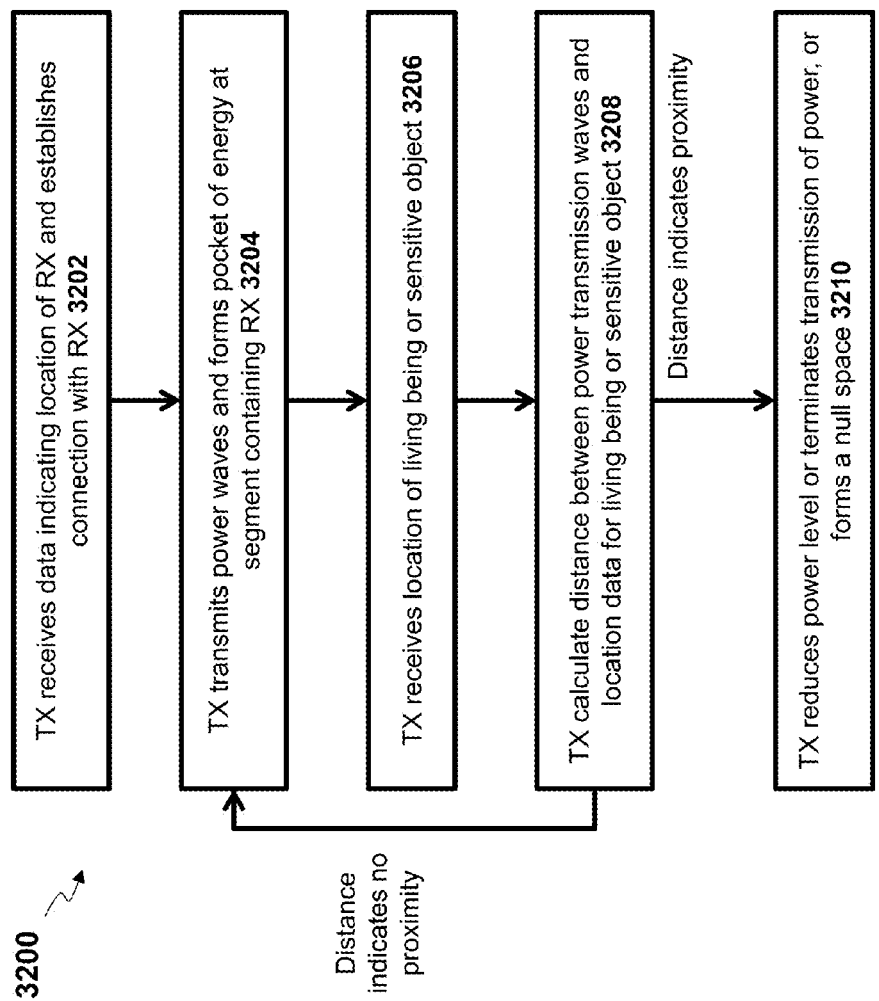
FIG. 32 illustrates a method for forming a pocket of energy in a wireless power transmission system, according to an exemplary embodiment.

FIG. 32 illustrates a method 3200 for forming a pocket of energy in a wireless power transmission system, according to an exemplary embodiment.

At a first step 3202, a transmitter (TX) receives data (e.g., heat-map data) indicating a location of a receiver (RX), and also establishes a connection with the receiver according to one or more protocols used to communicate via a communications signal. That is, the transmitter and the receiver may communicate various types of data, such as heat-map data, over the communications signal, using a wireless communications protocol capable of transmitting information between two processors of electrical devices (e.g., NFC, ZigBee®, Bluetooth®, Wi-Fi), where the wireless communications protocol ordinarily accomplishes some routines establishing an association between the transmitter and the receiver. Once the transmitter identifies the receiver, the transmitter may establish the connection associated in the transmitter with the receiver, allowing the transmitter and receiver to communicate. After the association is established, then in current step 3202, the receiver may transmit heat-map data to the transmitter, indicating a location (e.g., coordinates, segment) where the receiver may be found in the transmission field.

At a next step 3204, the transmitter transmits power waves to generate a pocket of energy at the location of the receiver. The transmitter transmit the power waves that converge in the three-dimensional space. The power waves may be controlled through phase and/or relative amplitude adjustments to form the pocket of energy at the receiver location where the pocket of energy is intended. In one embodiment, the pocket of energy is formed by the two or more power waves that converge at the receiver location in the three-dimensional space.

At a next step 3206, the transmitter receives location data of a living being or a sensitive object. One or more sensors acquire sensor data indicating presence of the living being or the sensitive object, and then communicate raw or processed sensor data to the transmitter. The one or more sensors may acquire and communicate location-related sensor data indicating the location of living beings or other sensitive object. In an embodiment, one or more sensors acquire and communicate to the transmitter location-related information, and at least one non-location attribute of the living being or sensitive object. In an embodiment, at least one non-location attribute of the living being or sensitive object includes one or more of pyro-electric sensor responses, optical sensor responses, ultrasound sensor responses, and millimeter sensor responses.

At a next step 3208, the transmitter measures the distance between the living being or the sensitive object and the power waves. In one embodiment, the transmitter compares the location data for the living being or sensitive object against the location of the power waves (transmitted between the transmitter and the receiver). The transmitter also compares the location data for the living being or sensitive object against planar coordinates (e.g., one-dimensional coordinates, two-dimensional coordinates, or three-dimensional coordinates, or polar coordinates) associated with the location of the receiver whose coordinates may be stored in a mapping memory of the transmitter. The transmitter compares the power levels generated by the power waves against one or more maximum permissible power level for the living being or the sensitive object. If the transmitter determines the distance between the living being or the sensitive object and the power waves indicate not enough proximity. In other words, the power levels generated by the power waves are comparatively lower than the one or more maximum permissible power level at the location of the living being or the sensitive object, then the transmitter continues to transmit the power waves, thereby forming the pocket of energy at the location of the receiver.

If the transmitter determines the distance between the living being or the sensitive object and the power waves or the path of the power waves indicate proximity (i.e., the power levels generated by the power waves is higher than or closer to the one or more maximum permissible power level at the location of the living being or the sensitive object), then the transmitter at step 3210, adjust the power waves based on the location of the living being or the sensitive object. In some case, the transmitter reduces the power level of the power waves at the receiver location. In some cases, the transmitter terminates transmission of the power waves to the receiver location. In some cases, the transmitter diminishes the amount of energy of the power waves at the receiver location. In some embodiments, the transmitter redirects the transmission of the power waves around the living being or the sensitive object. In some embodiments, the transmitter creates a null space at or proximate to the location of the receiver or corresponding to the location of the living being or the sensitive object. In some instances, the transmitter creates the null space at the location where the pocket of energy is being generated when the living being or the sensitive object is detected at the same location as the intended pocket of energy. In these circumstances, the transmitted power waves cancel each other out resulting in no significant energy being transmitted to the location of the living being or the sensitive object.

In one embodiment, each of the one or more antennas have a same size, and at least one antenna in the one or more antennas of the transmitter is selected from the group consisting of: a flat antenna, a patch antenna, and a dipole antenna. The one or more antennas of the transmitter are configured to operate in a frequency band ranging from about 900 MHz to about 100 GHz, including about 1 GHz, 5.8 GHz, 24 GHz, 60 GHz, and 72 GHz. The one or more antennas are configured to transmit the one or more power waves at a different time from each other depending on the placement of the one or more antennas in the at least one three dimensional antenna array.

The one or more antennas are evenly spaced within the three-dimensional antenna array. The one or more antennas are also asymmetrically located within the three-dimensional antenna array, and therefore the three-dimensional antenna array allow the transmission of the one or more power waves into any one of large range of directions. In another embodiment, the one or more antennas can be evenly spaced on the antenna array, asymmetrically located on the antenna array, or both, thereby allowing the transmission of the one or more power waves in a wide range of directions. In yet another embodiment, the one or more antennas can be unevenly spaced on the antenna array, asymmetrically located on the antenna array, or both, thereby allowing the transmission of the one or more power waves in a wide range of directions. In another embodiment, the one or more antennas in the three dimensional array are arranged in two, two-dimensional arrays.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A method for wireless power transmission comprising:
transmitting, by a transmitter, power waves that converge in a three dimensional space to form one or more first pockets of energy at a predetermined location for receiving by an antenna element of a receiver, wherein the receiver is configured to harvest power from the one or more first pockets of energy at the predetermined location;
acquiring, by at least one sensor in communication with the transmitter, data indicating presence of a living being or a sensitive object, wherein the data indicating the presence of the living being or the sensitive object indicates a distance of the living being or the sensitive object from the at least one sensor;
obtaining, by the transmitter, information relating to a location of the living being or the sensitive object based upon the data indicating the presence of the living being or the sensitive object; and
determining, by the transmitter, whether to adjust a power level of the power waves that converge in the three dimensional space to form the one or more first pockets of energy at the predetermined location in response to the information relating to the location of the living being or the sensitive object.

2. The method of claim 1, further comprising reducing, by the transmitter, the power level of the power waves that converge in the three dimensional space to form the one or more first pockets of energy at the predetermined location when the information relating to the location of the living being or the sensitive object indicates that the living being or the sensitive object is proximate to the predetermined location.

3. The method of claim 1, further comprising terminating, by the transmitter, the power waves that converge in the three dimensional space to form the one or more first pockets of energy at the predetermined location when the information relating to the location of the living being or the sensitive object indicates that the living being or the sensitive object is proximate to the predetermined location.

4. The method of claim 1, further comprising activating, by the transmitter, an alarm element when the information relating to the location of the living being or the sensitive object indicates that the living being or the sensitive object is proximate to the predetermined location.

5. The method of claim 1, wherein the at least one sensor comprises a first sensor located at a first position on the transmitter, and a second sensor located at a second position on the transmitter separated from the first position, and
wherein the information relating to a location of the living being or the sensitive object comprises stereoscopic location information based upon the data indicating the presence of the living being or the sensitive object, and the data includes respective data acquired by the first sensor and respective data acquired by the second sensor.

6. The method of claim 1, wherein the information relating to the location of the living being or the sensitive object includes information indicating a motion of the living being or the sensitive object, and the motion is based upon the data indicating the presence of the living being or the sensitive object at different times.

7. The method of claim 6, further comprising:
reducing, by the transmitter, the power level of the power waves when the information indicating the motion of the living being or the sensitive object indicates motion of the living being or the sensitive object toward the predetermined location; and
terminating, by the transmitter, the power waves when the information relating to the location of the living being or the sensitive object indicates arrival of the living being or the sensitive object at the predetermined location.

8. The method of claim 1, wherein acquiring data indicating the presence of the living being or the sensitive object further comprises:

acquiring, by at least one sensor in communication with the transmitter, human recognition data, the human recognition data comprising one or more of types of data selected from the group consisting of: body temperature data, infrared range-finder data, motion data, activity recognition data, silhouette data, gesture data, heart rate data, portable devices data, and wearable devices data.

9. The method of claim 1, wherein the transmitting further comprises:

transmitting, by the transmitter, the power waves that converge in the three dimensional space to form the one or more first pockets of energy at the predetermined location, and additional power waves that converge to form one or more second pockets of energy at a second location separated from the predetermined location.

10. The method of claim 9, wherein the transmitter reduces the power level of the power waves when the data relating to the location of the living being or the sensitive object indicates the living being or the sensitive object is proximate to the predetermined location.

11. The method of claim 9, wherein the transmitter reduces a power level of the electromagnetic energy waves when the data relating to the location of the living being or the sensitive object indicates the living being or the sensitive object is proximate to the second location separate from the predetermined location.

12. The method of claim 1, wherein the at least one sensor comprises a first sensor providing a first type of data indicating the presence of the living being or the sensitive object, and a second sensor providing a second type of data indicating the presence of the living being or the sensitive object, and wherein at least one of the first type of data and the second type of data indicates an absolute location in three dimensional space of the living being or the sensitive object.

13. The method of claim 1, further comprising, by one or more of the at least one sensor and the transmitter, filtering the data indicating the presence of the living being or the sensitive object to eliminate false indications of the presence of the living being or the sensitive object in the information relating to the location of the living being or the sensitive object.

14. The method of claim 1, further comprising:

calculating, by the transmitter, a predetermined transmission path of the power waves that converge in the three dimensional space to form the one or more first pockets of energy at the predetermined location;

comparing, by the transmitter, the predetermined transmission path of the power waves with the information relating to the location of the living being or the sensitive object; and redirecting, by the transmitter, the power waves when the comparing indicates that the living being or the sensitive object is located in proximity to the predetermined transmission path of the power waves.

15. A transmitter for wireless power transmission comprising:

at least two antennas;

a controller that controls power waves broadcast by the transmitter through the at least two antennas that converge in a three dimensional space to form one or more pockets of energy at a predetermined location for receiving by an antenna element of a receiver;

a transmitter housing containing the at least two antennas; and at least one sensor located on the transmitter housing to sense presence of a living being or a sensitive object, and to communicate to the controller data relating to the presence of the living being or the sensitive object, wherein the data relating to the presence of the living being or the sensitive object indicates a distance of the living being or the sensitive object from the at least one sensor, and wherein the controller determines whether to adjust a power level of the power waves that converge in the three dimensional space to form the one or more pockets of energy at the predetermined location in response to the data relating to the presence of the living being or the sensitive object.

16. The transmitter of claim 15, wherein the controller reduces the power level of the power waves that converge in the three dimensional space to form the one or more pockets of energy at the predetermined location, when the data relating to the presence of the living being or the sensitive object indicates that the living being or the sensitive object is proximate to the predetermined location.

17. The transmitter of claim 16, wherein the controller terminates the power waves that converge in the three dimensional space to form the one or more pockets of energy at the predetermined location, when the data relating to the presence of the living being or the sensitive object indicates that the living being or the sensitive object is proximate to the predetermined location.

18. The transmitter of claim 15, wherein the at least one sensor comprises a first sensor located at a first position on the transmitter housing, and a second sensor located at a second position on the transmitter housing separated from the first position, and wherein the data relating to the presence of the living being or the sensitive object comprises stereoscopic information concerning the living being or the sensitive object acquired by the first sensor and by the second sensor.

19. The transmitter of claim 15, further comprising an additional sensor located remote from the transmitter housing, that is in wireless or wired communication with the controller, wherein the additional sensor provides additional information relating to the presence of the living being or the sensitive object, and wherein the controller at least reduces the power level of the one or more pockets of energy when the data relating to the presence of the living being or the sensitive object and the additional information relating to the presence of the living being or the sensitive object indicates that the living being or the sensitive object is proximate to the predetermined location.

20. The transmitter of claim 19, wherein the transmitter is located at least 2 meters from the receiver, and wherein the additional sensor is a proximity sensor located less than 0.5 meters from the receiver.

21. The transmitter of claim 15, wherein the at least one sensor includes one or more of a passive sensor, an active sensor, a smart sensor, an infrared sensor, a pyro-electric sensor, an ultrasonic sensor, a laser sensor, an optical sensor, a Doppler sensor, an accelerometer, a microwave sensor, a millimeter sensor, a resonant LC sensor, and an RF standing wave sensor.

22. The transmitter of claim 15, wherein the data relating to the presence of the living being or the sensitive object comprises human recognition data, and
   wherein the human recognition data includes one or more of body temperature data, infrared range-finder data, motion data, activity recognition data, silhouette data, gesture data, heart rate data, portable devices data, and wearable devices data.

23. The transmitter of claim 15, wherein the at least one sensor includes a primary data processing function that communicates to the controller the data relating to the presence of the living being or the sensitive object.

24. A method for wireless power transmission, comprising:
   transmitting, by a transmitter, power waves that converge in a three dimensional space to form a one or more pockets of energy at a predetermined location for receiving by antenna elements of a receiver, wherein the receiver harvests power from the one or more pockets of energy at the predetermined location;
   acquiring, by a plurality of sensors in communication with the transmitter, data indicating presence of a living being or a sensitive object, wherein the data indicating the presence of the living being or the sensitive object indicates a distance of the living being or the sensitive object from the at least one sensor;
   obtaining, by the transmitter, information relating to a location of the living being or the sensitive object based upon the data indicating the presence of the living being or the sensitive object; and
   at least reducing, by the transmitter, a power level of the power waves that converge in the three dimensional space to form the one or more pockets of energy at the predetermined location, when the data relating to the presence of the living being or the sensitive object indicates that the living being or the sensitive object is proximate to the predetermined location.

\* \* \* \* \*